(12) United States Patent
Isono

(10) Patent No.: US 7,290,841 B2
(45) Date of Patent: Nov. 6, 2007

(54) HYDRAULIC BRAKING SYSTEM INCLUDING POWER-OPERATED PRESSURE SOURCE DEVICE, AND DEVICE FOR CONTROLLING PRESSURE OUTPUT OF THE PRESSURE SOURCE DEVICE

(75) Inventor: Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/903,652

(22) Filed: Jul. 13, 2001

(65) Prior Publication Data

US 2002/0008426 A1    Jan. 24, 2002

(30) Foreign Application Priority Data

Aug. 16, 2000 (JP) ............................. 2000-246963
Dec. 28, 2000 (JP) ............................. 2000-402217

(51) Int. Cl.
*B60T 8/44* (2006.01)
(52) U.S. Cl. ................... 303/114.1; 303/11; 303/155
(58) Field of Classification Search .................. 303/10, 303/11, 15, 155, 158, 166, 167, 113.1, 113.3, 303/113.4, 113.5, 114.1, 115.2, 115.4, 116.1
See application file for complete search history.

(56) References Cited

U.S. PATENT DOCUMENTS

| | | | |
|---|---|---|---|
| 4,653,815 A | 3/1987 | Agarwal et al. | |
| 4,678,243 A | 7/1987 | Leiber | |
| 4,822,114 A | 4/1989 | Klein | |
| 5,090,262 A | 2/1992 | Klein | |
| 5,123,717 A | 6/1992 | Willmann | |
| 5,487,593 A | 1/1996 | Potts et al. | |
| 5,524,659 A | 6/1996 | Takata et al. ................. 137/8 |
| 5,632,531 A | 5/1997 | Batistic et al. | |
| 5,667,283 A | 9/1997 | Drennen et al. ......... 303/115.2 |
| 5,758,930 A | 6/1998 | Schiel et al. | |
| 5,970,710 A | 10/1999 | Dieringer ..................... 60/575 |
| 6,095,622 A | 8/2000 | Oishi et al. ............... 303/113.5 |
| 6,264,287 B1 | 7/2001 | Sekihara ..................... 303/10 |
| 6,322,162 B2 | 11/2001 | Mohr ..................... 303/114.1 |
| 6,322,168 B1 * | 11/2001 | Ohnuma ..................... 303/155 |

FOREIGN PATENT DOCUMENTS

| | | |
|---|---|---|
| DE | 3728298 | 3/1989 |
| DE | 19639537 | 4/1998 |

(Continued)

OTHER PUBLICATIONS

U.S. Appl. No. 09/287,707, filed Apr. 7, 1999.*

(Continued)

*Primary Examiner*—Bradley King
(74) *Attorney, Agent, or Firm*—Oliff & Berridge PLC

(57) ABSTRACT

Braking system including a power-operated hydraulic pressure source operable to deliver a pressurized working fluid, a brake including a hydraulically operated brake cylinder, and a flow-rate changing device disposed between the power-operated hydraulic pressure source and the brake cylinder and operable to change a rate of flow of the pressurized working fluid into the brake cylinder, which rate corresponds to a given rate at which the pressurized working fluid is delivered from the power-operated hydraulic pressure source.

6 Claims, 27 Drawing Sheets

FOREIGN PATENT DOCUMENTS

| | | |
|---|---|---|
| DE | 19813031 | 5/1999 |
| DE | 19917810 A1 | 11/1999 |
| DE | 19833084 C1 | 2/2000 |
| EP | 0317182 A2 | 11/1988 |
| EP | 0 950 593 * | 10/1999 |
| GB | 2 174 161 A | 10/1986 |
| JP | A 8-67242 * | 3/1996 |
| JP | 1191530 A * | 4/1999 |
| JP | A 2000-203413 * | 7/2000 |

OTHER PUBLICATIONS

U.S. Appl. No. 09/481,273, filed Jan. 11, 2000.*
U.S. Appl. No. 09/481,365, filed Jan. 11, 2000.*
U.S. Appl. No. 09/712,124, filed Nov. 15, 2000, Isono et al.*
U.S. Appl. No. 09/725,044, filed Nov. 29, 2000, Isono et al.*
U.S. Appl. No. 09/833,763, filed Apr. 13, 2001.

* cited by examiner

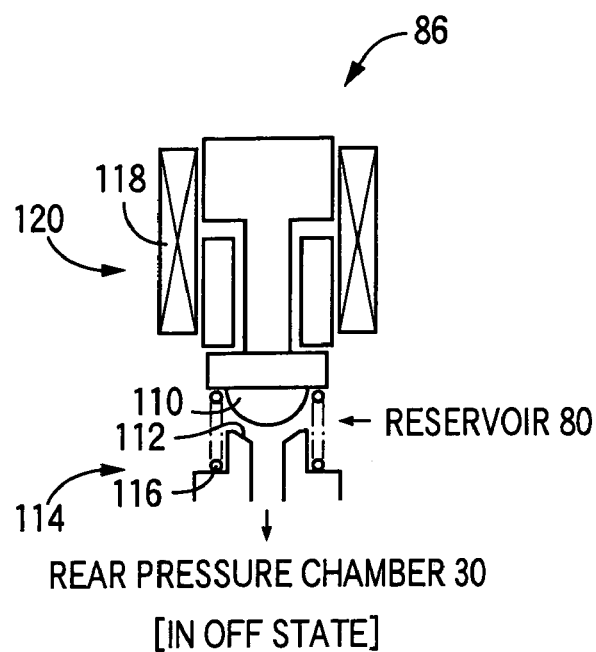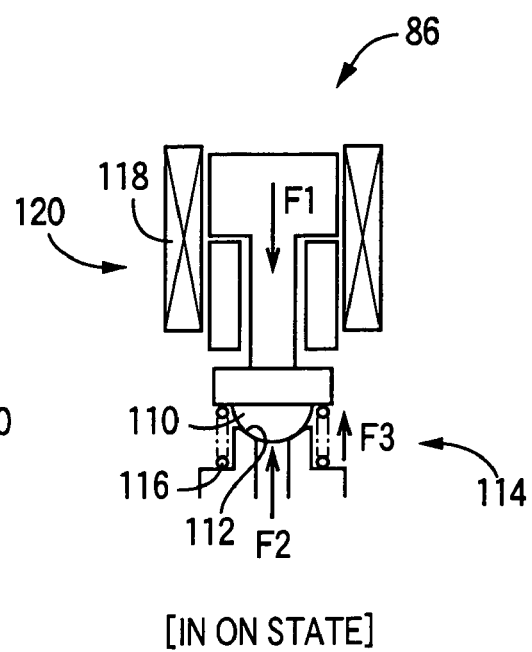

$$P_1 \times A_{m1} = P_3 \times A_{m3} + F_p \times R_p \quad \cdots (1)$$

FIG. 10

| | FIRST STATE | SECOND STATE |
|---|---|---|
| SHUT-OFF VALVE 88 | OPEN | OPEN |
| SHUT-OFF VALVE 90 | OPEN | CLOSED |
| SHUT-OFF VALVE 92 | CLOSED | OPEN |
| RATE OF FLOW $q_{WC}$ INTO BRAKE CYLINDER | $(A_{m1}/A_{m3})\,q$ | $q$ |
| BRAKING PRESSURE $P_{WC}$ | $(A_{m3}/A_{m1})\,P_{(FP=0)}$ | $P$ |

FIG. 16

| | FIRST STATE | SECOND STATE |
|---|---|---|
| SHUT-OFF VALVE 240 | OPEN | CLOSED |
| SHUT-OFF VALVE 242 | CLOSED | OPEN |
| RATE OF FLOW $q_{WC}$ INTO BRAKE CYLINDER | $(A_2/A_3) \cdot q \cdot (A_2 A_1/A_3 A_2') \cdot q$ | $q \cdot (A_1/A_2') \cdot q$ |
| BRAKING PRESSURE $P_{WC}$ | $(A_3/A_2) \cdot P \cdot (A_3 A_2'/A_2 A_1) \cdot q$ (FP = 0) | $P \cdot (A_2'/A_1) \cdot P$ |

REAR PRESSURE CHAMBER 304
PRESSURIZING CHAMBER 318

[OFF]

REAR PRESSURE CHAMBER 304
PRESSURIZING CHAMBER 318

|  | FIRST STATE | SECOND STATE |
|---|---|---|
| SHUT-OFF VALVE 340 | OPEN | CLOSED |
| SHUT-OFF VALVE 342 | CLOSED | OPEN |
| SHUT-OFF VALVE 344 | CLOSED | CLOSED |
| RATE OF FLOW INTO BRAKE CYLINDER | $(A_{m1}/A_{m3}) \cdot q$ | $q$ |
| BRAKING PRESSURE | $(A_{m3}/A_{m1}) \cdot P_{(FP=0)}$ | $P$ |

FIG. 22

|  | 1st STATE | 2nd STATE | 3rd STATE |
|---|---|---|---|
| SHUT-OFF VALVE 436 | OPEN | CLOSED | OPEN |
| SHUT-OFF VALVE 438 | OPEN | CLOSED | CLOSED |
| SHUT-OFF VALVE 440 | CLOSED | CLOSED | CLOSED |
| SHUT-OFF VALVE 342 | CLOSED | OPEN | CLOSED |
| RATE OF FLOW INTO BRAKE CYLINDER | $\{(A_{m1}+A_{m2})/A_{m3}\} \cdot q$ | $q$ | $(A_{m1}/A_{m3}) \cdot q$ |
| BRAKING PRESSURE | $(A_{m3} \cdot P)/(A_{m1}+A_{m2})$ (FP = 0) | $p$ | $(A_{m3}/A_{m2} \cdot P)$ (FP = 0) |

$$\frac{\theta_2'}{\theta_1'} < \frac{\theta_2}{\theta_1}$$

FIG. 31

|  | FIRST STATE | SECOND STATE |
|---|---|---|
| SHUT-OFF VALVE 892 | OPEN | CLOSED |
| SHUT-OFF VALVE 896 | CLOSED | OPEN |
| RATE OF INCREASE OF BRAKING PRESSURE | $\Delta Fd/A_1$ | $\Delta Fd/(A_1 \cdot A_3)$ |

FIG. 33

|  | FIRST STATE | SECOND STATE |
|---|---|---|
| SHUT-OFF VALVE 962 | OPEN | CLOSED |
| SHUT-OFF VALVE 966 | CLOSED | OPEN |
| PRESSURE INCREASE RATE BOOSTING RATIO | $\Delta Fd \cdot \gamma /(A_1 \cdot \gamma - A_3)$ | $\Delta Fd/(A_1 - A_3)$ |

HYDRAULIC BRAKING SYSTEM INCLUDING POWER-OPERATED PRESSURE SOURCE DEVICE, AND DEVICE FOR CONTROLLING PRESSURE OUTPUT OF THE PRESSURE SOURCE DEVICE

This application is based on Japanese Patent Application Nos. 2000-246963 filed on Aug. 16, 2000 and 2000-402217 filed on Dec. 28, 2000, respectively, the contents of which are incorporated hereinto by reference.

BACKGROUND OF THE INVENTION

1. Field of the Invention

The present invention relates to braking system.

2. Discussion of Related Art

Japanese Patent Application No. 2000-174029, which was filed by the assignee of the present application and which has not been laid open at the time the present invention was made, discloses an example of a braking system including (a) a power-operated hydraulic pressure source operable to deliver a pressurized working fluid, (b) a brake including a brake cylinder and operated by activation of the brake cylinder with the pressurized fluid supplied thereto, and (c) a hydraulic pressure control device disposed between the power-operated hydraulic pressure source and said brake cylinder, and operable to control the pressure of the pressurized fluid delivered from the hydraulic pressure source, for thereby controlling the pressure of the pressurized fluid in said brake cylinder. In this braking system, the pressure control device includes a master cylinder which is disposed between the hydraulic pressure source and the brake cylinder and which includes a pressurizing piston operatively connected to a manually operable brake operating member. The pressurizing piston partially defines a front pressurizing chamber on a front side thereof. The fluid in the pressurizing chamber is pressurized as the pressurizing piston is advanced, so that the brake cylinder is activated with the pressurized fluid delivered from the pressurizing chamber, whereby the brake is operated.

In the braking system described above, the fluid pressure in a rear pressure chamber formed on the rear side of the pressurizing piston is controlled on the basis of the pressurized fluid delivered from the power-operated hydraulic pressure source. The pressurizing piston receives an operating force of the brake operating member and an assisting force based on the fluid pressure in the rear pressure chamber, so that the pressurizing piston is advanced by a sum of the operating force of the brake operating member and the assisting force. By controlling the fluid pressure in the rear pressure chamber, a relationship between the brake operating force and the fluid pressure in the pressurizing chamber, namely, a relationship between the brake operating force and the braking pressure is controlled.

In the braking system indicated above, the flows of the fluid into and from the pressurizing chamber of the master cylinder are controlled. More specifically described, the pressurized fluid delivered from the power-operated hydraulic pressure source is fed into the pressurizing chamber, or the pressurized fluid is discharged from the pressurizing chamber to a reservoir, so that a relationship between an operating stroke of the brake operating member and the pressure of the fluid in the pressurizing chamber, namely, a relationship between the operating stroke and the braking pressure in the brake cylinder is controlled.

Thus, not only the relationship between the brake operating force and the braking pressure but also the relationship between the operating stroke and the braking pressure are controlled in the braking system described above.

SUMMARY OF THE INVENTION

It is therefore an object of the present invention to provide an improved braking system including a power-operated hydraulic pressure source, for instance, a braking system capable of controlling at least one of the operating speed and force of the brake so as to meet an operator's requirement or desire relating to an operation of the braking system, within the capacity of the power-operated hydraulic pressure source. The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system comprising:

a power-operated hydraulic pressure source operable to deliver a pressurized working fluid;

a brake including a hydraulically operated brake cylinder; and a flow-rate changing device disposed between the power-operated hydraulic pressure source and the brake cylinder and operable to change a rate of flow of the pressurized working fluid into the brake cylinder, which rate corresponds to a given rate at which the pressurized working fluid is delivered from the power-operated hydraulic pressure source In the braking system according to the above mode (1) of the present invention, the flow-rate changing device is arranged to change the rate of flow of the pressurized working fluid into the brake cylinder, which rate corresponds to a given amount of the pressurized working fluid delivered from the power-operated hydraulic pressure source. According to this arrangement, the rate of increase of the fluid pressure in the brake cylinder can be changed by changing the rate of flow of the pressurized fluid into the brake cylinder, even while the fluid pressure in the brake cylinder is held constant. For instance, where the operator of the braking system desires to rapidly increase the fluid pressure in the brake cylinder, the flow-rate changing device is commanded to increase the rate of flow of the fluid into the brake cylinder. Where the operator desires to slowly increase the fluid pressure in the brake cylinder, the flow-rate changing device is commanded to reduce the rate of flow of the fluid into the brake cylinder. The flow-rate changing device makes it possible to control the rate or gradient of increase of the fluid pressure in the brake cylinder, according to the operator's desire relating to an operation of the brake, without having to use the power-operated hydraulic pressure source having a large capacity. In this sense, the flow-rate changing device may be considered to be a device arranged to change the rate of increase of the fluid pressure in the brake cylinder.

(2) A braking system according to the above mode (1), further comprising a hydraulic cylinder disposed between the power-operated hydraulic pressure source and the brake cylinder including (a) a housing, and (b) a pressurizing piston fluid-tightly and slidably fitted in the housing and having two pressure-receiving surface areas which are different from each other and which respectively partially define a front pressurizing chamber and a rear pressure chamber on front and rear sides of the pressurizing piston, the hydraulic cylinder being operable to supply the brake cylinder with the pressurized working fluid delivered from the front pressurizing chamber as the pressurizing piston is advanced, and wherein the flow-rate changing device includes a switching device having a first state in which the pressurized working fluid is delivered from the power-operated hydraulic pressure source to one of the front pressurizing chamber and the rear pressure chamber which has a larger one of the two pressure-receiving surface areas, and a second state in which the pressurized working fluid is delivered from the power-operated hydraulic pressure source to the other of the front pressurizing chamber and the rear pressure chamber.

The hydraulic cylinder provided in the braking system according to the above mode (2) is arranged such that the pressurized fluid is delivered from the front pressurizing chamber to the brake cylinder as the pressurizing piston is advanced. In one form of the pressurizing piston, a larger one of the two pressure-receiving surfaces areas partially defines the front pressurizing chamber while the other smaller pressure-receiving surface area partially defines the rear pressure chamber. In another form of the pressurizing piston, a smaller one of the two pressure-receiving surface areas partially defines the front pressurizing chamber while the other larger pressure-receiving surface area partially defines the rear pressure chamber. In either of these two forms of the pressurizing piston, the pressurized fluid delivered from the power-operated hydraulic pressure source is supplied to one and the other of the front pressurizing chamber and the rear pressure chamber in one and the other of the first and second states of the switching device of the flow-rate changing device. The rate of flow of the pressurized fluid into the brake cylinder in the first state (in which the fluid is supplied to the chamber having the larger pressure-receiving surface area) is different from that in the second state (in which the fluid is supplied to the chamber having the smaller pressure-receiving surface area).

Suppose the pressure-receiving surface area of the pressurizing piston which partially defines the front pressurizing chamber is represented by $A_1$, while the pressure-receiving surface area which partially defines the rear pressure chamber is represented by $A_3$. When the pressurized fluid is delivered from the hydraulic pressure source to the rear pressure chamber at a flow rate of q, the pressurized fluid is supplied from the front pressurizing chamber to the brake cylinder at a flow rate of $(A_1/A_3) \cdot q$. When the pressurized fluid is delivered from the hydraulic pressure source to the front pressurizing chamber at the flow rate of q, on the other hand, the pressurized fluid is supplied from this front pressurizing chamber to the brake cylinder at the same flow rate q.

Therefore, if the pressurizing piston is formed such that the pressure-receiving surface area $A_1$ partially defining the front pressurizing chamber is larger than the pressure-receiving surface area $A_3$ partially defining the rear pressure chamber, (namely, if $A_1/A_3>1$), the rate of flow of the pressurized fluid into the brake cylinder is higher when the pressurized fluid is delivered from the hydraulic pressure source to the rear pressure chamber, than when the pressurized fluid is delivered from the hydraulic pressure source to the front pressurizing chamber. If the pressure-receiving surface area $A_1$ is smaller than the pressure-receiving surface area $A_3$, (namely, if $A_1/A_3<1$), the rate of flow of the pressurized fluid into the brake cylinder is higher when the pressurized fluid is delivered from the hydraulic pressure source to the front pressurizing chamber.

Where the entire amount of the pressurized fluid delivered form the front pressurizing chamber is supplied to the brake cylinder, the rate of flow of the fluid from the front pressurizing chamber is equal to the rate of flow of the fluid into the brake cylinder. The hydraulic cylinder includes a single front pressurizing chamber or a plurality of front pressurizing chambers. Further, each front pressurizing chamber is connected to one brake cylinder or a plurality of brake cylinders. In any one of those cases, the total amount of the fluid delivered from the hydraulic cylinder is equal to the amount of the fluid supplied to all of the brake cylinders. Where the braking system has two or more brake cylinders, the flow-rate changing device is operated to change the rate of flow of the pressurized flow into all of the brake cylinders. Where the hydraulic cylinder has two or more front pressurizing chambers, the rate of flow of the pressurized fluid from the hydraulic cylinder is the rate of flow of the fluid from all of the front pressurizing chambers.

While there has been described the relationship between the supply flow of the pressurized fluid from the power-operated hydraulic pressure source to the hydraulic cylinder and the rate of flow of the pressurized fluid from the hydraulic cylinder into the brake cylinder, there will be described the pressure of the pressurized fluid.

When the pressurized fluid having a pressure P is delivered from the power-operated hydraulic pressure source to the rear pressure chamber when an operating force of a manually operable brake operating member is zero, that is, when the fluid pressure in the rear pressure chamber is controlled to a value P), the fluid pressure in the brake cylinder (hereinafter referred to simply as "braking pressure") is equal to $P \cdot (A_3/A_1)$. When the pressurized fluid is delivered to the front pressurizing chamber, the braking pressure is equal to P. Where the maximum delivery pressure of the power-operated hydraulic pressure source is $P_{max}$, the braking pressure can be increased to a highest value of $P_{max}(A_3/A_1)$ in the former case, and to a highest value of $P_{max}$ in the latter case. Where the pressure-receiving surface area A1 partially defining the front pressurizing chamber is larger than the pressure-receiving surface area $A_3$ partially defining the rear pressure chamber (where $A_3/A_1<1$), the highest braking pressure is higher when the pressurized fluid is delivered from the hydraulic pressure source to the front pressurizing chamber, than when the pressurized fluid is delivered to the rear pressure chamber. Where the pressure-receiving surface area $A_1$ is smaller than the pressure-receiving surface area $A_3$ (where $A_3/A_1 >1$), the highest braking pressure is higher when the pressurized fluid is delivered from the hydraulic pressure source to the rear pressure chamber.

As discussed above, the switching device of the flow-rate changing device is operable to selectively deliver the pressurized fluid from the power-operated hydraulic pressure source (e.g., a pump device) to one of the front pressurizing chamber and the rear pressure chamber, so that the rate of flow of the pressurized fluid into the brake cylinder and the highest fluid pressure in the brake cylinder (highest braking pressure) can be changed by controlling the switching device. Thus, the switching device is capable of satisfying both of the operator's desire to rapidly increase the braking pressure and the operator's desire to cause the brake cylinder to generate a large braking force, without having to use the power-operated hydraulic pressure source having a large capacity. In this sense, the flow-rate changing device may be considered to include a device arranged to change the highest braking pressure.

(3) A braking system according to the above mode (2), wherein the flow-rate changing device further includes a discharge-flow inhibiting device operable to inhibit a discharge flow of the pressurized from the rear pressure chamber while the pressurized fluid is delivered from the power-operated hydraulic pressure source to the front pressurizing chamber under the control of said switching device.

In the braking system according to the above mode (3) wherein the discharge flow of the pressurized fluid from the rear pressure chamber is inhibited while the pressurized fluid is delivered from the hydraulic pressure source to the front pressurizing chamber, so that the pressurizing piston is prevented from being retracted. Namely, the pressurized fluid delivered to the front pressurizing chamber will not cause a retracting movement of the pressurizing piston, in order to permit a rapid supply flow of the pressurized fluid from the front pressurizing chamber to the brake cylinder, for thereby allowing a rapid increase of the braking pressure. If the retracting movement of the pressurizing piston were permitted, the rate of supply flow of the pressurized fluid from the front pressurizing chamber to the brake cylinder would be accordingly reduced. If the pressurizing piston were retracted to its fully retracted position, the supply of the pressurized fluid to the brake cylinder would be initiated only after the pressurizing piston has been retracted to its fully retracted position. In the present to the arrangement according to the above form (3), the entire amount of the pressurized fluid delivered from the hydraulic pressure source is supplied to the rake cylinder, thereby assuring a rapid increase of the braking pressure.

Where the pressure-receiving surface area $A_1$ partially defining the front pressurizing chamber is larger than the pressure-receiving surface area $A_3$ partially defining the rear pressurizing chamber, (namely, if $A_1 > A_3$), the rate of flow of the pressurized fluid into the brake cylinder is made higher when the pressurized fluid is delivered from the hydraulic pressure source to the rear pressure chamber. For instance, the pressurized fluid is delivered from the hydraulic pressure source to the rear pressure chamber in an initial period of an operation of a manually operable brake operating member. In this case, the fast filling of the brake cylinder can be completed in a relatively short time, while reducing a delay in the activation of the brake cylinder to provide a braking effect. It is also noted that the highest braking pressure can be made higher when the pressurized fluid is delivered from the hydraulic pressure source to the front pressurizing chamber. Where the desired braking force is relatively large, the pressurized fluid is delivered from the hydraulic pressure source to the front pressurizing chamber, so that the braking pressure can be raised to the maximum delivery pressure of the hydraulic pressure source. When the fluid pressure in the front pressurizing chamber is controlled to the maximum delivery pressure $P_{max}$ of the hydraulic pressure source, the fluid pressure in the rear pressure chamber from which the discharge flow of the fluid is inhibited is increased to a value $P_{max} \cdot (A_1/A_3)$, which is higher than the maximum delivery pressure $P_{max}$. Thus, the braking system according to the above mode (3) is capable of controlling the braking pressure and the rate or gradient of increase of the braking pressure according to the operator's requirements relating to the braking operation.

(4) A braking system according to the above mode (3), further comprising a check valve disposed in parallel connection with the discharge-flow inhibiting device, the check valve permitting a flow of the pressurized fluid in a first direction from the power-operated hydraulic pressure source toward the rear pressure chamber and inhibits a flow of the pressurized fluid in a second direction opposite to the first direction.

In the braking system according to the above mode (4) wherein the check valve is disposed in parallel connection with the discharge-flow inhibiting device, the pressurized fluid can be delivered from the hydraulic pressure source to the rear pressure chamber while the discharge flow of the fluid from the rear pressure chamber is inhibited by the discharge-flow inhibiting device. When the pressurizing piston is advanced by an increase in the operating stroke of a manually operable brake operating member by the operator, for instance, the pressurized fluid can be introduced into the rear pressure chamber through the check valve, so that the fluid pressure in the rear pressure chamber is prevented from being lowered below the atmospheric level, even while the discharge flow of the fluid from the rear pressure chamber is inhibited.

(5) A braking system according to the above mode (1), further comprising a manually operable brake operating member, and a hydraulic cylinder disposed between the power-operated hydraulic pressure source and the brake cylinder; the hydraulic cylinder including (a) a housing, (b) a first pressurizing piston fluid-tightly and slidably fitted in the housing and operatively connected to the brake operating member, the first pressurizing piston partially defining a rear pressure chamber on a rear side thereof, and (c) a second pressurizing piston separate from the first pressurizing piston and partially defining a front pressurizing chamber on a front side thereof, the second pressurizing piston cooperating with the first pressurizing piston to partially define an intermediate fluid chamber therebetween, the hydraulic cylinder being operable to supply the brake cylinder with the pressurized working fluid delivered from the front pressurizing chamber as the second pressurizing piston is advanced, and wherein the flow-rate changing device includes a
    switching device having a first state in which the pressurized working fluid is delivered from the power-operated hydraulic pressure source to the rear pressure chamber, and a second state in which the pressurized working fluid is delivered from the power-operated hydraulic pressure source to the intermediate fluid chamber.

When the pressurized fluid is delivered from the hydraulic pressure source to the rear pressure chamber, the fluid pressure in the intermediate fluid chamber is pressurized by an advancing movement of the first pressurizing piston, so that the second pressurizing piston is advanced to pressurize the fluid in the front pressurizing chamber, and the brake cylinder is supplied with the pressurized fluid delivered from the front pressurizing chamber. When the pressurized fluid is delivered from the hydraulic pressure source to the intermediate fluid chamber, the second pressurizing piston is advanced to pressurized the fluid in the front pressurizing chamber, so that the brake cylinder is supplied with the pressurized fluid delivered from the front pressurizing chamber.

Where the power-operated hydraulic pressure source is defective, the first pressurizing piston is advanced by an operation of the manually operable brake operating member, until the first pressurizing piston is brought into abutting contact with the second pressurizing piston. Subsequently, the first and second pressurizing pistons are advanced as a unit, so that the fluid pressure in the front pressurizing chamber is pressurized to a value corresponding to the operating force of the brake operating member.

Suppose the pressure-receiving surface area of the second pressurizing piston which partially define the pressurizing piston is represented by $A_1$, and the pressure-receiving surface area of the first pressurizing piston which partially defines the rear pressure chamber is represented by $A_3$, while the pressure-receiving surface areas of the first and second pressurizing pistons which partially define the intermediate fluid chamber are represented by $A_2$ and $A_2'$, respectively, as indicated in FIG. 15. When the pressurized fluid having a pressure P is delivered from the hydraulic pressure source to the rear pressure chamber at a flow rate q, the pressurized is supplied from the front pressurizing chamber to the brake cylinder at a flow rate of $q \cdot (A_1 \cdot A_2)/(A_3 \cdot A_2')$, so that the braking pressure is raised to a value $P \cdot (A_2 \cdot A_2')/(A_1 \cdot A_2)$ In this case, the first piston is advanced by a distance $\Delta L_1 = q/A_3$, while the second piston is advanced by a distance $\Delta L_2 = (q/A_3) \cdot (A_2/A_2')$. Where a ratio $A_2/A_2'$ of the pressure-receiving surface areas $A_2$, $A_2'$ of the first and second pressurizing pistons which partially define the intermediate fluid chamber is higher than "1", the distance $\Delta L_1$ of the advancing movement of the second piston is larger than the distance $\Delta L_2$ of the advancing movement of the first piston ($\Delta L_2 > \Delta L_1$), the first pressurizing piston does not contact the second pressurizing piston where the pressurized fluid is delivered from the hydraulic pressure source to the rear pressure chamber.

When the pressurized fluid is delivered from the hydraulic pressure source to the intermediate fluid chamber, the pressurized fluid is supplied from the front pressurizing chamber to the brake cylinder at a flow rate of $q \cdot (A_1/A_2')$, and the braking pressure is raised to a value $P \cdot (A_2'/A_1)$.

In the above second case, the rate of flow of the pressurized fluid into the brake cylinder is made higher and the braking pressure is made lower when the pressurized fluid is delivered from the hydraulic pressure source to the rear pressure chamber, where the pressure-receiving area $A_2$ of the first pressurizing piston is larger than the pressure-receiving area $A_3$ of the same piston ($A_2/A_3 > 1$). The second pressurizing piston may be designed such that its pressure-receiving surface area $A_2'$ partially defining the intermediate fluid chamber is equal to the pressure-receiving surface area A, partially defining the front pressurizing chamber.

The braking system according to the above mode (5) may incorporate the technical feature according to any one of the above modes (2)-(4). Where the discharge-flow inhibiting device described above is provided in the braking system according to the above mode (5), the retracting movement of the first pressurizing piston is prevented when the fluid pressure in the intermediate fluid chamber is increased with the pressurized fluid delivered thereto from the hydraulic pressure source.

(6) A braking system according to any one of the above modes (2)-(5), wherein the switching device includes a communication control valve device operable for selective fluid communication of the power-operated hydraulic pressure source with one of at least two fluid chambers of the hydraulic cylinder, the at least two fluid chambers including the front pressurizing chamber and the rear pressure chamber.

The communication control valve device may include at least one control valve operable to control flows of the pressurized fluid from the hydraulic pressure source to the at least two fluid chambers of the hydraulic cylinder, which include the front pressurizing chamber and the rear pressure chamber. The valve device may include a single directional control valve disposed between the hydraulic pressure source and the two or more fluid chambers, or a plurality of control valves disposed between the hydraulic pressure source and the respective fluid chambers. Each control valve may be an electromagnetic shut-off valve which is opened and closed by energization of de-energization of a coil, or alternatively an electromagnetic pressure control valve operable to control the fluid pressure according to an amount of electric current to be applied to its coil. Where the communication control valve device includes an electromagnetic shut-off valve or valves. a separate pressure control valve may also be provided. However, the fluid pressure may be controlled by controlling the duty ratio of the electromagnetic shut-off valve or valves.

(7) A braking system according to any one of the above modes (2)-(6), further comprising a pressure control device operable to control a pressure of the pressurized fluid in at least one of at least two fluid chambers of the hydraulic chamber, on the basis of an operation-related amount representative of an operating state of a manually operable brake operating member, the at least two fluid chambers including the front pressurizing chamber and said rear pressure chamber.

Where at least of the fluid pressures in the rear pressure chamber, the front pressurizing chamber and the intermediate fluid chamber, which have been discussed above with respect to the above mode (5), for example, is controlled on the basis of the operating state of the manually operable brake operating member, the braking pressure can be controlled so as to meet the operator's desires or requirements relating to an operation of the brake cylinder. The operating amount representative of the operating state of the brake operating member may be an amount determined by an operating force or an operating stroke of the brake operating member, or an amount determined by both of the operating force and stroke of the brake operating member. The pressure control device arranged to control the fluid pressure in the appropriate fluid chamber on the basis of the operating amount may be adapted to control the fluid pressure according to the operating amount per se, or alternatively according to a change in this operating amount, or according to both of the operating amount and its change.

The pressure control device may include at last one electromagnetic control valve. In this case, the at least one electromagnetic control valve may function as the communication control valve device described above with respect to the above mode (6), or may function as part of the communication control valve device.

(8) A braking system according to the above mode (1), further comprising:
a low-pressure source for storing the working fluid at a pressure substantially equal to an atmospheric level;
a hydraulic cylinder disposed between the power-operated hydraulic pressure source and the brake cylinder and including (a) a housing, (b) a stepped pressurizing piston fluid-tightly and slidably fitted in the housing and including a small-diameter portion partially defining a front pressurizing chamber on a front side thereof, and a large-diameter portion having a larger diameter than the small-diameter portion and partially defining a rear pressure chamber on a rear side thereof, the large-diameter portion cooperating with an outer circumferential surface of the small-diameter portion to partially define an annular fluid chamber, the hydraulic cylinder being operable to supply the brake cylinder with the pressurized fluid delivered from the front pressurizing chamber as the pressurizing piston is advanced, and wherein the flow-rate changing device includes a communicating valve device operable while the pressurized fluid is delivered from the power-operated hydraulic pressure source to the rear pressure chamber, the communicating valve device having a first state for permitting a supply flow of the pressurized fluid from the annular fluid chamber to the brake cylinder, and a second state for permitting a discharge flow of the pressurized fluid from the annular fluid chamber to the low-pressure source, the communicating valve device being switched from the first state to the second state while the pressurizing piston is advanced.

Suppose the pressure-receiving surface area of the small-diameter portion of the pressurizing piston which partially defines the front pressurizing chamber is represented by $A_1$, and the pressure-receiving surface area of the large-diameter portion partially defining the rear pressure chamber is represented by $A_3$, while the pressure-receiving surface area of the pressurizing piston partially defining the annular fluid chamber is represented by $A_2$. When the pressurized fluid having a pressure P is delivered from the power-operated hydraulic pressure source to the rear pressure chamber at a flow rate q, the pressurized fluid is supplied from both of the front pressurizing chamber and the annular fluid chamber to the brake cylinder as the pressurizing piston is advanced. The rate of flow of the pressurized fluid into the brake cylinder is represented by $q \cdot (A_1+A_2)/A_3$, and the braking pressure in the brake cylinder is raised to a value $P \cdot \{A_3/(A_2+A_1)\}$. When the discharge flow of the pressurized fluid from the annular fluid chamber is permitted, the pressurized fluid is supplied to the brake cylinder from the front pressurizing chamber, but not from the annular fluid chamber. In this second state of the communicating valve device, the rate of flow of the pressurized fluid into the brake cylinder is represented by $q \cdot (A_1/A_3)$, and the braking pressure is raised to a value $P \cdot (A_3/A_1)$.

Since the pressure-receiving surface area $A_1$ is smaller than the pressure-receiving surface area $A_3$, a ratio $A_3/A_1$ of these surface areas is larger than "1". When the discharge flow of the fluid from the annular fluid chamber is permitted, the braking pressure can be made higher than the pressure of the fluid pressurized by the hydraulic pressure source. When the supply flow of the fluid from the annular fluid chamber to the brake cylinder is permitted, the pressurized fluid is supplied to the brake cylinder from both of the front pressurizing chamber and the annular fluid chamber, so that the pressurized fluid can be delivered to the brake cylinder at a relatively high flow rate. Accordingly, the fast filling of the brake cylinder can be completed in a relatively short time by initially placing the communicating valve device in the first state in which the supply flow of the fluid into the brake cylinder is permitted, and the braking pressure can be raised to a relatively high level by subsequently placing the communicating valve device in the second state in which the discharge flow of the fluid from the annular chamber is permitted. This function achieved in the second state of the communicating valve device may be called a "fill-up" function, and the communicating vale device may be called a fill-up device operable to increase the braking pressure after the fast filling of the brake cylinder.

In the first state of the communicating valve device in which the supply flow of the pressurized fluid from the annular fluid chamber to the rake cylinder is permitted, the pressurized fluid may b supplied to the brake cylinder directly from the annular fluid chamber, or through the front pressurizing chamber.

The communicating valve device may include a first control valve provided in a fluid passage connecting the annular fluid chamber and the low-pressure source, and a second control valve provided a fluid passage connecting the annular fluid chamber and the brake cylinder. The first control valve has an open state for fluid communication between the annular fluid chamber and the low-pressure source and a closed state for isolating the annular fluid chamber from the low-pressure source. The second control valve has an open state for fluid communication between the annular fluid chamber and the brake cylinder and a closed state for isolating the annular fluid chamber from the brake cylinder. The second control valve may be provided in a fluid passage connecting the annular fluid chamber and the front pressurizing chamber. The fluid passage connecting the annular fluid chamber and the front pressurizing chamber may be provided either outside the housing of the hydraulic cylinder. The first control valve may be an electromagnetic control valve, or a pressure relief valve which permits a discharge flow of the pressurized fluid from the annular fluid chamber to the low-pressure source when the fluid pressure in the annular fluid chamber has become higher than that in the low-pressure source by more than a predetermined amount. The second control valve may be an electromagnetic control valve, or a check valve which permits a flow of the pressurized fluid in a direction from the annular fluid chamber toward the brake cylinder while the fluid pressure in the annular fluid chamber is higher than that in the brake cylinder or front pressurizing chamber.

A device for enabling or disabling the communicating valve device may be provided. In an example of the communicating valve device shown in FIG. 20 which includes a flow restricting device including a pressure relief valve as the first control valve indicated above, a shut-off valve may be provided in series connection with the flow restricting device, to enable or disable the flow restricting device to operate, that is, to selectively permit and inhibit restriction of the fluid flow from the annular fluid chamber to the low-pressure source. The fill-up function indicated above is achieved when the fluid flow is restricted, and is not achieved when the fluid flow is not restricted.

The technical feature according to the above mode (8) may be a subject matter of the present invention, independently of the technical feature according to the above mode (1).

(9) A braking system according to any one of the above modes (1)-(8), further comprising:

a master cylinder including (a) a housing, and (b) a pressuring piston fluid-tightly and slidably fitted in the housing and partially defining a front pressurizing chamber on a front side thereof, the pressurizing piston being advanced by an operation of a manually operable brake operating member, the master cylinder being operable to supply the brake cylinder with the pressurized working fluid delivered from the front pressurizing chamber as the pressurizing piston is advanced;

a hydraulic booster operable to apply an assisting force based on a pressure of the pressurized working fluid received from the power-operated hydraulic pressure source; and an assisting cylinder including a pressurizing piston which partially defines a pressurizing chamber on a front side thereof and which is advanced by the pressurized working fluid received from the power-operated hydraulic pressure source, the assisting cylinder being operable to supply the brake cylinder with the pressurized working fluid delivered from the pressurizing chamber thereof as the pressurizing piston thereof is advanced, and wherein the flow-rate changing device includes a switching device having a first state in which the pressurized working fluid is delivered from the power-operated hydraulic pressure source to the hydraulic booster, and a second state in which the pressurized working fluid is delivered from the power-operated hydraulic pressure source to the assisting cylinder.

In the braking system according to the above mode (9), the pressurized fluid can be delivered to the brake cylinder at different flow rates in the first and second states of the switching device of the flow-rate changing device. Namely, the rate of flow of the fluid into the brake cylinder when the pressurized fluid is delivered from the power-operated hydraulic pressure source to the hydraulic booster can be different from the rate of flow when the pressurized fluid is delivered from the hydraulic pressure source to the assisting cylinder.

In the first state of the switching device in which the pressurized fluid is delivered from the hydraulic pressure source to the hydraulic booster, the pressurizing piston of the master cylinder receives an advancing force which is an operating force of the manually operable brake operating member as boosted by the hydraulic booster. The pressurizing piston of the master cylinder is advanced by this advancing force to pressurize the fluid in the front pressurizing chamber to a value corresponding to the advancing force, and the brake cylinder is supplied with the pressurized fluid delivered from the front pressurizing chamber of the master cylinder, whereby the brake is activated.

In the second state of the switching device in which the pressurized fluid is delivered from the hydraulic pressure source to the assisting cylinder, the assisting cylinder is isolated from the master cylinder, and is operated by the pressurized fluid delivered from the hydraulic pressure source, so that the brake cylinder is supplied with the pressurized fluid delivered from the pressurizing chamber of the assisting cylinder, whereby the brake is activated.

The hydraulic booster may have a rear pressure chamber which has been described with respect to the above mode (3), for instance.

(10) A braking system according to any one of the above modes (1)-(9), wherein the flow-rate changing device is operable to change said rate of flow of the pressurized working fluid into the brake cylinder, on the basis of a pressure of the fluid in the brake cylinder.

(11) A braking system according to any one of the above modes (1)-(10), wherein the flow-rate changing device is operable to change the rate of flow of the pressurizing working fluid into the brake cylinder, on the basis of a rate of increase of a pressure of the fluid in the brake cylinder.

The flow-rate changing device which is capable of changing the rate of flow of the pressurized fluid into the brake cylinder may be arranged to change the highest pressure in the brake cylinder. In this respect, it is reasonable to change the rate of flow of the fluid into the brake cylinder on the basis of the braking pressure or the rate or gradient of increase of the braking pressure.

The braking systems according to the above modes (10) and (11) require a braking-pressure detecting device for detecting the braking pressure. This braking-pressure detecting device may be arranged to either directly or indirect detect the braking pressure. For instance, the braking-pressure detecting device is arranged to detect a fluid pressure at any portion of the braking system at which the fluid pressure is expected to be almost equal to the braking pressure (fluid pressure in the brake cylinder). More specifically described, the braking-pressure detecting device may be arranged to detect a fluid pressure in a fluid passage connected to the brake cylinder or a fluid pressure in a master cylinder connected to the brake cylinder, or alternatively an output pressure of a hydraulic pressure source device connected to the brake cylinder, which hydraulic pressure source device will be described in the following DETAILED DESCRIPTION OF THE PREFERRED EMBODIMENTS. The braking pressure can be estimated on the basis of the deceleration value of a body equipped with the present braking system, such as an automotive vehicle. In this case, a deceleration detecting device serves as the braking-pressure detecting device.

The flow-rate changing device may be arranged to change the rate of flow of the pressurized fluid into the brake cylinder, either continuously or in steps, on the basis of the braking pressure or a rate of increase of the braking pressure. In the braking system according to any one of the following modes (12)-(14) of the invention, the rate of flow of the pressurized fluid into the brake cylinder is changed when the braking pressure has reached a predetermined value. The manner of determining this predetermined value will be described.

(12) A braking system according to any one of the above modes (1)-(11), wherein the flow-rate changing device is operable to change the rate of flow of the pressurized working fluid into the brake cylinder, when a pressure of the fluid in the brake cylinder has reached a predetermined value which is determined on the basis of an operating state of the power-operated hydraulic pressure source.

As described above, the flow-rate changing device is arranged to change the rate of flow of the pressurized working fluid into the brake cylinder, which rate corresponds to a given rate at which the pressurized working fluid is delivered from the power-operated hydraulic pressure source. However, the rate of flow of the pressurized fluid into the brake cylinder is changed with a change in the rate of flow of the pressurized fluid from the power-operated hydraulic pressure source. It is also noted that the flow rate of the hydraulic pressure source is determined by the operating state of the hydraulic pressure source itself. Accordingly, it is reasonable to change the rate of flow of the pressurized fluid into the brake cylinder on the basis of the operating state of the hydraulic pressure source.

For instance, the flow-rate changing device may be arranged to be switched, when the braking pressure has reached a predetermined value, from the first state in which the pressurized fluid is delivered to the brake cylinder at a relatively high flow rate, to increase the braking pressure to a relatively low level, to the second state in which the pressurized fluid is delivered to the brake cylinder at a relatively low rate, to increase the braking pressure to a relatively high level. Where the power-operated hydraulic pressure source is in an operating state in which it is able to operate so as to fully achieve its function, the predetermined value of the braking pressure at which the flow-rate changing device is switched to the second state may be determined to be relatively high, for instance. In this case, the highest braking pressure in the first state is not so low, so that it is desirable to supply the pressurized fluid to the brake cylinder at a relatively high rate.

(13) A braking system according to any one of the above modes (1)-(12), wherein the power-operated hydraulic pressure source includes a pump device comprising (a) an electric motor operable with an electric energy, and (b) a pump driven by the electric motor to deliver the pressurized working fluid, and wherein the flow-rate changing device is operable to change the rate of flow of the pressurized working fluid into the brake cylinder when a pressure of the fluid in the brake cylinder has reached a predetermined value which is determined on the basis of an amount of electric energy applied to the electric motor.

The maximum flow rate and delivery pressure of the power-operated hydraulic pressure source vary within a range of the capacity of the pump device, such that the maximum flow rate and delivery pressure are higher when the amount of electric energy applied to the electric motor is relatively large than when it is relatively small. Accordingly, it is reasonable to determine the above-indicated predetermined value of the braking pressure on the basis of the amount of electric energy applied to the electric motor.

(14) A braking system according to any one of the above modes (1)-(13), wherein the flow-rate changing device is operable to change the rate of flow of the pressurized working fluid into the brake cylinder when a pressure of the fluid in the brake cylinder has reached a predetermined value which is determined on the basis of a temperature of the working fluid.

The working fluid flows at a lower rate when its temperature is relatively low than when it is relatively high. Accordingly, it is reasonable to determine the above-indicated predetermined value of the braking pressure (at which the rate of flow of the fluid into the brake cylinder is changed) on the basis of the temperature (viscosity) of the working fluid.

Where the flow-rate changing device is arranged to be switched from the first state (in which the rate of flow of the fluid into the brake cylinder is relatively high while the braking pressure is increased to a relatively low level) to the second state (in which the rate of flow of the fluid into the brake cylinder is relatively low while the braking pressure is increased to a relatively high level) when the braking pressure has reached the predetermined value, as described above with respect to the above mode (12), it is desirable to reduce the predetermined value with an increase in the temperature of the working fluid. Since the rate of flow of the fluid into the brake cylinder is not so low in the second state when the fluid temperature is relatively high, it is desirable to increase the braking pressure to a high level.

The technical features according to the above modes (12)-(14) are available where the flow-rate changing device is adapted to change the rate of flow of the pressurized fluid into the brake cylinder, on the basis of the fluid pressure in the brake cylinder.

(15) A braking system according to any one of the above modes (1)-(14), wherein said flow-rate changing device is operable to change the rate of flow of the pressurized working fluid into said brake cylinder on the basis of an operation-related amount of a manually operable brake operating member.

The flow-rate changing device provided in the braking system according to the above mode (15) permits the braking pressure and the rate of increase of the braking pressure to be controlled according to an operator's desire or requirement relating to a braking operation. In this respect, it is reasonable to change the rate of flow of the pressurized fluid into the brake cylinder on the basis of the operating amount of the brake operating member manually operable by the operator of the braking system. The operating amount of the brake operating member includes an operating force and an operating stroke of the brake operating member, and a combination of the operating force and stroke.

The flow-rate changing device may be arranged to change the rate of flow of the fluid into the brake cylinder on both the braking pressure and the operating amount of the brake operating member.

(16) A braking system according to any one of the above modes (1)-(15), wherein said flow-rate changing device is operable to change the rate of flow of the pressurized working fluid into said brake cylinder on the basis of a pressure of the pressurized working fluid delivered from said power-operated hydraulic pressure source.

(17) A braking system according to any one of the above modes (2)-(15), wherein said flow-rate changing device is operable to change the rate of flow of the pressurized working fluid into said brake cylinder on the basis of a pressure of the pressurized working fluid in said front pressurizing chamber of said hydraulic cylinder.

Where the hydraulic cylinder described above with respect to the above mode (2) and the power-operated hydraulic pressure source cooperate to constitute a hydraulic pressure source device, the fluid pressure in the front pressurizing chamber of the hydraulic cylinder is considered to be the output pressure of the hydraulic pressure source device. The braking pressure is equal to the fluid pressure in the front pressurizing chamber.

Where the master cylinder, the hydraulic booster and the assisting cylinder which have been described above with respect to the above mode (9) cooperate with the power-operated hydraulic pressure source, the fluid pressure in the pressurizing chamber of the assisting cylinder is considered to be the output pressure of the hydraulic pressure source device. The braking pressure is equal to the fluid pressure in the pressurizing chamber of the assisting cylinder.

(18) A braking system comprising:

a power-operated hydraulic pressure source including a power-operated drive source and operable to deliver a pressurized working fluid;

a brake including a brake cylinder operated by the pressurized working fluid delivered from the power-operated hydraulic pressure source; and a pressure-increase changing device operable to change an amount of increase of a pressure of the fluid in the brake cylinder, which amount of increase corresponds to a given operating amount of the power-operated drive source.

In the braking system constructed according to the above mode (18) of this invention, the amount of increase of the fluid pressure in the brake cylinder (braking pressure) corresponding to a given operating amount of the power-operated drive source of the power-operated hydraulic pressure source can be changed.

The operating amount of the power-operated drive source is an operating amount of an output member of the power-operated drive source. Where the power-operated drive source is an electric motor, for example, the operating amount of the power-operated drive source may be represented by the operating amount of an output member of a motion converting device adapted to convert a rotary motion of the electric motor into a linear movement of that output member. Alternatively, the operating amount of the power-operated drive source may be represented by the operating amount of the output shaft of the electric motor. Thus, the output member whose operating amount represents the operating amount of the power-operated drive source may be either rotated or linearly moved when the power-operated drive source is operated.

The operating amount of the output member indicated above is an amount of change of the operating position of the output member, but may be represented by an amount of change of the operating position per unit time, that is, a rate of change of the operating position. Where the output member is a rotary member, the operating amount may be represented by a cumulative number of revolutions of the rotary member or the number of the revolutions per unit time, that is, the rotating speed of the rotary member. Where the power-operated drive source is an electric motor, the operating amount may be represented by the cumulative number of revolutions of the output shaft of the electric motor or the rotating speed, even where the rotary motion of the output shaft is converted into a linear motion of the output member of a motion converting device.

The pressure of the pressurized working fluid delivered from the power-operated hydraulic pressure source can be controlled by controlling the amount of electric power to be supplied to the power-operated drive source. The amount of electric power may be controlled on the basis of an amount of operation of the output member of the drive source, or an operating force acting on the output member.

The braking system according to the above mode (18) may incorporate the technical feature according to any one of the above modes (1)-(17).

(19) A braking system according to the above mode (18), wherein the power-operated hydraulic pressure source comprises a hydraulic cylinder including (a) a housing, and (b) a pressurizing piston fluid-tightly and slidably fitted in the housing, partially defining a front pressurizing chamber on a front side thereof and advanced by an operation of the power-operated hydraulic pressure source, the hydraulic cylinder being operable to supply the brake cylinder with the pressurized working fluid delivered from the front pressurizing chamber as the pressurizing piston is advanced.

In the braking system according to the above mode (19), the pressurizing piston is advanced. The pressurizing piston may be advanced by an advancing movement of the output member of the motion converting device described above with respect to the above mode (18), or by an advancing movement of an output member of a force transmitting device which will be described with respect to the following modes (21)-(23).

(20) A braking system according to the above mode (19), wherein the pressure-increase changing device is operable to change an operating amount of the pressurizing piston corresponding to the given operating amount of the power-operated drive source of the power-operated hydraulic pressure source.

In the braking system according to the above mode (20), the rate of flow of the pressurized fluid into the brake cylinder is changed, for example, by changing the operating amount of the pressurizing piston of the hydraulic cylinder corresponding to the given operating amount of the power-operated drive source of the hydraulic pressure source.

The operating amount of the pressurizing piston is desirably changed such that the operating amount is larger when the operating stroke of the pressurizing piston is relatively small than when the operating stroke is relatively large.

(21) A braking system according to the above mode (19), wherein the power-operated hydraulic pressure source includes the power-operated drive source, the hydraulic cylinder and a force transmitting device disposed between the power-operated drive device and the hydraulic cylinder, and wherein the pressure-increase changing device includes
  a transmitting-manner changing portion operable to change a manner of transmitting a force from the power-operated drive source to the pressurizing piston of the hydraulic cylinder, for changing an operating amount of the pressurizing piston corresponding to the given operating amount of the power-operated drive source, to thereby change a rate of flow of the pressurizing working fluid from the front pressurizing chamber into the brake cylinder.

By changing the manner in which the force is transmitted from the power-operated drive source to the pressurizing piston of the hydraulic cylinder, the operating amount of the pressurizing piston corresponding to a given operating amount of the drive source can be changed to change the rate of flow of the fluid from the front pressurizing chamber into the brake cylinder, which rate of flow corresponds to the given operating amount of the drive source.

The operating force of the pressurizing piston is usually changed when the operating amount is changed. The force is usually transmitted from the power-operated drive source to the pressurizing piston of the hydraulic cylinder such that a workload of the drive source is equal to a workload of the hydraulic cylinder. In this case, the operating force of the pressurizing piston is larger when its operating amount is relatively large than when it is relatively small.

(22) A braking system according to the above mode (21), wherein the power-operated drive source is an electric motor including an output shaft, and the force transmitting device includes:
  a rotary motion transmitting device including an output shaft and operable to convert a rotary motion of an output shaft of the electric motor into a rotary motion of the output shaft of the rotary motion transmitting device such that a rotating speed of the output shaft of the rotary motion transmitting device is different from that of the output shaft of the electric motor; and
  a motion converting device operable to convert the rotary motion of the output shaft of the rotary motion transmitting device into a linear motion of the pressurizing piston.

The rotary motion transmitting device is arranged to change a ratio of the rotating speed of the input shaft of the motion converting device (equal to the rotating speed of the output shaft of the rotary motion transmitting device) to the rotating speed of the output shaft of the electric motor (equal to the rotating speed of the input shaft of the rotary motion transmitting device). By changing this speed ratio, the rotating speed of the input shaft of the motion converting device corresponding to a given operating speed of the output shaft of the electric motor can be changed. By changing the rotating speed of the input shaft of the motion converting device, the speed of movement of the pressurizing piston of the hydraulic cylinder can be changed, to change the rate of flow of the pressurized fluid from the front pressurizing chamber of the hydraulic cylinder into the brake cylinder. The rotary motion transmitting device is one form of a device operable to change a rate of increase of the fluid pressure in the brake cylinder, and may be considered to be a rotary motion transmitting device of variable speed ratio type.

The rotary motion transmitting device may include a first elliptical gear rotatable with the output shaft of the electric motor, and a second elliptical gear provided on the side of the input shaft of the motion converting device. The speed ratio of the first and second elliptical gears is changed by changing a state of engagement of the two elliptical gears, as described in detail in the DETAILED DESCRIPTION OF THE PREFERRED EMBODIMENTS.

The rotary motion transmitting device may include a speed-ratio changing device including a first pulley rotatable with the output shaft of the electric motor, a second pulley provided on the side of the input shaft of the motion converting device, and a belt connecting the first and second pulleys. The speed-ratio changing device is arranged to change a ratio of effective diameters of the first and second pulleys at which the belt engages these pulleys. By changing the ratio of the effective diameter of the second pulley to that of the first pulley, the rotating speed of the second pulley corresponding to a given rotating speed of the first pulley can be changed.

(23) A braking system according to the above mode (21), wherein the power-operated drive source is an electric motor having an output shaft, and the force transmitting device includes a motion converting device including an output shaft and operable to convert a rotary motion of the output shaft of the electric motor into a linear motion of the output shaft of the motion converting device; and a link mechanism operable to transmit the linear motion of the output shaft of the motion converting device to the pressurizing piston of the hydraulic cylinder such that a speed of the linear motion of the output shaft of the motion converting device is different from a speed of the linear motion of the pressurizing piston.

By changing the ratio of the speed of movement of the pressurizing piston to that of the output shaft of the motion converting device, the speed of movement of the pressurizing piston corresponding to a given speed of movement of the output shaft can be changed. The link mechanism is preferably arranged such that the speed of movement of the pressurizing piston is higher when the operating stroke of the pressurizing piston is relatively small than when it is relatively large. The link mechanism is one form of a device operable to change the rate of increase of the fluid pressure in the brake cylinder.

(24) A braking system according to the above mode (19), wherein the pressurizing piston partially defines a rear pressure chamber on a rear side thereof, and the pressure-increase changing device includes a communication switching device having a first state in which the rear pressure chamber is communicated with the front pressurizing chamber, and a second state in which the rear pressure chamber is isolated from the front pressurizing chamber.

In the braking system according to the above mode (24), the pressurizing piston receives both a force based on the fluid pressure in the rear pressure chamber and a force received from the power-operated drive source (electric motor). The pressurizing piston is advanced by a sum of these two forces, so that the pressurized fluid is supplied from the front pressurizing chamber into the brake cylinder, to increase the pressure of the fluid in the brake cylinder.

The amount of increase of the fluid pressure in the brake cylinder corresponding to a given operating amount of the pressurizing piston is larger when the rear pressure chamber is isolated from the front pressurizing chamber than when the rear pressure chamber is communicated with the front pressurizing chamber.

(25) A braking device according to the above mode (24), further comprising a low-pressure source for storing the working fluid at a pressure substantially equal to an atmospheric level, and wherein the communication switching device is operable to isolate the rear pressure chamber from the front pressurizing chamber and communicate the ear pressure chamber with the low-pressure source.

In the braking system according to the above mode (25), the fluid pressure in the rear pressure chamber is held at a level substantially equal to the atmospheric pressure while the rear pressure chamber is held in communication with the low-pressure source.

(26) A braking device according to the above mode (24), further comprising a master cylinder system including a master cylinder operable to pressurize the working fluid according to an operation of a manually operable brake operating member, and wherein the communication switching device is operable to isolate the rear pressure chamber from the front pressurizing chamber and communicate the rear pressure chamber with the maser cylinder system.

In the braking system according to the above mode (26), the pressurizing piston of the hydraulic cylinder receives a force based on the fluid pressure in the master cylinder system, while the rear pressure chamber is in communication with the master cylinder system.

(27) A braking system according to the above mode (25), further comprising a master cylinder system comprising a master cylinder including a pressuring piston which partially defines a front pressurizing chamber on a front side thereof, the master cylinder being operable to pressurize the working fluid in the front pressurizing chamber according to an operation of a manually operable brake operating member, and wherein the master cylinder system further comprises a stroke simulator including a housing, a simulator piston which is fluid-tightly and slidably fitted in the housing and which cooperates with the housing to define two variable-volume chambers, and biasing means biasing the simulator piston in a direction that causes a volume of one of the two variable-volume chambers to decrease, the one variable-volume chamber being connected to the front pressurizing chamber of the master cylinder, and wherein the communication switching device is operable to isolate the rear pressure chamber from the front pressurizing chamber of the hydraulic cylinder and communicate the rear pressure chamber with the other of the two variable-volume chambers of the stroke simulator.

(28) A braking system according to any one of the above modes (24)-(27), wherein the communication switching device includes an electromagnetic control valve provided in a fluid passage connecting the rear pressure chamber and the front pressurizing chamber of the hydraulic cylinder, the electromagnetic control valve being electrically switched between an open state for fluid communication between the rear pressure chamber and the front pressurizing chamber of the hydraulic cylinder, and a closed state for isolation of the rear pressure chamber and the front pressurizing chamber of the hydraulic cylinder from each other.

The communication switching device may include any electromagnetic control valve other than the control valve provided according to the above mode (28). For instance, the communication switching device includes an electromagnetic control valve provided in a fluid passage connecting the rear pressure chamber and front pressurizing chambers of the hydraulic cylinder, and an electromagnetic control valve provided in a fluid passage connecting the rear pressure chamber and the master cylinder system.

(29) A braking system comprising:

a hydraulic pressure source device including a hydraulic pressure control device and operable to deliver a controlled pressurized working fluid;

a brake including a brake cylinder operated by the pressurized working fluid delivered from the hydraulic pressure source device; and a pressure-increase changing device operable to change an amount of increase of a pressure in the brake cylinder, which amount of increase corresponds to a given amount of change of a control value of the hydraulic pressure control device.

The hydraulic pressure source device may include a power-operated hydraulic pressure source operable to deliver a pressurized working fluid by operation of a power-operated drive source, or a master cylinder operable to deliver a pressurized working fluid whose pressure corresponds to an operating amount of a manually operable brake operating member. In either of these cases, the braking system according to the above mode (29) may incorporate the technical feature according to any one of the above modes (1)-(28).

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIGS. 2A and 2B are schematic views of a linear valve included in the braking system of FIG. 1;

FIG. 10 is a view indicating two control states established by the hydraulic pressure control device;

FIG. 16 is a view indicating two control states established by a hydraulic pressure control device in the braking system of FIG. 14;

FIG. 19 is a view indicating two control states established by a hydraulic pressure control device in the braking system of FIG. 17;

FIG. 22 is a view indicating three control states established by a hydraulic pressure control device in the braking system of FIG. 20;

FIG. 31 is a view indicating two control states established by a hydraulic pressure control device in the braking system of FIG. 30;

FIG. 33 is a view indicating two control states established by a hydraulic pressure control device in the braking system of FIG. 32.

DETAILED DESCRIPTION OF TBE PREFERRED EMBODIMENTS

Referring to FIGS. 1-10, a braking system according to a first embodiment of this invention will be described.

Figure 1:
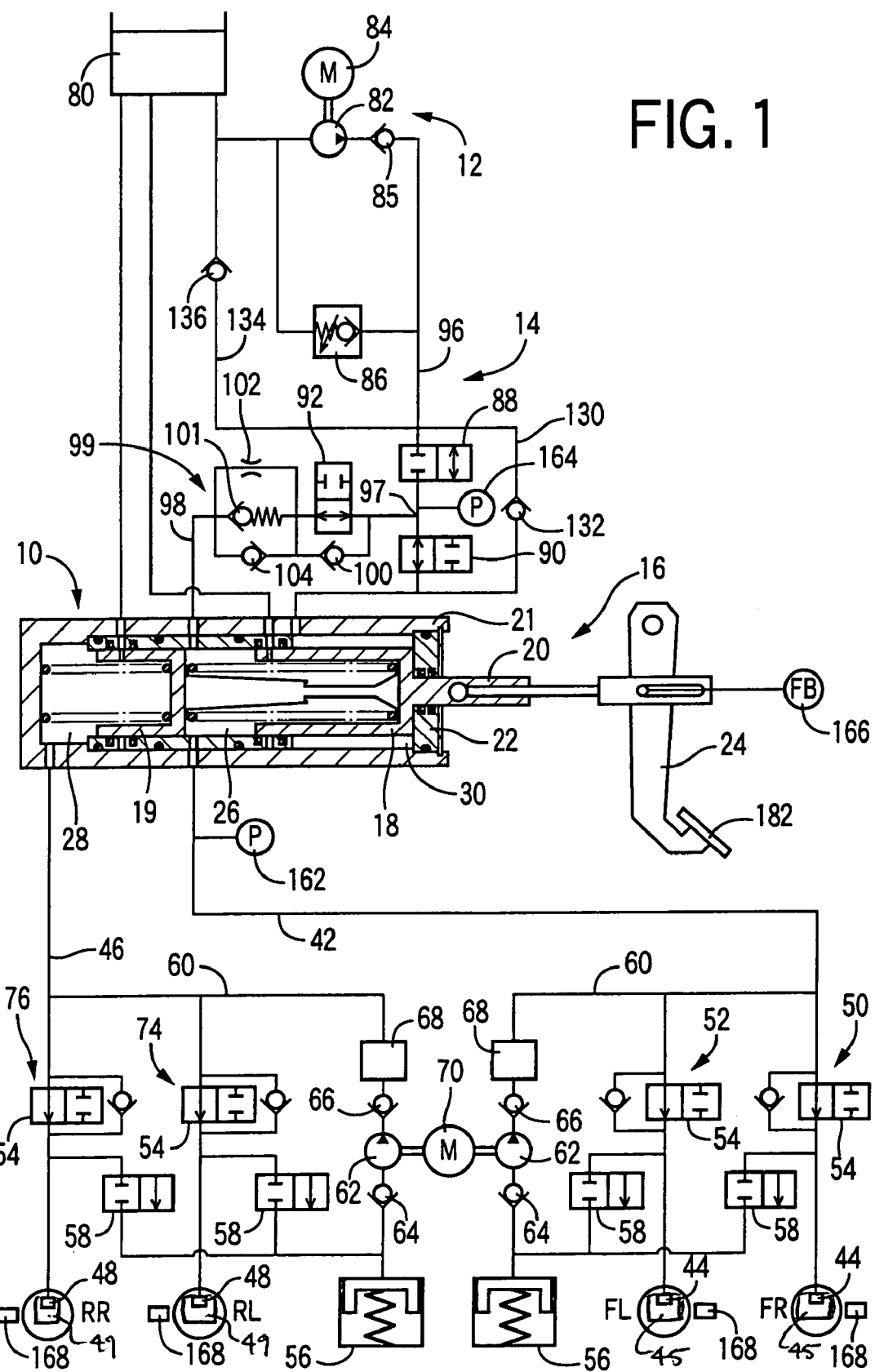
FIG. 1 is a hydraulic circuit diagram of a braking system constructed according to one embodiment of this invention.

In FIG. 1, reference signs 10, 12 and 14 denote a master cylinder, a pump device and a hydraulic pressure control device, respectively. These master cylinder 10, pump device 12 and hydraulic pressure control device 14 constitute a major portion of a hydraulic pressure source device 16. This hydraulic pressure source device 16 delivers a pressurized working fluid whose pressure has been controlled by the hydraulic pressure control device 14.

The master cylinder 10 includes two pressurizing pistons 18, 19 arranged in series with each other. The rear pressurizing piston 18 is provided with an assisting piston 20, which fluid-tightly and slidably extends through a closure member 22 fixed at an open end of a cylinder housing 21. The assisting piston 20 is operatively connected at its rear end to a manually operable brake operating member in the form of a brake pedal 24. In the present embodiment, the rear pressurizing piston 18 and the assisting piston 20 are formed integrally with each other. The two pressurizing pistons 18, 19 cooperate with the cylinder housing 21 to define two front pressurizing chambers 26, 28 on the front side of the respective pistons 18, 19, while the rear pressurizing piston 18 cooperates with the cylinder housing 21 to define a rear pressure chamber 30 on the rear side of the piston 18. The assisting piston 20 may be considered to be a part of the pressurizing piston 18.

To the first pressurizing chamber 26, there are connected through a fluid passage 42 two brake cylinders 44 provided for braking two front wheels FL, FR of an automotive vehicle. To the second pressurizing chamber 28, there are connected through a fluid passage 46 two brake cylinders 48 provided for braking two rear wheels RL, RR.

Two pressure control valve devices 50, 52 are provided for the respective front wheel brake cylinders 44. Each of these pressure control valve devices 50, 52 includes a pressure-holding valve 54 disposed between the corresponding brake cylinder 44 and the first pressurizing chamber 26, and a pressure-reducing valve 58 disposed between the corresponding brake cylinder 44 and a reservoir 56. A pump passage 60 is connected at its one end to the reservoir 56, and is provided with a pump 62, check valves 64, 66 and a damper 68. The pump 62 pressurizes the fluid received from the reservoir 56, so that the pressurized fluid is delivered to the fluid passage 42. The pump 62 is driven by a pump motor 70, Similarly, two fluid pressure control valve devices 74, 76 are provided for the respective rear wheel brake cylinders 48. These valve devices 74, 76 are identical with the valve devices 50, 52 provided for the front wheel brake cylinders 44. The rear wheel brake cylinders 48 are connected to another reservoir 56, which is connected through another pump passage 50 to another pump 62, which is driven by the pump motor 70. The pump passage 60 for the rear wheel brake cylinders 48 is also provided with check valves 64, 66 and damper 68. Thus, the rear brake-application sub-system for the rear wheels RL, RR is identical in construction with the front brake-application sub-system for the front wheels FL, FR.

The pump device 12 includes a pump 82 provided to pressurize the fluid received from a reservoir 80, and an electric motor 84 to drive the pump 82. The maximum delivery pressure and flow rate of the pump device 12 are determined by the capacities of the pump 82 and the pump motor 84. A check valve 85 is provided on the delivery side of the pump 82, to inhibit a flow of the fluid back into the pump 82. The hydraulic pressure control device 14 includes a linear valve 86, and a plurality of electromagnetic control valves 86, 88, 90, 92. The linear valve 86 is capable of controlling a fluid pressure difference across this linear valve 86, according to an amount of electric current applied thereto.

The pump 82 is connected on its delivery side to the rear pressure chamber 30 of the master cylinder 10 through a fluid passage 96, which is provided with the two electromagnetic control valves 88, 90 arranged in series with each other. A fluid passage 98 is connected at its one end to the first pressurizing chamber 26 and at the other end to a portion of the fluid passage 96 between the two control valves 88, 90. The fluid passage 98 is provided with the electromagnetic control valves 92 and a flow restricting device 99 arranged in series with each other. A check valve 100 is provided in parallel connection with the control valve 92. This check valve 100 permits a flow of the fluid in a direction from the pressurizing chamber 26 toward a point of connection 97 of the fluid passage 98 to the fluid passage 96, but inhibits a flow of the fluid in the reverse direction. The flow restricting device 99 includes a pressure relief valve 101, an orifice 102 and a check valve 104 which are in parallel connection with each other. The pressure relief valve 101 permits a flow of the fluid from the pressurizing chamber 26 toward the point of connection 97 when the fluid pressure in the pressurizing chamber 26 becomes higher than that at the point of connection 97 by a preset valve opening pressure (preset relief pressure). The check valve 104 permits a flow of the fluid in a direction from the point of connection 97 toward the pressurizing chamber 26 but inhibits a flow of the fluid in the reverse direction.

The linear valve 86 includes a seating valve 114, a spring 116, and a solenoid device 120, as shown in FIGS. 2A and 2B. The seating valve 114 includes a valve member 110 and a valve seat 112, and the spring 116 biases the valve member 110 in a direction away from the valve seat 112. The solenoid device 120 includes a coil 118 and is operable to generate an electromagnetic force F1 corresponding to an amount of electric current applied to the coil 118.

While the coil 18 is in the de-energized state, the linear valve 86 is placed in an open state in which the valve member 110 is held apart from the valve seat 112 under a biasing force F3 of the spring 116, as indicated in FIG. 2A.

While the coil 18 is in the energized state with an electric current applied thereto, the electromagnetic force F1 corresponding to the amount of electric current acts on the valve member 110 in a direction that causes the valve member 110 to be seated on the valve seat 112. The position of the valve member 110 relative to the valve seat 112 is determined by a relationship among the electromagnetic force F1, a force F2 based on a difference between the fluid pressures in the rear pressure chamber 30 and the reservoir 80, and the biasing force F3 of the spring 116. The forces F1-F3 are indicated in FIG. 2B, which shows the linear valve 86 placed in the closed state. Thus, the fluid pressure in the rear pressure chamber 30 can be controlled by controlling the amount of electric current to be applied to the coil 118.

To the rear pressure chamber 30, there is also connected a by-pass passage 130 which by-passes the two electromagnetic control valves 88, 90. The by-pass passage 130 is provided with a check valve 132 which permits a flow of the fluid in a direction from the reservoir 80 toward the rear pressure chamber 30, but inhibits a flow of the fluid in the reverse direction. Another by-pass passage 134 which by-passes the linear valve 86 is provided with a check valve 136 which permits a flow of the fluid in a direction from the reservoir 80 toward the rear pressure chamber 30 but inhibits a flow of the fluid in the reverse direction. These check valves 132, 136 prevents the fluid pressure in the rear pressure chamber 30 from being lowered below the atmospheric level.

Each of the electromagnetic control valves 88, 90, 92 is a solenoid-operated shut-off valve which is opened and closed by energizing and de-energizing its solenoid coil. In the present embodiment, the shut-off valve 88 is a normally closed valve which is held in the closed state when the solenoid coil is in the de-energized state, while the shut-off valves 90, 92 are normally open valves which are held in the open state when their solenoid coils are in the de-energized state.

Figure 3:
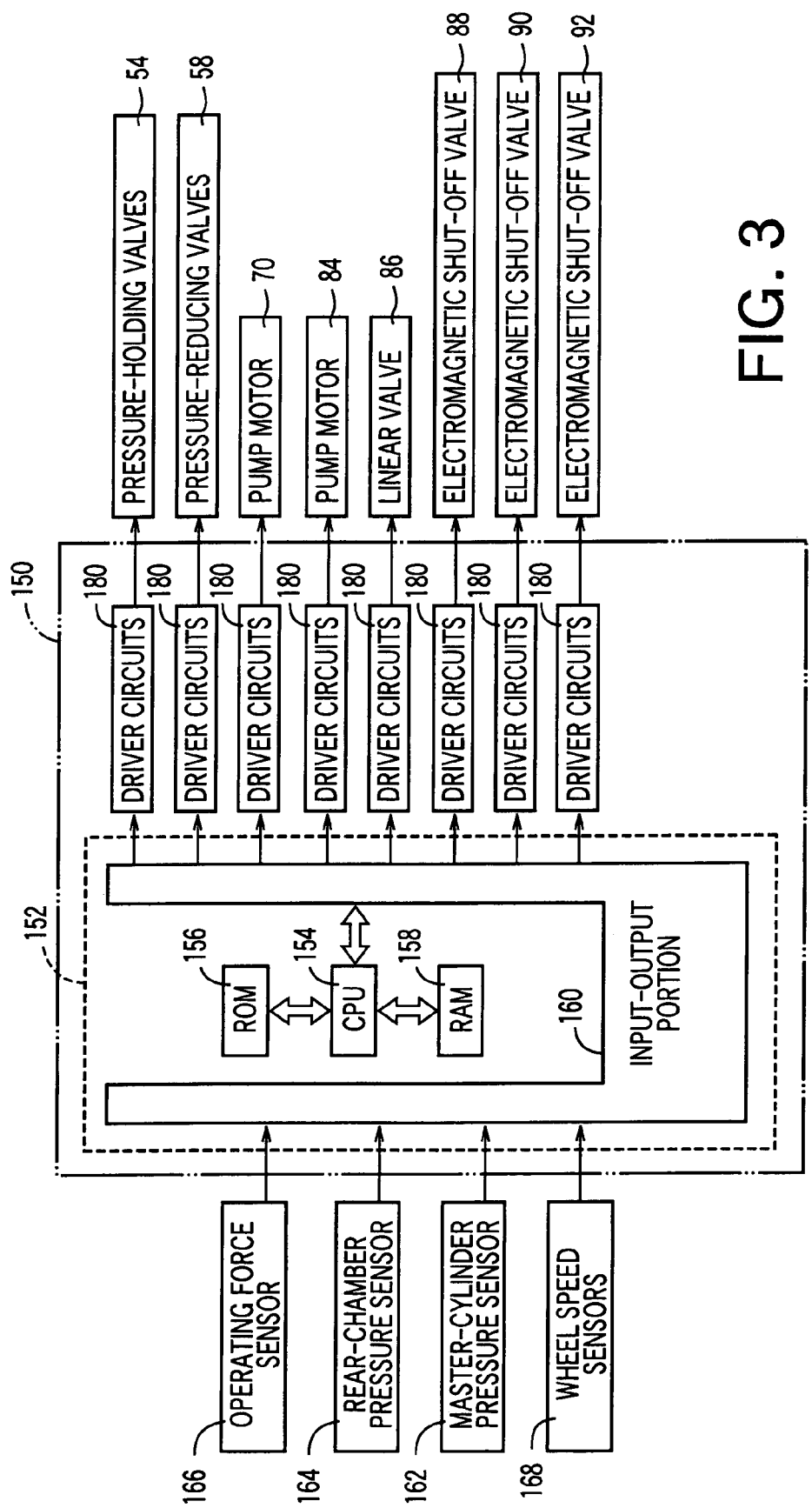
FIG. 3 is a block diagram showing a hydraulic pressure control device included the braking system of FIG. 1.

The present hydraulically operated braking system is controlled by an electronic control unit (hereinafter referred to as "brake control ECU") 150 indicated in the block diagram of FIG. 3. The brake control ECU 150 includes a control portion 152 principally constituted by a computer, and a plurality of driver circuits 180. The control portion 152 incorporates a central processing unit (CPU) 154, a read-only memory (ROM) 156, a random-access memory (RAM) 158, and an input-output portion 160. To the input-output portion 160, there are connected a pressure sensor 162 for detecting the fluid pressure in the fluid passage 42 connected to the first pressurizing chamber 26, a rear-chamber pressure sensor 164 for detecting the fluid pressure in the rear pressure chamber 30, an operating force sensor 166 for detecting an operating force acting on the brake pedal 24 during its operation by the vehicle operator, and wheel speed sensors 168 for detecting the rotating speeds of the respective wheels FL, FR, RL, RR. To the input-output portion 160, there are also connected the above-indicated driver circuits 180 for controlling the amounts of electric current to be applied to the pump motors 70, 84, the coil 118 of the linear valve 86, and the coils of the pressure-holding valves 54, pressure-reducing valves 58 and electromagnetic shut-off valves 88-92. In the present embodiment, the brake operating force applied to a pedal pad 182 of the brake pedal 24 is detected on the basis of the output signal of the operating force sensor 166. The output signal of the pressure sensor 162 represents the fluid pressure in the master cylinder 10, which is an output pressure of the hydraulic pressure source device 16. While the pressure control valve devices 50, 52, 74, 76 for the wheel brake cylinders 44, 48 are placed in their original positions of FIG. 1, the output pressure of the hydraulic pressure source device 16 is applied to the wheel brake cylinders 44, 48, without being controlled by the pressure control valve devices 88-92, so that the fluid pressure in the wheel brake cylinders 44, 48 (hereinafter referred to as "braking pressure" where appropriate) is equal to the output pressure of the hydraulic pressure source device 16. In this respect, the fluid pressure detected by the pressure sensor 162 (master-cylinder pressure sensor) may be considered to be the braking pressure.

There will next be described an operation of the braking system constructed as described above.

When the brake pedal 24 is operated, the electromagnetic shut-off valves 88, 90 are both placed in the open state, while the electromagnetic shut-off valve 92 is placed in the closed state. Namely, the hydraulic pressure control device 14 is placed in a first state as indicated in the table of FIG. 10. In this first state, the pressurizing piston 18 receives both the assisting force based on the fluid pressure in the rear pressure chamber 30 and the operating force of the brake pedal 24, so that the pressurizing piston 18 is advanced by a sum of these forces. The pressurized fluid is delivered from the two pressurizing chambers 26, 28 to the wheel brake cylinders 44, 48 as the pressurizing pistons 26, 28 are advanced. The fluid pressure in the pressurizing chamber 26 corresponds to the sum of the above-indicated two forces, and the fluid pressure in the pressurizing chamber 28 is equal to that in the pressurizing chamber 26.

Figure 4:
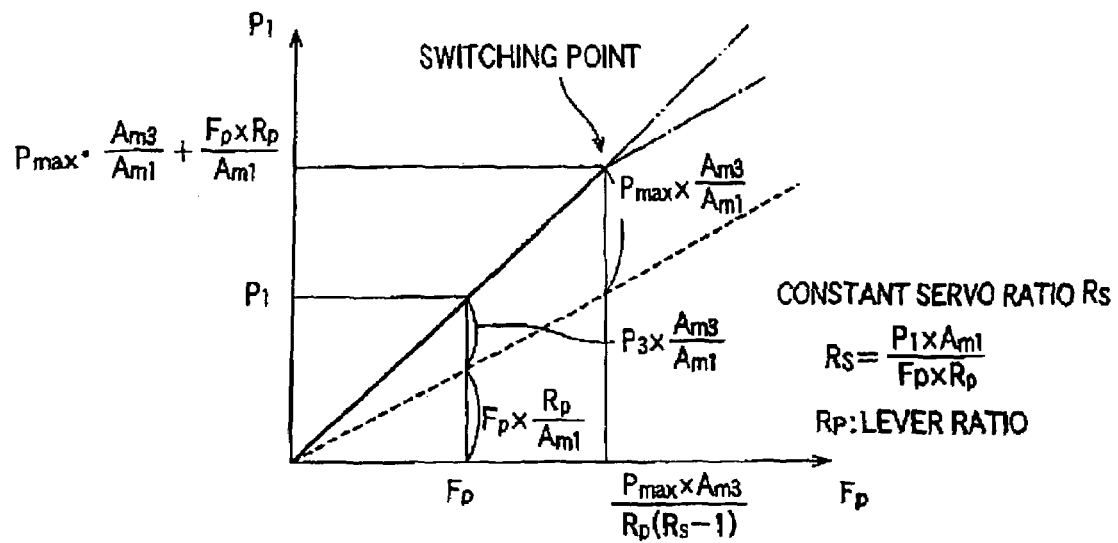
FIG. 4 is a graph indicating a relationship between a brake operating force and an output pressure of a power-operated hydraulic pressure source device, which relationship is controlled by the hydraulic pressure control device of FIG. 3.

The fluid pressure P3 in the rear pressure chamber 30 is controlled such that a servo ratio $R_S$ which is a ratio of the input force $F_P$ applied to the pressurizing piston 18 to the output force of the pressurizing piston 18 is held constant, as indicated in the graph of FIG. 4.

When the pressurized fluid is delivered at a flow rate q from the pump device 12 to the rear pressure chamber 30, a rate of flow q' of the fluid from the pressurizing chamber 26, 28 to the wheel brake cylinders 44, 48 is represented by the following equation:

$$q' = q \cdot A_{m1}/A_{m3}$$

In the above equation, $A_{m1}$ and $A_{m3}$ represent pressure-receiving surface areas of the pressurizing piston 18 which partially define the pressurizing chamber 26 and the rear pressure chamber 30, respectively. The fluid pressure in the wheel brake cylinders 44, 48 is increased at a gradient corresponding to the flow rate q'.

In the present embodiment, the amount of supply of the fluid to the wheel brake cylinders 44, 48 is interpreted to mean a sum of the fluid amounts supplied to the four wheel brake cylinders 44, 48. When the pressure control valve devices 50, 52, 74, 76 are placed in the original positions of FIG. 1, the total amount of the pressurized fluid delivered from the pressurizing chambers 44, 48 is equal to the total amount of the fluid flow into the wheel brake cylinders 44, 48 for the four wheels FL, FR, RL, RR. Therefore, the total amount of supply of the fluid to the four wheel brake cylinders 44, 48 is represented by the sum of the fluid flows into these wheel brake cylinders 44, 48, and the total amount of delivery of the fluid from the two pressurizing chambers 26, 28 is represented by the sum of the discharge fluid flows from these pressurizing chambers 26, 28.

Figure 5:
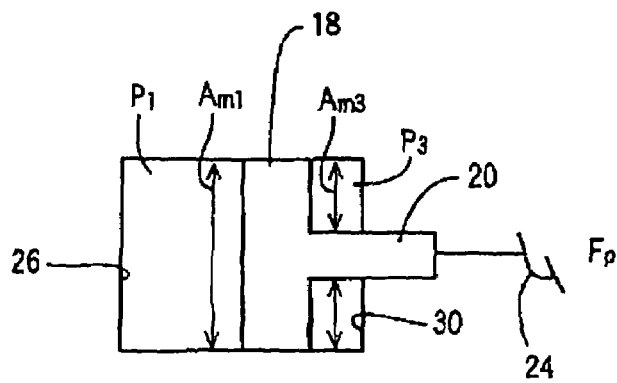
FIG. 5 is a schematic view of a master cylinder included in the power-operated hydraulic pressure source device.

The fluid pressure $P_1$ in the pressurizing chambers 26, 28 is represented by the following equation (1), as indicated in FIG. 5.

$$P_1 \times A_{m1} = P_3 \times A_{m3} + F_P \times R_P \qquad (1)$$

While the pressure control valve devices 50, 52, 74, 76 are placed in their original positions of FIG. 1, the fluid pressure in each wheel brake cylinder 44, 48 is equal to the fluid pressure in the pressurizing chambers 26, 28.

The fluid pressure in the rear pressure chamber 30 cannot be raised above the maximum delivery pressure of the pump device 12. In view of this fact, the servo ratio $R_S$ is reduced as indicated by one-dot chain line in FIG. 4 after the fluid pressure in the rear pressure chamber has been raised to the maximum delivery pressure. When the brake pedal 24 is placed in the non-operated position, the fluid pressure in the pressurizing chambers 26, 28 is held constant as indicated by one-dot chain line in FIG. 7. Therefore, the present embodiment is adapted such that when the fluid pressure in the rear pressure chamber 30 is detected to be equal to the maximum delivery pressure of the pump device 12, the rear pressure chamber 30 is isolated from the pump device 12, and the pressurizing chamber 26 is communicated with the pump device 12, so that the fluid pressurized by the pump device 12 is delivered to the pressurizing chamber 26.

The fluid pressure $P_1$ detected when the fluid pressure $P_3$ in the rear pressure chamber 30 has been raised to the maximum delivery pressure of the pump device 12 is represented by the following equation which is obtained by substituting the maximum delivery pressure $P_{max}$ for the fluid pressure $P_3$ in the above equation (1):

$$P_1 = P_{max} \cdot A_{m3}/A_{m1} + F_P \cdot R_P/A_{m1}$$

In the above equation, "$R_P$" represents a lever ratio of the brake pedal 24. It will be understood that the fluid pressure $P_3$ in the rear pressure chamber 30 has been raised to the maximum delivery pressure $P_{max}$ when the detected fluid pressure $P_1$ has been increased to the value represented by the above equation, that is, to a switching pressure $P_{1S} = P_{max} \cdot A_{m3}/A_{m1} + F_P \cdot R_P/A_{m1}$. Since the fluid pressure $P_1$ detected by the pressure sensor 162 is equal to the braking pressure $P_{WC}$ (in the wheel brake cylinders 44, 48) when the pressure control valves 50, 52, 74, 76 are placed in the original positions of FIG. 1, as described above, the fluid pressure $P_3$ in the rear pressure chamber 30 has been raised to the maximum delivery pressure $P_{max}$ when the braking pressure $P_{WC}$ has reached the switching pressure $P_{1S}$.

When the fluid pressure $P_3$ in the rear pressure chamber 30 is controlled with the servo ratio $R_S$ kept constant, the operating force $F_P$ when the fluid pressure $P_3$ has been raised to the maximum delivery pressure $P_{max}$ is represented by the following equation:

$$F_P = P_{max} \times A_{m3}/\{R_P(R_S-1)\}$$

As in the above case, the fluid pressure $P_3$ in the rear pressure chamber 30 has been raised to the maximum delivery pressure $P_{max}$ when the operating force $F_P$ has been increased to a switching force $F_{PS} = P_{max} \times A_{m3}/\{R_P(R_S-1)\}$ represented by the above equation.

When the fluid pressure $P_1$ detected by the pressure sensor 162 has increased to the switching pressure $P_{1S}$, or when the operating force $F_P$ of the brake pedal 24 has increased to a switching force $F_{PS}$, the electromagnetic shut-off valve 92 is switched to the open state, and the electromagnetic shut-off valve 90 is switched to the closed state. Namely, the hydraulic pressure control device 14 is placed in a second state indicated in FIG. 10. In this second state, the pressurized fluid is delivered from the pump device 12 to the pressurizing chamber 26 through the shut-off valves 99, 92 and the check valve 104. In the present embodiment, the linear valve 86 is controlled in the second state of the hydraulic pressure control device 14, such that the fluid pressure in the pressurizing chamber 26 is controlled as indicated by two-dot chain line in FIG. 4.

In the second state of the hydraulic pressure control device 14, the electromagnetic shut-off valve 90 is placed in the closed state, so that the pressurized fluid in the rear pressure chamber 30 is prevented from being discharged from that chamber 30, to inhibit the retracting movement of the pressurizing piston 18. Accordingly, an increase of the fluid pressure in the pressurizing chamber 26 will not cause the pressurizing piston 18 to be retracted. Therefore, the fluid pressure in the pressurizing chamber 26 can be rapidly raised. If the retracting movement of the pressurizing piston 18 were allowed, the flow of the pressurized fluid from the pump device 12 into the pressurizing chamber 26 would not cause the pressurized fluid to be delivered from the pressurizing chamber 26 into the wheel brake cylinders 44, 48, or would reduce the rate of flow of the pressurized fluid from the pressurizing chamber 26 into the wheel brake cylinders 44, 48, until the pressurizing piston 18 has been moved to its fully retracted position. In the present embodiment wherein the retracting movement of the pressurizing piston 18 is inhibited by the closed shut-off valve 90, the pressurized fluid can be delivered from the pressurizing chamber 26 into the wheel brake cylinders 44, 48 at a comparatively high rate.

When the fluid pressure in the pressurizing chamber 26 has been raised to the maximum delivery pressure $P_{max}$, the fluid pressure in the rear pressure chamber 30 has been increased to a level higher than the maximum delivery pressure $P_{max}$, that is, to a level $\{P_{max} \cdot (A_{m1}/A_{m3})\}$, and the fluid is supplied from the pump device 12 into the rear pressure chamber 30 through the check valve 132 as the operating stroke of the brake pedal 24 is increased.

In the second state of the hydraulic pressure control device 14, the fluid pressure in the pressurizing chamber 26 can be increased to the maximum delivery pressure $P_{max}$ of the pump device 12, so that the fluid pressure in the wheel brake cylinders 44, 48 can be increased to the maximum delivery pressure $P_{max}$. Where the pressurized fluid is delivered from the pump device 12 into the pressurizing chamber 26 at the flow rate q, the rate of flow of the pressurizing fluid from the pressurizing chamber 26 into the wheel brake cylinders 44, 48 is equal to q. According the wheel braking pressure $P_{WC}$ is raised at a gradient corresponding to the flow rate q.

As described above, the rate of flow of the pressurized fluid from the master cylinder 10 into the wheel brake cylinders 44, 48 is higher when the pump device 12 is communicated with the rear pressure chamber 30, than when the pump device 12 is communicated with the pressurizing chamber 26. However, the braking pressure $P_{WC}$ in the wheel brake cylinders 44, 48 is higher when the pump device 12 is communicated with the pressurizing chamber 26, than when the pump device 12 is communicated with the rear pressure chamber 30. The present braking system is designed such that the braking pressure $P_{WC}$ is made higher when the fluid pressurized by the pump device 12 is supplied to the pressurizing chamber 26 than when it is supplied to the rear pressure chamber 30 after the delivery pressure of the pump device 12 has reached its maximum value $P_{max}$. For instance, the braking system is desired so as to satisfy an inequality $\{F_P/P_{max} < (A_{m1} - A_{m3})/R_P\}$.

In the present embodiment, the braking pressure $P_{WC}$ in the wheel brake cylinders 44, 48 can be made higher in the first state of the hydraulic pressure control device 14 than in the second state, even while the brake pedal 24 is in operation with a given value of the operating force $F_P$. However, the values of the braking pressure $P_{WC}$ in the first and second states which will be described are those while the operating force $F_P$ of the brake pedal 24 is zero ($F_P=0$), as indicated in FIG. 10 by way of example.

In the braking system adapted to hold the hydraulic pressure control device 14 in the first state while the fluid pressure $P_1$ detected by the pressure sensor 162 is lower than the switching pressure $P_{1S}$, and switch the hydraulic pressure control device 14 to the second state when the detected fluid pressure has been increased to the switching pressure $P_{1S}$, the fast filling of the wheel brake cylinders 44, 48 can be completed in a relatively short time, and the braking pressure $P_{WC}$ can be controlled with a relatively high control response, in an initial period of a braking operation. Further, the braking pressure $P_{WC}$ can be increased at a relatively high rate, and the delay in the activation of the wheel brake cylinders 44, 48 to provide a braking effect can be reduced. In addition, the braking pressure $P_{WC}$ in the subsequent period of the braking operation can be made relatively high.

Referring to the flow chart of FIG. 9, there will be described a pressure control routine executed by the brake control ECU 150 according to a pressure control program stored in the ROM 156. The table of FIG. 10 indicates the operating states of the electromagnetic shut-off valves 80, 90, 92, the rate of flow $q_{WC}$ of the pressurized fluid into the wheel brake cylinders 44, 48, and the braking pressure $P_{WC}$ in the wheel brake cylinders 44, 48 (when the operating force $F_P$ of the brake pedal 24 is zero).

Figure 9:
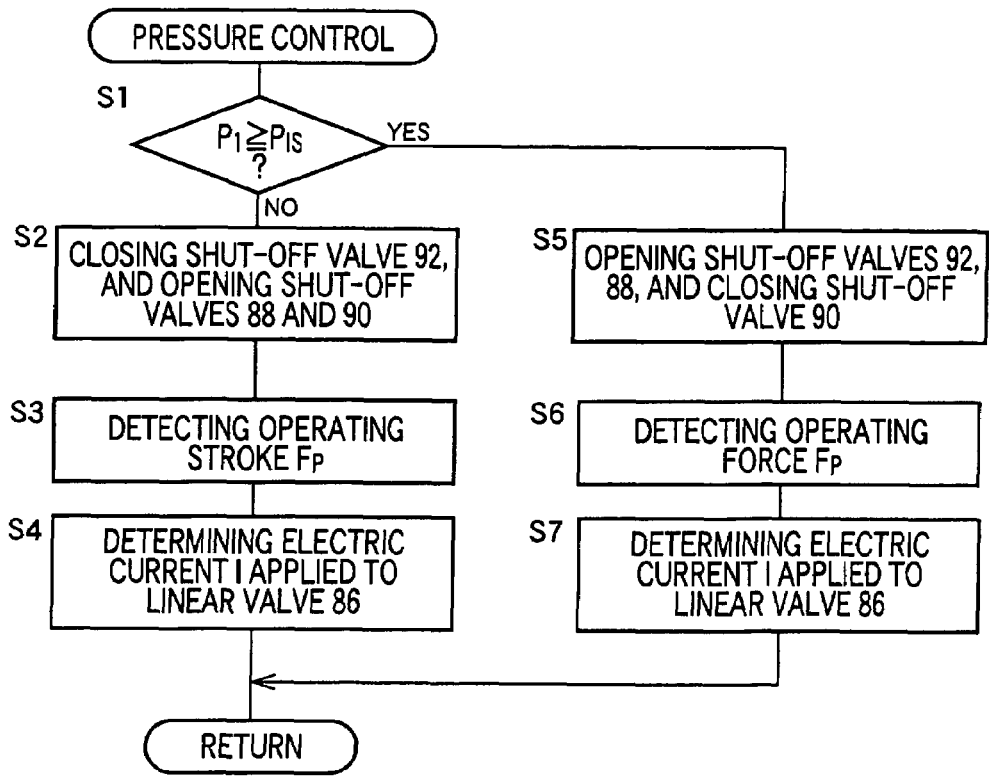
FIG. 9 is a flow chart illustrating a pressure control routine executed according to a pressure control program stored in a ROM of the hydraulic pressure control device.

The pressure control routine of FIG. 9 is initiated with step S1 to determine whether the fluid pressure $P_1$ detected by the pressure sensor 162 is equal to or higher than the switching pressure $P_{1S}$. If the detected fluid pressure $P_1$ is lower than the switching pressure $P_{1S}$, the control flow goes to step S2 to place the hydraulic pressure control device 14 in the first state in which the shut-off valve 92 is placed in the closed state while the shut-off valves 88, 90 are placed in the open state. Step S2 is followed by step S3 to detect the operating force $F_P$ of the brake pedal 24, and step S4 to determine the amount of electric current I to be applied to the linear valve 86. As described above, the linear valve 86 is controlled to control the fluid pressure in the rear pressure chamber 30 such that the servo ratio $R_S$ (the ratio of the input force of the pressurizing piston 18 to its output force) is held constant.

When the pressurized fluid is delivered from the pump device 12 to the rear pressure chamber 30 at the flow rate q, the pressurized fluid is delivered from the pressurizing chambers 26, 28 to the wheel brake cylinders 44, 48 at a flow rate $q_{WC}=(A_{m1}/A_{m3})\cdot q$. When the fluid pressure in the rear pressure chamber 30 is equal to P, the braking pressure $P_{WC}$ is equal to $P\cdot(A_{m3}/A_{m1})$.

When the fluid pressure $P_1$ detected by the pressure sensor 162 has reached the switching pressure control device 14 in the second state in which the shut-off valves 88, 92 are placed in the open state while the shut-off v pressure $P_{1S}$, the control flow goes to step S5 to place the hydraulic valve 90 is placed in the closed state. Step S5 is followed by step S6 to detect the operating force $F_P$, and step S7 to determine the amount of electric current I to be applied to the linear valve 86. When the pressurized fluid is delivered from the pump device 12 to the pressurizing chamber 26 at the flow rate q, the pressurized fluid is delivered from the pressurizing chambers 26, 28 to the wheel brake cylinders 44, 48 at the flow rate $q_{WC}=q$, and the braking pressure $P_{WC}$ is equal to the fluid pressure P in the pressurizing chamber 26.

Figure 6:
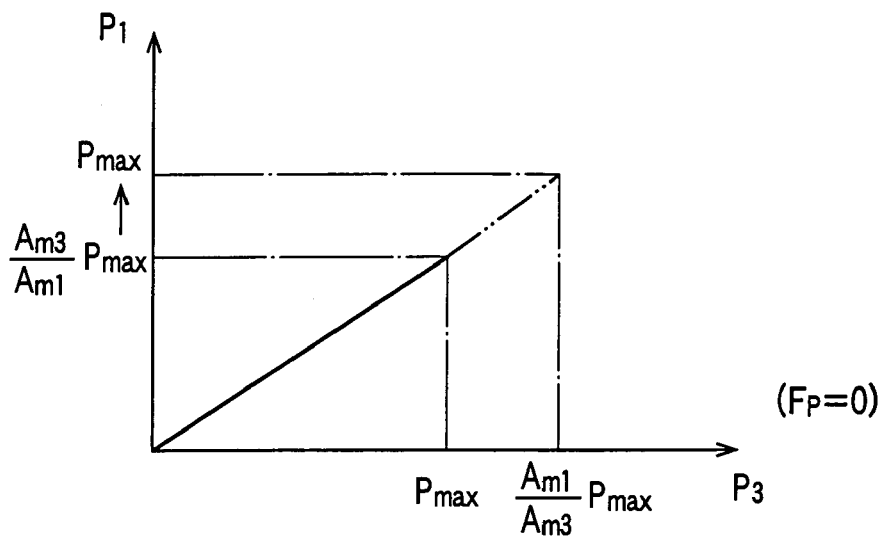
FIG. 6 is a graph indicating a relationship between fluid pressures in rear pressure chamber and front pressurizing chamber of a master cylinder, which relationship is controlled by the hydraulic pressure control device of FIG. 3.
Figure 7:
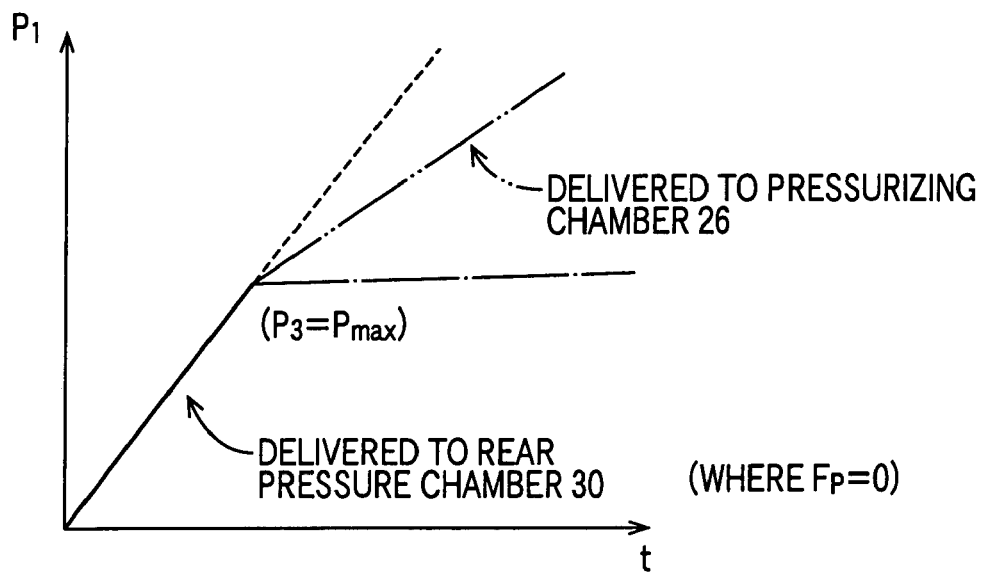
FIG. 7 is a graph indicating a change in the fluid pressure in the pressurizing chamber controlled by the hydraulic pressure control device.
Figure 8:
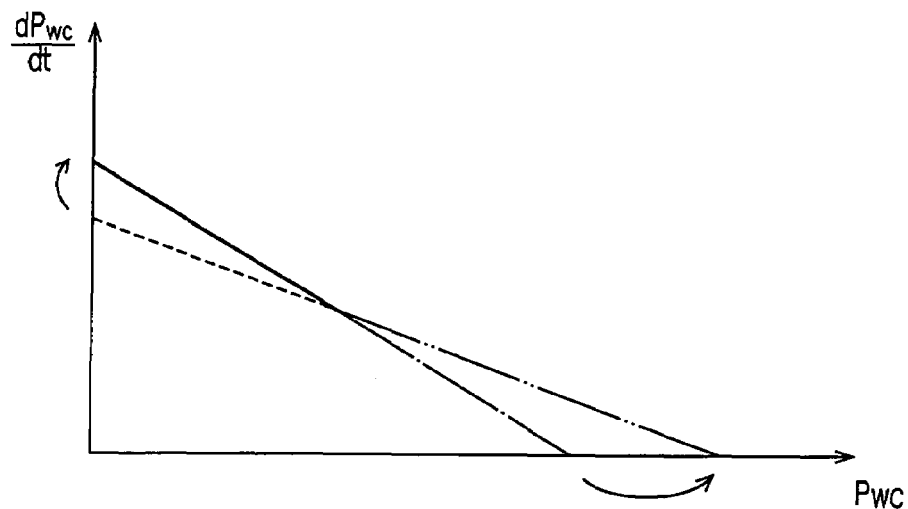
FIG. 8 is a graph indicating a change in a rate of flow of the fluid into brake cylinder, which rate of low is controlled by the hydraulic pressure control device.

In the first state of the hydraulic pressure control device 14, the braking pressure $P_{WC}$ and the rate of increase $dP_{WC}/dt$ of the braking pressure $P_{WC}$ are controlled as indicated by solid lines in FIGS. 6 and 8. In the second state, on the other hand, the braking pressure $P_{WC}$ and the rate of increase of the braking pressure $P_{WC}$ are controlled as indicated by two-dot chain lines in FIGS. 6 and 8. While the pump device 12 is communicated with the rear pressure chamber 30, the braking pressure $P_{WC}$ and its increase rate $dP_{WC}/dt$ are controlled as indicated by one-dot chain line in FIG. 8. While the pump device 12 is communicated with the pressurizing chamber 26, the pressure $P_{WC}$ and rate $dP_{WC}/dt$ are controlled as indicated by broken line in FIG. 8. In the present embodiment, the pressure $P_{WC}$ and rate $dP_{WC}/dt$ are initially controlled as indicated by the one-dot chain line (while the pump device 12 is in communication with the rear pressure chamber 30), and are then controlled as indicated by the broken line (after the pump device 12 has been communicated with the pressurizing chamber 26). According to this arrangement, the braking pressure $P_{WC}$ can be increased at a higher rate in the initial period of a braking operation, and to a higher level in the subsequent period of the braking operation, than in the conventional braking system. Thus, the present braking system is capable of meeting both of a vehicle driver's requirement for a rapid increase of the braking pressure $P_{WC}$ and a vehicle operator's requirement for a large vehicle braking force.

It will be understood from the foregoing description of the present braking system that the pump device 12 constitutes a major portion of a power-operated hydraulic pressure source, and the electromagnetic shut-off valves 88, 90, 92 cooperate with a portion of the brake control ECU 150 assigned to implement steps S2 and S5 of the pressure control routine of FIG. 9, to constitute a flow-rate control device operable to change the rate of flow of the pressurized fluid from the power-operated hydraulic pressure source to the wheel brake cylinders 44, 48. It will also be understood that the flow-rate control device includes a switching device operable to place the hydraulic pressure control device 14 selectively in one of the first and second states, that is, to deliver the pressurized fluid from the power-operated hydraulic pressure source selectively to one of the pressurizing chamber 26 having the pressure-receiving surface area $A_{m1}$ and the rear pressure chamber 30 having the pressure-receiving surface area $A_{m3}$ smaller than the surface area $A_{m1}$. The linear valve 86 may be considered to be a part of the power-operated hydraulic pressure source. In this case, the rate of increase of the braking pressure $P_{WC}$ can be considered to be changed between two values corresponding to the first and second states of the hydraulic pressure control device 14, when the amount of electric current I applied to the linear valve 86 (power-operated hydraulic pressure source) is held constant.

When the brake pedal 24 is released, the solenoid coils of the shut-off valves 88, 90, 92 and the linear valve 86 are de-energized, so that the shut-off valves 88, 90, 92 are returned to their original positions of FIG. 1, and the linear valve 86 is placed in the open state. The pressurized fluid in the wheel brake cylinders 44, 48 is returned to the reservoir 80 through the pressurizing chambers 26, 28, while the pressurized fluid in the rear pressure chamber 30 is returned to the reservoir 80 through the shut-off valves 90, 92 in the open state, the check valve 104 and the pressurizing chamber 26.

When the electric system becomes defective, too, the shut-off valevs88, 90, 92 are returned to their original position. For instance, the electric system is defective in its control function, if $F_P/P_1$ is larger than $A_{m1}/(R_P\cdot R_S)$, while the fluid pressure in the rear pressure chamber 30 is controlled so as to maintain the predetermined servo ratio $R_S$. When the electric system is defective, the linear valve 86 is placed in the open state. If the brake pedal 24 is operated in this state, the fluid is supplied from the reservoir 80 to the rear pressure chamber 30 through the check valve 132, so that the fluid pressure in the rear pressure chamber 30 is prevented from being lowered below the atmospheric level. Further, the shut-off valve 88 placed in the closed state 88 prevents the pressurized fluid from being discharged from the pressurizing chamber 26 and rear pressure chamber 30 to the reservoir 80.

Further, the shut-off valve 92 placed in the open state permits the pressurizing chamber 26 and the rear pressure chamber 30 to be held in communication with each other, while preventing the discharge flow of the fluid from the rear pressure chamber 30 to the reservoir 80. The fluid pressure in the pressurizing chamber 26 is increased as the pressurizing piston 18 is advanced. While the fluid pressure in the pressurizing chamber 26 is not higher than the fluid pressure in the rear pressure chamber 30, by more than the predetermined opening pressure of the pressure relief valve 101, the fluid pressurized in the pressurizing chamber 26 is delivered to only the wheel brake cylinders 44. When the difference between the fluid pressures in the chambers 26, 30 becomes large than the predetermined opening pressure of the pressure relief valve 101, the pressurized fluid is delivered from the pressurizing chamber 26 to not only the wheel brake cylinders 44 but also the rear pressure chamber 30k. Accordingly, the rate of flow of the fluid from the pressurizing chamber 26 to the wheel brake cylinders 44 can be made higher while the fluid pressure in the pressurizing chamber 26 is not higher than that in the rear pressure chamber 30 by more than the opening pressure of the pressure relief valve 101, than while the fluid pressure in the chamber 26 is higher than that in the chamber 30 by more than the opening pressure of the pressure relief valve 101.

As indicated above, the fluid pressurized in the pressurizing chamber 26 is delivered to the rear pressure chamber 30 after the fluid pressure in the chamber 26 becomes higher than that in the chamber 30 by more than the opening pressure of the pressure relief valve 101, so that the fluid pressure in the chamber 30 is made almost equal to that in the chamber 26. Thus, the supply of the pressurized fluid from the chamber 26 to the chamber 30 has an effect as if the effective diameter of the pressurizing piston 18 partially defining the pressurizing chamber 26 were increased. Namely, the fluid pressure in the chamber 26 corresponding to a given amount of the operating force of the brake pedal 24 is higher when the fluid pressure in the chamber 30 is higher than the atmospheric level, than when the fluid pressure in the chamber 30 is at the atmospheric level. As described above, a sufficiently large amount of fluid can be supplied to the wheel brake cylinders 44, 48 in an initial period of operation of the brake pedal 24, and the braking pressure $P_{WC}$ can subsequently be raised to a sufficiently high level at a high boosting ratio, even while the pump device 12 is defective. The relief pressure or opening pressure at which the pressure relief valve 101 is opened is desirably set to be equal to or higher than the braking pressure $P_{WC}$ at which the fast filling of the wheel brake cylinders 44, 48 is expected to be completed or terminated, so that the fast filling is completed in a relatively short time.

Although the present embodiment is arranged to switch the hydraulic pressure control device 14 from the first state to the second state when the fluid pressure $P_1$ detected by the pressure sensor 162 has been increased to the switching pressure $P_{1S}$, this switching of the hydraulic pressure control device 14 may be effected on the basis of the detected operating force $F_P$ of the brake pedal 24. Alternatively, this switching may be effected on the basis of a ratio $\Delta P_1/\Delta F_P$ of the rate of increase $\Delta P_1$ of the detected fluid pressure $P_1$ (braking pressure $P_{WC}$) to the rate of increase $/\Delta F_P$ of the operating force $F_P$, that is, on the basis of the gradient or servo ratio $R_S$ indicated in the graph of FIG. 4. After the fluid pressure in the rear pressure chamber 30 has reached the maximum delivery pressure $P_{max}$, the servo ratio $R_S$ is reduced, as indicated in FIG. 4. Further alternatively, the hydraulic pressure control device 14 may be switched to the second state, on the basis of the rate of increase of the detected pressure $P_1$ with the time, that is, on the basis of the rate of increase $dP_1/dt$. In this respect, it is noted that the fluid pressure in the pressurizing chamber 26 is controlled irrespective of a change in the operating force of the brake pedal 24, when the detected fluid $P_1$ is considerably lower than the desired value, that is, when the pressure difference between the detected and actual values of the fluid pressure $P_1$ is relatively large. In view of this, the hydraulic pressure control valve 14 may be switched to the second state on the basis of the rate of increase $dP_1/dt$ of the detected fluid pressure $P_1$.

Figure 11:
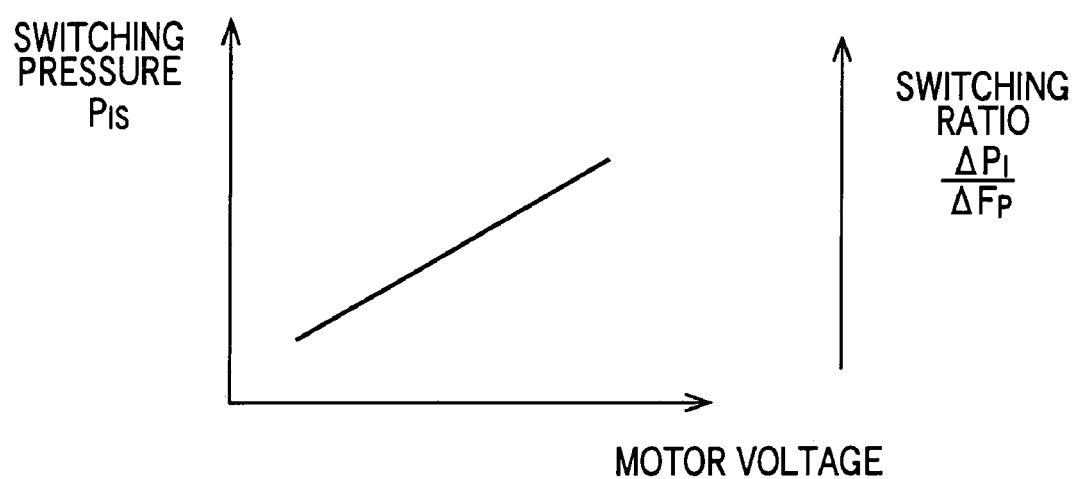
FIG. 11 is a graph indicating a switching-pressure-determining data table stored in the ROM of the hydraulic pressure control device in a braking system according to another embodiment of this invention.

The switching pressure $P_{1S}$ and the corresponding switching ratio $\Delta P_1/\Delta F_P$ of the rate of increase of the detected fluid pressure $P_1$ to the rate of increase of the operating force $F_P$, at which the hydraulic pressure control device 14 is switched to the second state, need not be constant, but may be changed depending upon the operating state of the pump device 12 or the temperature of the working fluid, for example. In this respect, it is noted that the maximum flow rate and delivery pressure of the pump device 12 may be reduced due to a drop of the voltage applied to the pump motor 84. In view of this fact, the switching pressure $P_{1S}$ and the switching ratio $\Delta P_1/\Delta F_P$ are reduced with a decrease of the voltage applied to the pump motor 84, as indicated in the graph of FIG. 11. According to this second embodiment of the invention, the hydraulic pressure control device 14 is switched to the second state when the fluid pressure $P_1$ is relatively low, where the voltage applied to the pump motor 84 is relatively low, so that the drop of the braking pressure $P_{WC}$ due to the voltage drop can be advantageously reduced.

Figure 12:
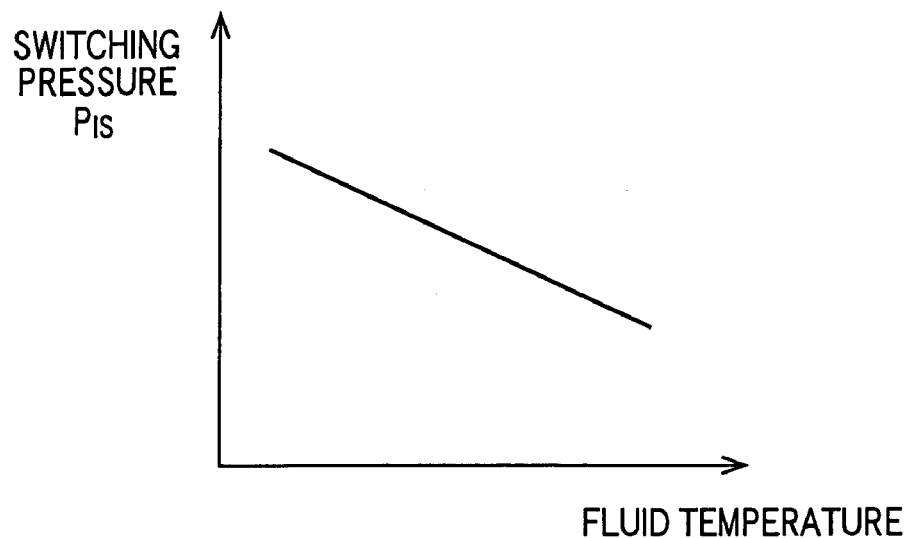
FIG. 12 is a graph indicating a switching-pressure-determining data table stored in the ROM of the hydraulic pressure control device in a further embodiment of the invention.
Figure 13:
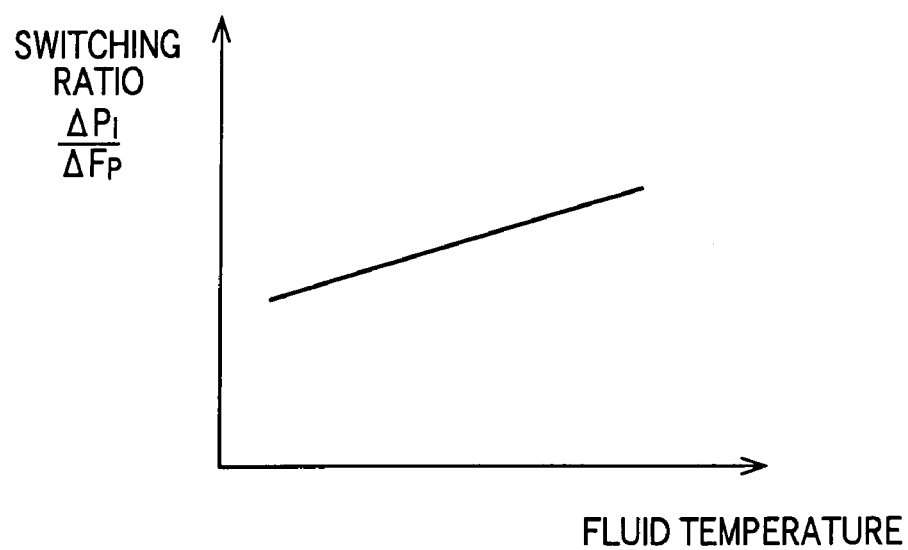
FIG. 13 is a graph indicating a switching-ratio-determining data table stored in the ROM of the hydraulic pressure control device in a still further embodiment of this invention.

It is further noted that the viscosity of the working fluid increases with a decrease of the temperature of the fluid so that the flow rate of the fluid decreases with the decrease of the fluid temperature. In view of this fact, the switching pressure $P_{1S}$ is increased with the decrease of the temperature of the working fluid, as indicated in the graph of FIG. 12. According to this third embodiment of the invention, the hydraulic pressure control device 14 is switched to the second state when the fluid pressure $P_1$ is relatively high, where the fluid temperature is relatively low, so that the braking pressure $P_{WC}$ can be increased at a high rate even at the relatively low temperature of the fluid. According to a fourth embodiment of the invention, the switching ratio $\Delta P_1/\Delta F_P$ is reduced with the decrease of the fluid temperature, as indicated in the graph of FIG. 13, so that the hydraulic pressure control valve 14 is switched to the second state when the switching ratio $\Delta P_1/\Delta F_P$ is relatively low, where the fluid temperature is relatively low, so that the delayed switching to the second state can be prevented even when the fluid temperature is relatively low.

The switching pressure $P_{1S}$ need not be the pressure when the fluid pressure in the rear pressure chamber 30 has been raised to the maximum delivery pressure $P_{max}$ of the pump device 12. That is, the switching pressure $P_{1S}$ may be the fluid pressure in the pressurizing chamber 26 when the fluid pressure in the chamber 30 has been raised to a predetermined value lower than the maximum delivery pressure $P_{max}$. Similarly, the switching ratio $\Delta P_1/\Delta F_P$ need not correspond to the maximum delivery pressure $P_{max}$. The switching of the hydraulic pressure control device 12 need not be based on the operating state of the pump device 12. For instance, the switching may be based whether an abrupt brake application to the vehicle is required or not. That is, the switching pressure $P_{1S}$ or the switching ratio $\Delta P_1/\Delta F_P$ is determined so that the hydraulic pressure control device 12 is switched to the second state when the abrupt brake application is required. Further, the principle of the present invention is applicable to an automatic brake application while the brake pedal 24 is not in operation, that is, while the operating force $F_P$ is zero. That is, the braking pressure $P_{WC}$ while the operating force $F_P$ is zero can be increased at a relatively high rate while the pressurized fluid is delivered from the pump device 12 to the rear pressure chamber 30, and can be increased to a relatively high level with the pressurized fluid being delivered from the pump device 12 to the pressurizing chamber 26.

Figure 14:
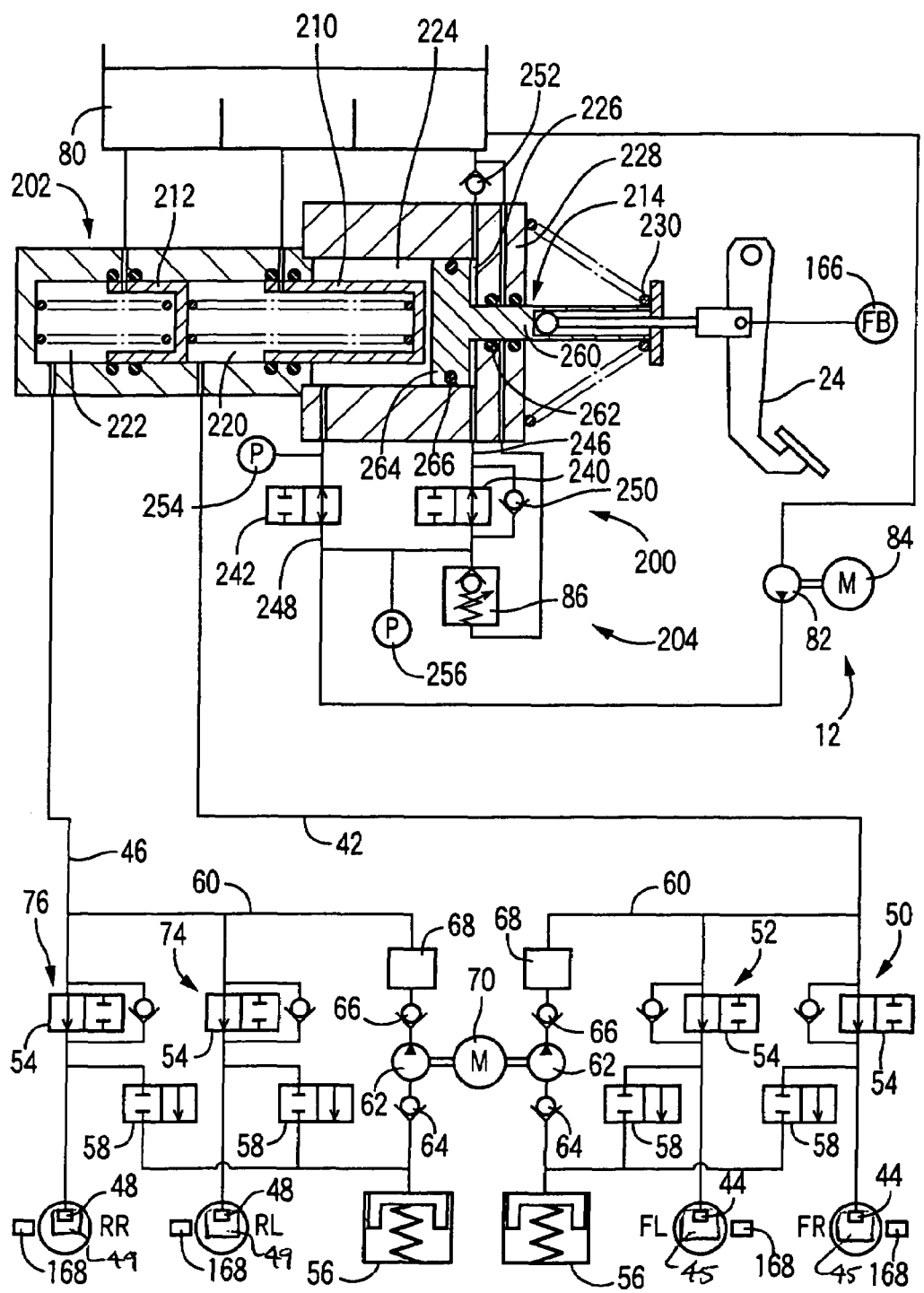
FIG. 14 is a graph indicating a hydraulic circuit diagram of a braking system according to a yet further embodiment of this invention.

Referring to FIG. 14, a braking system constructed according to a fifth embodiment of this invention will be described. This braking system includes a hydraulic pressure source device 200, which includes the pump device 12, a master cylinder 202 and a hydraulic pressure control device 204.

The master cylinder 202 includes two pressurizing pistons 210, 212 and an assisting piston 214. In this master cylinder 202, the pressurizing piston 210 and the assisting piston 214 are not formed integrally with each other, but are formed as two separate members.

The two pressurizing pistons 210, 212 partially define respective pressurizing chambers 220, 222 on their front side, while the pressurizing piston 210 disposed rearwardly of the pressurizing piston 212 cooperates with the assisting piston 214 to define an intermediate fluid chamber 224 therebetween. Further, the rear surface of the assisting piston 214 partially defines a rear pressure chamber 226 on its rear side. The assisting piston 214 is operatively connected to the brake pedal 24, and a return spring 230 is disposed between the assisting piston 214 and a housing 228 of the master cylinder 202. In the present fifth embodiment, the assisting piston 214 serves as a first piston, while the pressurizing piston 210 serves as a second piston.

The hydraulic pressure control device 204 includes the linear valve 86 as used in the first embodiment, and two electromagnetic shut-off valves 240, 242. The shut-off valve 240 is provided in a fluid passage 246 connecting the pump device 12 and the rear fluid chamber 226, while the shut-off valve 242 is provided in a fluid passage 248 connecting the pump device 12 and the intermediate fluid chamber 224. A check valve 250 is disposed in parallel connection with the shut-off valve 240 connected to the rear fluid chamber 226. This check valve 250 permits a flow of the fluid in a direction from the pump device 12 toward the rear fluid chamber 226, and inhibits a flow of the fluid in the reverse direction. A check valve 252 is provided in a fluid passage connecting the rear fluid chamber 226 and the reservoir 80. The check valve 252 permits a flow of the fluid in a direction from the reservoir 80 toward the rear fluid chamber 226, and inhibits a flow of the fluid in the reverse direction.

A pressure sensor 254 is connected to a portion of the fluid passage 248 between the shut-off valve 248 and the intermediate fluid chamber 224, while a pressure sensor 256 is connected to a portion of the fluid passage 246 between the shut-off valve 240 and the pump device 12. The fluid pressure in the intermediate fluid chamber 224 is detected by the pressure sensor 254, and the fluid pressure in the rear fluid chamber 226 is detected by the pressure sensor 256.

When the brake pedal 24 is operated, the shut-off valve 240 is placed in the open state, and the shut-off valve 242 is placed in the closed state. That is, the hydraulic pressure control device 204 is placed in a first state as indicated in the table of FIG. 16. In this first state, the fluid pressurized by the pump device 12 is delivered to the rear fluid chamber 226, and the fluid in the intermediate fluid chamber 224 is pressurized as the assisting piston 214 is advanced, so that the pressurizing piston 210 is advanced. In this condition, the following equations (2) and (3) are satisfied:

$$P_3 \cdot A_3 + F_P \cdot R_P = P_2 \cdot A_2 \tag{2}$$

wherein $A_3 = A_2 \cdot A_3'$ $$P_2 \cdot A_2' = P_1 \cdot A_1 \tag{3}$$

Figure 15:
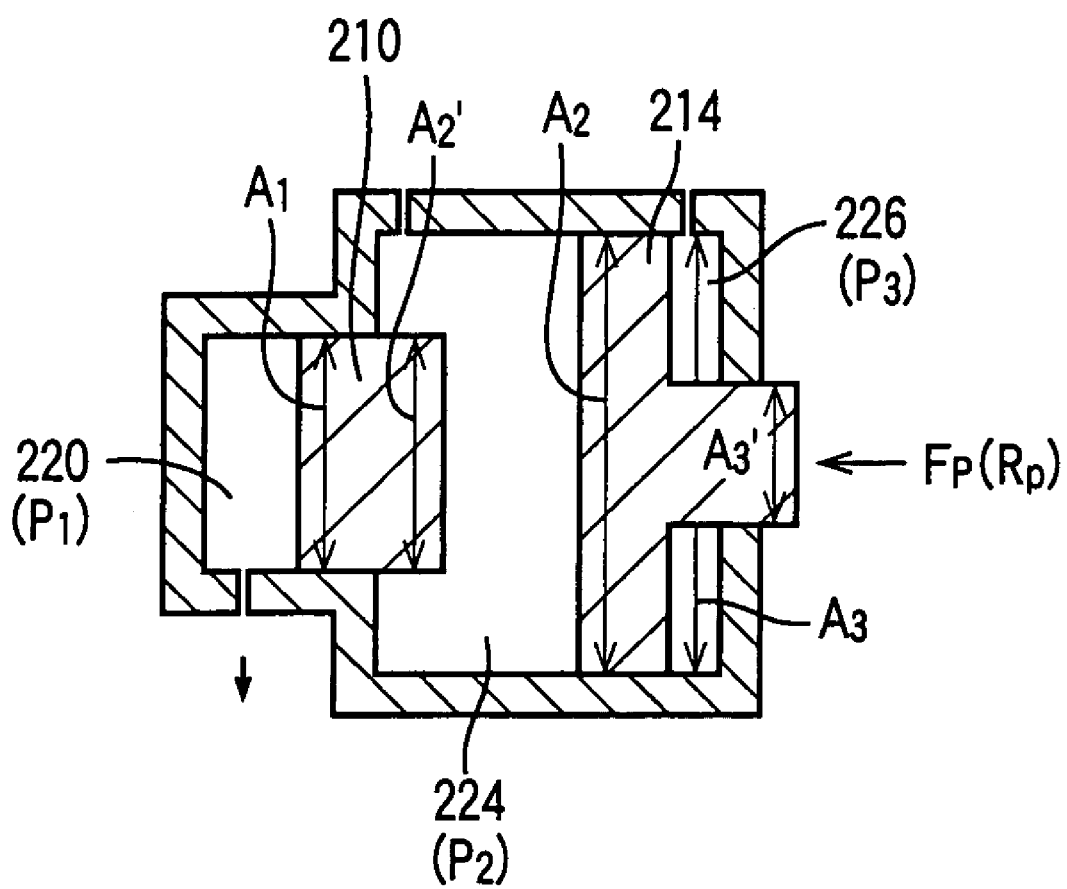
FIG. 15 is a schematic view of a master cylinder in the braking system of FIG. 14.

In the above equations, P1, P2 and P3 represent fluid pressures in the chambers 220, 224 and 226, respectively, as indicated in FIG. 15, while $A_1$, $A_2$, $A_3$, $A_2'$ and $A_3'$ represent pressure-receiving surface areas of the pistons 210, 214, as also indicated in FIG. 15. The fluid pressure $P_2$ in the intermediate fluid chamber 224 corresponds to a sum of an assisting force based on the fluid pressure $P_3$ in the rear fluid chamber 226 and the operating force $F_P$. The fluid pressure $P_1$ in the pressurizing chamber 220 is equal to the fluid pressure $P_2$ in the intermediate fluid chamber 224. The pressure-receiving surface area $A_2'$ of the pressurizing piston 210 which partially defines the intermediate fluid chamber 224 is equal to the pressure-receiving surface area $A_1$ of the piston 210 which partially defines the pressurizing chamber 220, that is, $A_2' = A_1$. Therefore, the fluid pressure $P_2$ in the intermediate fluid chamber 224 is equal to the fluid pressure $P_1$ in the rear fluid chamber 220, that is, $P_2 = P_1$.

Since the fluid pressure $P_2$ in the intermediate fluid chamber 224 and the fluid pressure $P_1$ in the pressurizing chamber 220 are equal to each other, as described above, it is not its required to provide a pressure sensor for detecting the fluid pressure $P_1$ in the pressurizing chamber 220. The fluid pressure $P_1$ in the pressurizing chamber 220 can be obtained on the basis of the fluid pressure $P_2$ in the intermediate fluid chamber 224, which is detected by the intermediate-chamber pressure sensor 254. The fluid pressure $P_1$ is considered to be the output pressure of the hydraulic pressure source device 200.

When the pressurized fluid is delivered from the pump device 12 to the rear pressure chamber 226, the assisting piston 214 is advanced by a distance $\Delta L_1$ represented by the following equation (4), and the pressurizing piston 210 is advanced by a distance represented by the following equation (5):

$$\Delta L_1 = q/A_3 \tag{4}$$

$$\Delta L_2 = \Delta L1 \cdot A_2/A_2' = (A_2/A_2') \cdot (q/A^3) \tag{5}$$

Where the volume of the intermediate fluid chamber 224 is constant, $\Delta L_1 \cdot A_2 = \Delta L_2 \cdot A_2'$. It will be understood from the above equations (4) and (5) that the advancing distance $\Delta L_2$ of the pressurizing piston 210 is larger than the advancing distance $\Delta L_1$ of the assisting piston 214 when a ratio $A_2/A_2'$ is larger than 1. The ratio $A_2/A_2'$ is a ratio of the pressure-receiving area $A_2$ of the assisting piston 214 which partially defines the intermediate fluid chamber 224, to the pressure-receiving surface area $A_2'$ of the pressurizing piston 210 which partially defines the chamber 224. In the present embodiment, the ratio $A_2/A_2'$ is larger than 1, as is apparent from FIG. 14, so that the assisting piston 214 is not brought into abutting contact with the pressurizing piston 210 when the pressurized fluid is delivered from the pump device 12 to the rear fluid chamber 226.

A rate of flow $q_{WC}$ of the pressurized fluid from the pressurizing chambers 220, 222 into the wheel brake cylinders 44, 48 when the pressurizing pistons 210, 212 are advanced is equal to q' represented by the following equation (6):

$$q' = A_1 \cdot \Delta L_2 = q \cdot (A_1 \cdot A_3/A_2' \cdot A_3) \tag{6}$$

When the pressurized fluid is delivered from the pump device 12 to the intermediate fluid chamber 224, the flow rate q' is equal to $q \cdot A_1/A_2'$. The braking pressure $P_{WC}$ in the wheel brake cylinders 44, 48 when the pressurizing pistons 210, 212 are advanced is equal to $P_3 \cdot (A_3/A_2)$.

When the fluid pressure $P_2$ (=$P_1$) detected by the intermediate-chamber pressure sensor 254 has increased to the switching pressure, the shut-off valve 240 is switched into the closed state, and the shut-off valve is switched into the open state. That is, the hydraulic pressure control device 200 is placed in the second state indicated in FIG. 16. In this second state, the pressurized fluid is delivered from the pump device 12 to the intermediate fluid chamber 224, and the fluid pressure in this chamber 224 is increased, so that the pressurizing piston 210 is advanced. The shut-off valve 240 placed in the closed state prevents the pressurized fluid from being discharged from the rear pressure chamber, to thereby inhibit the retracting movement of the assisting piston 214, as in the first embodiment.

In the second state of the hydraulic pressure control device 200 wherein the pressurized fluid having the pressure P is delivered from the pump device 12 to the intermediate fluid chamber 224 at the flow rate q, the pressurized fluid is delivered from the pressurizing chambers 220, 222 to the wheel brake cylinders 44, 48 at a flow rate $q_{WC} = q \cdot (A_1/A_2') \cdot q$ lower than the rate of flow in the first state, and the braking pressure $P_{WC}$ in the wheel brake cylinders 44, 48 is raised to a level of $P \cdot (Q_2'/A_1) \cdot P$ higher than that in the first state.

When the brake pedal 42 is released, the shut-off valves 240 and 242 are both placed in the open state, and the linear valve 86 is returned to the open state, so that the pressurized fluid is returned from the rear pressure chamber 226 and the intermediate fluid chamber 224 to the reservoir 80 through the shut-off valves 240, 242 and linear valve 86 all of which are placed in the open state. Further, the pressurized fluid is returned from the wheel brake cylinders 44, 48 to the reservoir 80 through the pressurizing chambers 220, 222.

Where the electric system becomes defective, the shut-off valves 240, 242 are returned to the original positions of FIG. 14, and the linear valve 86 is held in the open state. When the brake pedal 24 is operated in this condition, the assisting piston 214 and the pressurizing piston 210 are advanced as a unit, to pressurize the fluid in the pressurizing chambers 220, 222 to a level corresponding to the operating force of the brake pedal 24, so that the wheel brake cylinders 44, 48 are activated with the pressurized fluid delivered from the pressurizing chambers 220, 222. During the operation of the brake pedal 24, the fluid is supplied from the reservoir 90 or pump 12 to the rear pressure chamber 226 through the check valve 252 or through the linear valve 86 and shut-off valve 240, so that the fluid pressure in the rear pressure chamber 226 is prevented from being lowered below the atmospheric pressure. The fluid pressure in the intermediate fluid chamber 224 is held at the atmospheric pressure, since the chamber 224 is held in communication with the reservoir 80 through the linear valve 86. Since the intermediate fluid chamber 226 is held at the atmospheric pressure, the fluid in the pressurizing chambers 220, 222 can be efficiently pressurized.

Where sealing members between the assisting piston 214 and the cylinder housing 228 are defective, the hydraulic pressure control device 200 is switched to the second state. Described in detail, the assisting piston 214 includes a small-diameter portion 260 which fluid-tightly and slidably extends through the rear wall of the housing 228. Sealing members 262 are disposed between the rear wall of the housing 228 and the corresponding end section of the small-diameter portion 260. Where the sealing members 262 are defective, the fluid pressure in the rear pressure chamber 226 may possibly be lowered down to the atmospheric level. On the other hand, the intermediate fluid chamber 224 is fluid-tightly isolated from the rear pressure chamber 226 by an O-ring 266 disposed between the inner circumferential surface of the housing 228 and the outer circumferential surface of a large-diameter portion 264 of the assisting piston 214. In the presence of the O-ring 266, the fluid in the intermediate fluid chamber 224 can be pressurized even when the sealing members 262 are defective. Accordingly, the wheel brake cylinders 44, 48 can be activated by supplying the pressurized fluid from the pump device 12 to the intermediate fluid chamber 224. Thus, the braking pressure $P_{WC}$ can be raised to the maximum delivery pressure $P_{max}$ of the pump device 12, even in the event of a failure of the sealing members 262.

Referring next to FIG. 6, there will be described a braking system constructed according to a sixth embodiment of this invention, which includes a hydraulic pressure source device 290, which in turn includes the pump device 12, a master cylinder 292, an assisting cylinder 294, and a hydraulic pressure control device 296.

The master cylinder 292 includes a single pressurizing piston 300 which partially defines a pressurizing chamber 302 and a rear pressure chamber 304 on respective front and rear sides thereof The master cylinder 292 further includes an assisting piston 306 formed integrally with the pressurizing piston 300. A pressure sensor 308 is connected to the pressurizing chamber 302, to detect the fluid pressure in the chamber 302.

The assisting cylinder 294 is disposed downstream of the master cylinder 292, that is, between the master cylinder 292 and the wheel brake cylinders 44, 48. The assisting cylinder 294 includes two pressurizing pistons 310, 312 which partially define respective pressurizing chambers 314, 316 on their front side, and the pressurizing piston 310 partially defines a pressure control chamber 318 on its rear side. The pressure control chamber 318 is connected through a fluid passage 321 to the brake cylinders 44 for the front wheels FL, FR, and connected through a fluid passage 322 to the pressurizing chamber 302 of the master cylinder 292. Thus, the master cylinder 292 is connected to the wheel brake cylinders 44 through the pressurizing chamber 314. The pressurizing chamber 316 is connected through a fluid passage 324 to the brake cylinders 48 for the rear wheels RL, RR. The assisting cylinder 290 includes a housing 328 which has two ports corresponding to the respective pressurizing chambers 314, 316. These two ports are provided with respective cut seals and are connected to the reservoir 80 through respective fluid passages 324, 325. A return spring 330 is disposed between the two pressurizing pistons 310, 312, while a return spring 331 is disposed between the pressurizing piston 312 and the front end wall of the housing 328.

The pressurizing chamber 314 is isolated from the reservoir 80 as the pressurizing piston 310 is advanced, and the fluid in the pressurizing chamber 314 is pressurized. As a result, the pressurizing piston 312 is advanced to pressure the fluid in the pressurizing chamber 316. In the assisting cylinder 294 in the present embodiment, the pressure-receiving surfaces of the pressurizing piston 310 which partially define the pressurizing chambers 314 and pressure control chamber 318, respectively, and the pressure-receiving surface of the pressurizing piston 312 which partially defines the pressurizing chamber 316 all have the same area, so that the fluid masses in the pressurizing chambers 314, 316 and the pressure control chamber 318 are pressurized to the same level. Accordingly, the fluid pressures in the front and rear wheel brake cylinders 44, 48 are controlled to the same level, which is equal to the fluid pressure in the pressure control chamber 318.

In the present assisting cylinder 294, the pressurizing pistons 310, 312 are fluid-tightly and slidably fitted in the housing 328 through sealing members 332, 333, so that the two pressurizing chambers 314, 316 are isolated from each other, to provide mutually independent two brake-application sub-systems for the front wheels FL, FR and the rear wheels RL, RR.

While the sealing members 332, 333 are received in the housing 328 in the present embodiment, these sealing members may be received in the pressurizing pistons 310, 312.

The hydraulic pressure control device 296 includes a linear valve 338, and a plurality of electromagnetic shut-off valves 340, 342, 344. The shut-off valve 340 is provided in a fluid passage connecting the master cylinder 292 and the assisting cylinder 294, and the shut-off valve 342 is provided in a fluid passage connecting the pressure control chamber 318 and the pump passage 12. Two check valves 346, 348 are provided in parallel connection with these shut-off valves 340, 342, respectively. The check valve 346 permits a flow of the fluid in a direction from the master cylinder 292 toward the assisting cylinder 294 and inhibits a flow of the fluid in the reverse direction. The check valve 348 permits a flow of the fluid in a direction from the pressure control chamber 318 toward the linear valve 338 and inhibits a flow of the fluid in the reverse direction. The check valve 346 permits the pressurizing fluid to be fed from the master cylinder 292 to the pressurizing chamber 314, even with the shut-off valve 340 placed in the closed state, while the fluid pressure in the master cylinder 292 is higher than that in the pressurizing chamber 314. The check valve 348 is provided to return the pressurized fluid from the pressure control chamber 318 to the reservoir 80 when the shut-off valve 342 is placed in the closed state while the liner valve 338 is placed in the open state, upon releasing of the brake pedal 24, for example. The fluid pressure in the pressure control chamber 36 is detected by a pressure sensor 349.

In the master cylinder 292, the pressurizing chamber 302 and the rear pressure chamber 304 are connected to each other through a fluid passage 350, which is provided with the shut-off valve 344 and a flow restricting device 351 that are disposed in series connection with each other. The flow restricting device 351 includes a pressure relief valve 352 and an orifice 354 which are disposed in parallel connection with each other.

Figure 18A:
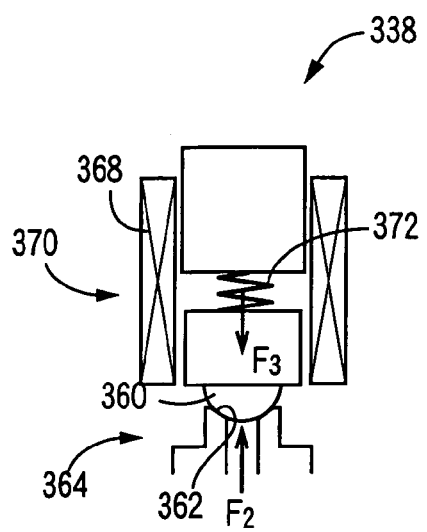
FIGS. 18A and 18B are schematic views of a linear valve included in the braking system of FIG. 14.
Figure 18B:
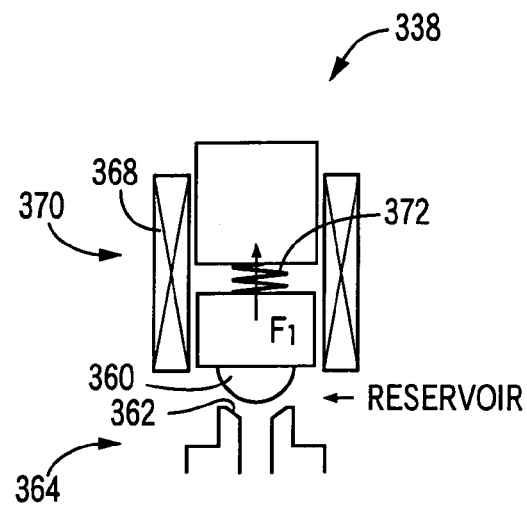

Like the linear valve 86, the linear valve 338 includes a seating valve 364 and a solenoid device 370, as shown in FIGS. 18A and 18B. The seating valve 364 includes a valve member 360 and a valve seat 362, and the solenoid device 370 includes a coil 368. Unlike the linear valve 86, the linear valve 338 is a normally closed valve which is normally held in the closed state with the valve member 360 being seated on the valve seat 362 under the biasing action of a spring 372.

When the coil 368 is energized, an electromagnetic force F1 is generated and acts on the valve member 360 in a direction that causes the valve member 360 to move away from the valve seat 362. The valve member 360 also receives a force F2 based on a fluid pressure difference across the seating valve 364, and a biasing force F3 of the spring 372. The position of the valve member 360 relative to the valve seat 362 is determined by a relationship among the forces F1, F2 and F3. The force F2 corresponds to a difference between the fluid pressure in the rear pressure chamber 304 and pressure control chamber 318 and the fluid pressure in the reservoir 80. The fluid pressure in the rear pressure chamber 304 and pressure control chamber 318 is controlled by controlling the amount of electric current to be applied to the coil 368.

When the brake pedal 24 is operated, the shut-off valve 340 is placed in the open sate, and the shut-off valves 342, 344 are placed in the closed state. That is, the hydraulic pressure control device 296 is placed in a first state as indicated in the table of FIG. 19. In this first state, the fluid pressurized by the pump device 12 is delivered to the rear pressure chamber 304 of the maser cylinder 292, so that the pressurizing piston 300 is advanced by a sum of the operating force of the brake pedal 24 and an assisting force based on the fluid pressure in the rear pressure chamber 304. As a result, the fluid in the pressurizing chamber 302 is pressurized to a level corresponding to the above-indicated sum of the forces. The fluid pressurized in the pressurizing chamber 302 is delivered to the front wheel brake cylinders 44 through the shut-off valve 340, check valve 346 and the pressurizing chamber 314 of the assisting cylinder 294. In the assisting cylinder 294, the fluid in the pressurizing chamber 314 is pressurized, so that the pressurizing piston 312 is advanced, and the fluid in the pressurizing chamber 316 is pressurized to the same pressure as in the pressurizing chamber 314. Accordingly, the fluid pressure in the rear wheel brake cylinders 48 is controlled to the same pressure as in the front wheel brake cylinders 44.

In the first state of the hydraulic pressure control device 296, the pressurized fluid is delivered to the wheel brake cylinders 44, 48 at a flow rate $q_{WC}=q\cdot(A_{m1}/A_{m3})$, and the fluid pressure $P_{WC}$ in the wheel brake cylinders 44, 48 is raised to a level $P\cdot(A_{m3}/A_{m1})$, as indicated in the table of FIG. 19. The braking pressure $P_{WC}$ is equal to the fluid pressure in the pressurizing chamber 302. Therefore, the braking pressure $P_{WC}$ can be detected by the pressure sensor 308. It is also noted that the fluid pressure detected by the pressure sensor 308 represents the output pressure of the hydraulic pressure source device 290.

When the fluid pressure $P_1$ detected by the pressure sensor 308 has increased to the switching pressure $P_{1S}$, the hydraulic pressure control device 296 is switched to a second state in which the shut-off valve 340 is placed in the closed state while the shut-off valve 342 is placed in the open state. In this second state, the pressurized fluid is delivered from the pump device 122 to both of the rear pressure chamber 304 and the pressure control chamber 318 of the assisting cylinder 294. With the pressurized fluid delivered from the pump device 12 to the pressure control chamber 318, the pressurizing pistons 310, 312 are advanced to pressurize the fluid masses in the pressurizing chambers 314, 316. While the fluid pressure in the pressurizing chambers 314, 316 is lower than the fluid pressure in the pressurizing chamber 302 of the master cylinder 292, the pressurized fluid is delivered from the master cylinder 292 (from the chamber 302) to the assisting cylinder 294 (chamber 314). When the fluid pressure in the assisting cylinder 294 becomes higher than that in the master cylinder 282, the assisting cylinder 294 is disconnected from the master cylinder 292. The check valve 346 prevents the pressurized fluid from being fed from the assisting cylinder 294 to the master cylinder 292, even when the fluid pressure in the assisting cylinder 294 is higher than that in the master cylinder.

In the second state, the fluid pressure in the pressure control chamber 318 is controlled while the assisting cylinder 294 is isolated from the master cylinder 292. As indicated in FIG. 19, the pressurized fluid is delivered to the wheel brake cylinders 44, 48 at a flow rate $q_{WC}=q$, and the braking pressure $P_{WC}$ in the wheel brake cylinders 44, 48 is raised to a level P. In the second state, the fluid pressure in the pressure control chamber 318 is the pressure as detected by the pressure sensor 349.

Figure 17:
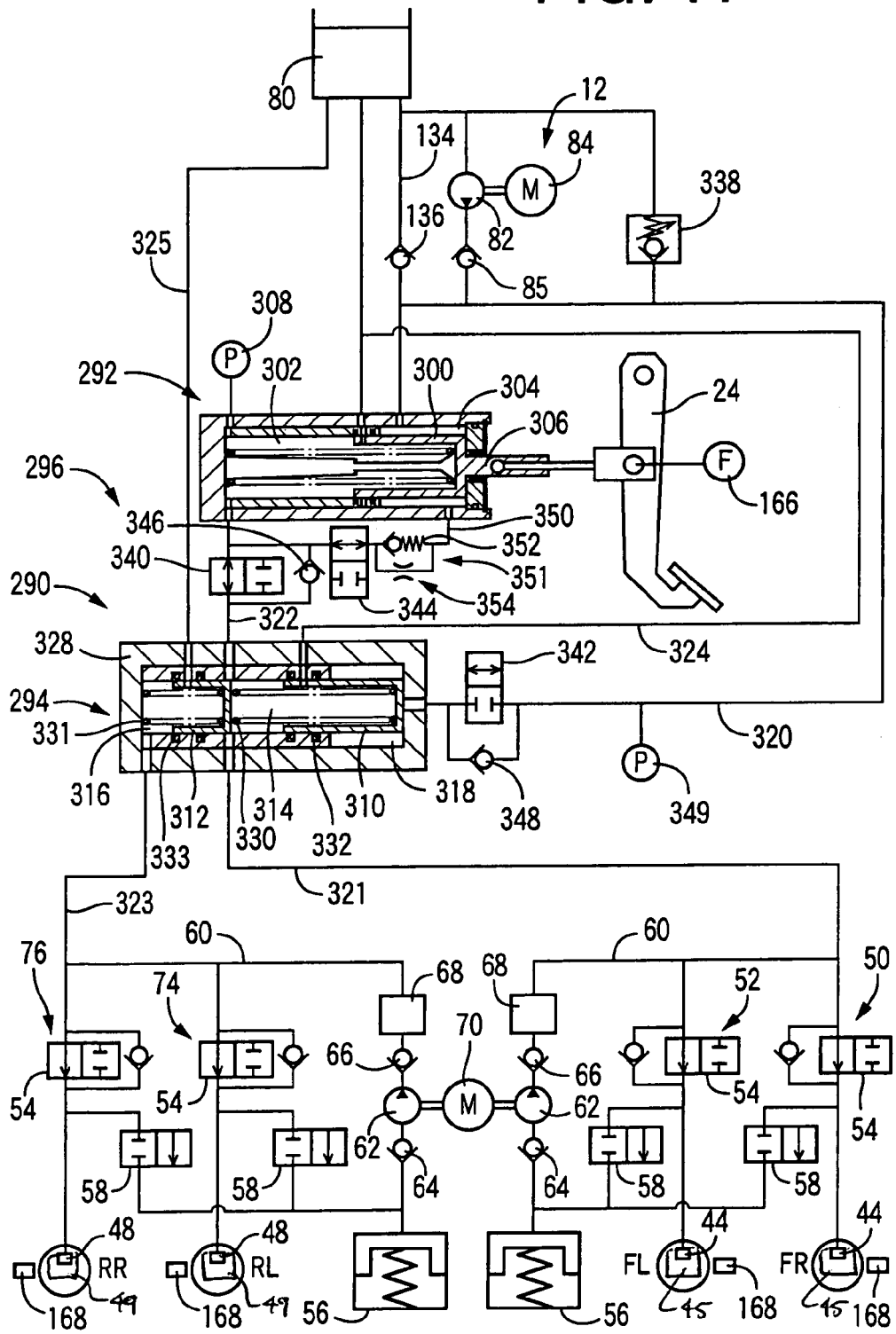
FIG. 17 is a hydraulic circuit diagram of a braking system according to still another embodiment of this invention.

When the brake pedal 24 is released, the shut-off valves 340, 342, 344 are returned to the original positions of FIG. 17. Further, the normally closed linear valve 338 is held in the open state for a predetermined time, so that the pressurized fluid can be returned to the reservoir 80 with high stability, through the opened linear valve 338. The linear valve 338 may be a normally open valve.

Figure 20:
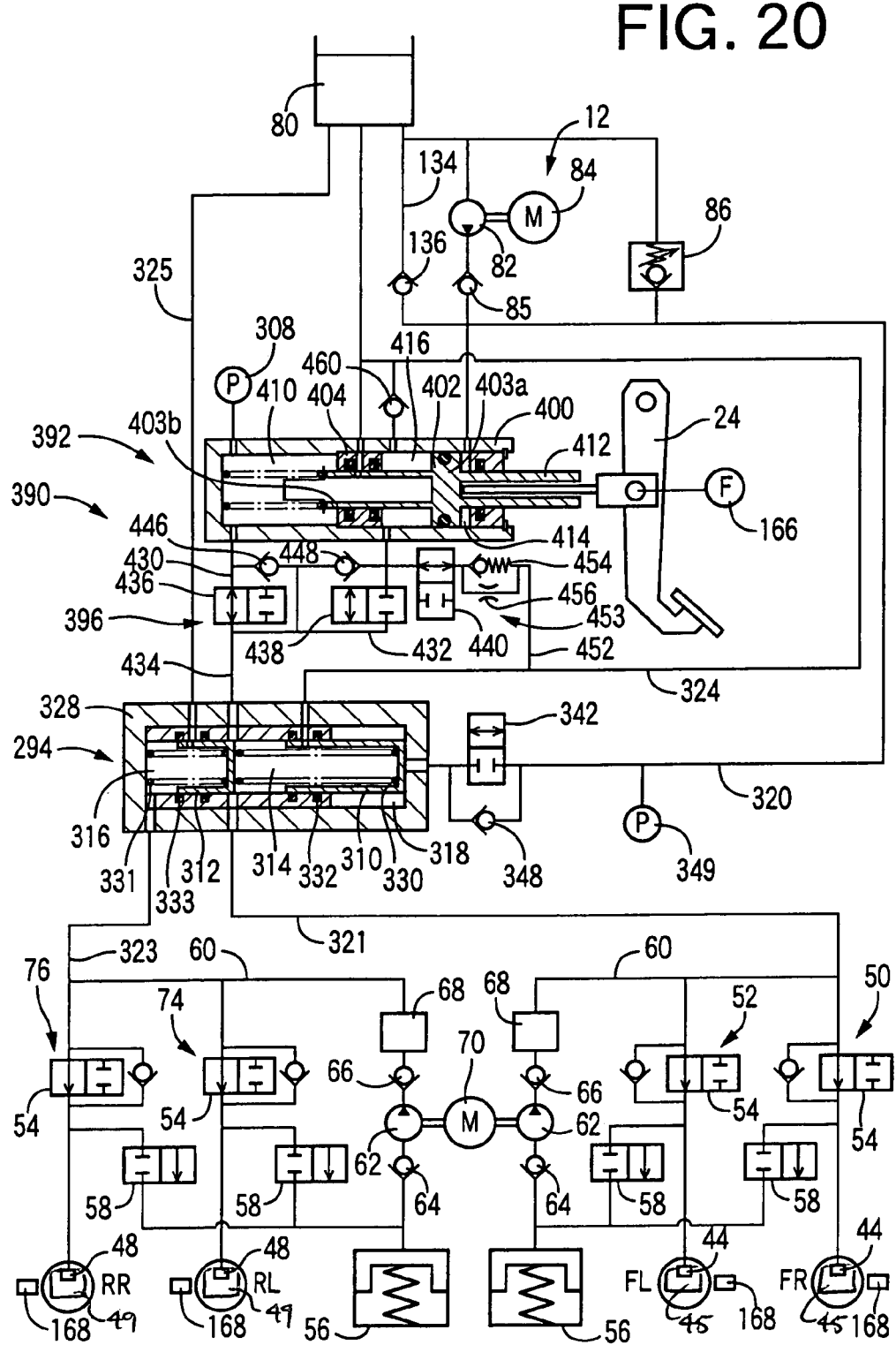
FIG. 20 is a hydraulic circuit diagram of a braking system according to yet another embodiment of this invention.

Referring next to FIG. 20, there will be described a braking system constructed according to a seventh embodiment of the present invention, which includes a hydraulic pressure source device 390, which in turn includes a master cylinder 392, the pump device 12, an assisting cylinder 293 and a hydraulic pressure control device 396.

The master cylinder 392 includes a cylinder housing 400 and a pressurizing piston 402. The pressurizing piston 402 is a stepped member including a large-diameter portion 403a and a small-diameter portion 403b. The large-diameter portion 403a and the small-diameter portion 403b are fluid-tightly and slidably fitted in the cylindrical bore of the housing 400 and a sleeve 404 disposed within the housing 400, respectively. The small-diameter portion 403b of the pressurizing piston 402 partially defines a pressurizing chamber 410 on its front side. An assisting piston 412 is formed integrally with the large-diameter portion 403a of the pressurizing piston 402. The large-diameter portion 403a and the assisting piston 412 partially define a rear pressure chamber 414 on the rear side of the large-diameter portion 403a. Further, the housing 400, the sleeve 404, the large-diameter portion 403a and the outer circumferential surface of the small-diameter portion 403b of the pressurizing piston 402 cooperate to define an annular fluid chamber 416. In the present embodiment, a single member functions as the pressurizing piston 402 and the assisting piston 412.

Two separate fluid passages 430, 432 are connected to the pressurizing chamber 410 and annular fluid chamber 416, respectively. The two fluid passages 430, 432 merge into a common passage 434, which is connected to the pressurizing chamber 314 of the assisting cylinder 294. Thus, the pressurizing chamber 314 can receive the pressurized fluid from both of the pressurizing chamber 410 and the annular fluid chamber 416 of the master cylinder 392.

The hydraulic pressure control device 396 includes the linear valve 86, electromagnetic shut-off valves 436, 438, 440, 342. The shut-off valve 436 is provided in the fluid passage 430 connected to the pressurizing chamber 410, and the shut-off valve 438 is provided in the fluid passage 432 connected to the annular fluid chamber 416. Two check valves 446, 448 are provided in parallel connection with the respective shut-off valves 436,438. The check valves 446, 448 permit flows of the fluid in a direction from the master cylinder 392 toward the assisting cylinder 294, and inhibits flows of the fluid in the reverse direction. The shut-off valve 440 is provided in a fluid passage 452 connecting the annular fluid chamber 416 and the reservoir 80. The fluid passage 452 is provided with a flow restricting device 453 connected in series with the shut-off valve 440. The flow restricting device 453 includes a pressure relief valve 454 and an orifice which are disposed in parallel connection with each other. The pressure relief valve 454 permits a flow of the fluid from the annular fluid chamber 416 to the reservoir 80 when the fluid pressure in the annular fluid chamber 416 is higher than a predetermined value. The annular fluid chamber 416 is also connected to the reservoir 80 through a check valve 460, which permits a flow of the fluid in a direction from the reservoir 80 toward the annular fluid chamber 416 and inhibits a flow of the fluid in the reverse direction.

When the brake pedal 24 is operated, the hydraulic pressure control device 396 is placed in a first state in which the shut-off valves 440, 342 are placed in the closed state, while the shut-off valves 436, 438 are placed in the open state, as indicated in the table of FIG. 22. In this first state, the fluid pressurized by the pump device 12 is delivered to the rear pressure chamber 414, so that the pressurizing piston 402 is advanced by a sum of the operating force of the brake pedal 24 and an assisting force based on the fluid pressure in the rear pressure chamber 414, and the fluid masses in the annular fluid chamber 416 and pressurizing chamber 410 are pressurized. The pressurized fluid masses are delivered from the annular and pressurizing chambers 416, 410 to the assisting cylinder 294 through the respective shut-off valves 438, 436 placed in the open state. In this first state, the assisting cylinder 292 is supplied with the pressurized fluid from both of the annular and pressurizing chambers 416, 410, so that the pressurized fluid is delivered from the assisting cylinder 294 to the wheel brake cylinders 44, 48 at a relatively high flow rate. Thus, the fast filling of the wheel brake cylinders 44, 48 can be completed in a relatively short time, and a delay in the activation of the wheel brake cylinders to provide a braking effect can be reduced.

The fluid pressures in the pressurizing chamber 410, rear pressure chamber 414 and annular fluid chamber 416 have a relationship represented by the following equation (7):

$$F_P \times R_P + A_{m3} \times P_3 = A_{m2} \times P_2 + A_{m1} \times P_1 \qquad (7)$$

Figure 21:
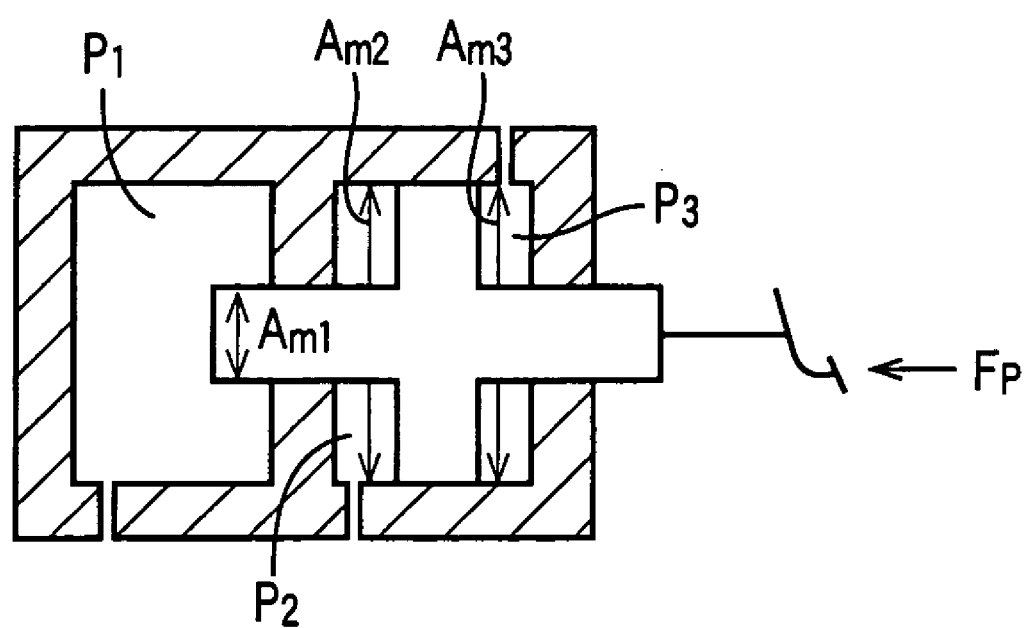
FIG. 21 is a schematic view of a master cylinder in the braking system of FIG. 20.

"$A_{m1}$", "$A_{m2}$", "$A_{m3}$" in the above equation (7) represent the pressure-receiving surface areas indicated in FIG. 21, and "$P_1$", "$P_2$" and "$P_3$" represent the fluid pressure values also indicated in FIG. 21. The fluid pressure $P_2$ in the annular fluid chamber 416 is equal to the fluid pressure $P_1$ in the pressurizing chamber 410. By substituting the fluid pressure $P_1$ for the fluid pressure $P_2$ in the above equation (7), the fluid pressure $P_1$ in the pressurizing chamber 410 is represented by the following equation:

$$P_1 = (F_P \cdot R_P + A_{m3} \cdot P_3)/(A_{m1} + A_{m2})$$

The fluid pressure $P_1$ corresponds to the pressure of the fluid pressurized by the large-diameter portion 403a of the pressurizing piston 402. Since the pressurizing chamber 314 of the assisting cylinder 294 is supplied with the pressurized fluid masses delivered from both of the annular fluid chamber 416 and the pressurizing chamber 410, the pressurized fluid is delivered to the wheel brake cylinders 44, 48 at a flow rate $q_{WC} = q \cdot (A_{m1} + A_{m2})/A_{m3}$, and the braking pressure $P_{WC}$ in the wheel brake cylinders 44, 48 is raised to a level $\{P \cdot A_{m3}/(A_{m1} + A_{m2})\}$, as indicated in the table of FIG. 22. The pressurizing piston 402 has the pressure-receiving surface areas $A_{m1}$, $A_{m2}$ and $A_{m3}$ which partially define the pressurizing chamber 410, annular fluid chamber 416 and rear pressure chamber 414, respectively, as indicated in FIG. 21.

When the fluid pressure (fluid pressure in the pressurizing chamber 410) detected by the pressure sensor 308 has increased to a first switching pressure, the hydraulic pressure control device 396 is switched to a second state in which the shut-off valves 436, 438 are placed in the closed state and the shut-off valve 342 is laced in the open state, while the shut-off valve 440 remains in the closed state, as indicated in FIG. 22. In this second state, the fluid pressurized by the pump device 12 is delivered to the pressure control chamber 318 of the assisting cylinder 294. As in the braking system of FIG. 17, the pressurized fluid is delivered through the check valves 446, 448 from the pressurizing chamber 410 of the master cylinder 392 to the pressurizing cylinder 314 of the assisting cylinder 294 while the fluid pressure in the pressurizing cylinder 410 is higher than that in the pressurizing chamber 314. After the fluid pressure in the assisting cylinder 294 becomes higher than that in the master cylinder 392, the fluid flow from the master cylinder 392 to the assisting cylinder 294 is inhibited by the check valves 446, 448. In this state, the fluid pressure in the pressure control chamber 318 is controlled while the assisting cylinder 294 is isolated from the master cylinder 392.

In the second state of the hydraulic pressure control device 396, the rate of flow $q_{WC}$ of the fluid into the wheel brake cylinders 44, 48 is equal to the rate of flow q of the pressurized fluid into the rear pressure chamber 414, and the braking pressure $P_{WC}$ is equal to the pressure of the pressurized fluid delivered to the rear pressure chamber 414.

When the fluid pressure detected by the pressure sensor 349 has increased to a second switching pressure, the hydraulic pressure control device 392 is switched from the second state to a third state in which the shut-off valves 436, 440 are placed in the open state while the shut-off valves 438, 342 are placed in the closed state, as indicated in FIG. 22. In this third state wherein the shut-off valve 440 is placed in the open state, the fluid in the annular fluid chamber 416 is not pressurized. Since the fluid pressure in the annular fluid chamber 416 upon switching to the second state is higher than the fluid pressure in the reservoir 80 by more than the preset relief pressure of the pressure relief valve 454, the pressurized fluid is returned from the annular fluid chamber 416 to the reservoir 80 through the pressure relief valve 454. While the pressurizing piston 402 is held at the same position, the annular fluid chamber 416 is substantially communicated with the reservoir 80 through the orifice so that the fluid pressure in the annular fluid chamber 416 is held at the atmospheric pressure.

In the third state of the hydraulic pressure control device 392, the fluid pressure $P_3$ in the rear pressure chamber 414 and the fluid pressure $P_1$ in the pressurizing chamber 410 have a relationship represented by the following equation (8):

$$F_P \times R_P + A_{m3} \times P_3 = A_{m1} \times P_1 \qquad (8)$$

In this third state, the rate of flow $q_{WC}$ of the fluid into the wheel brake cylinders 44, 48 is equal to $\{q \cdot (A_{m1}/A_{m3})\}$, and the braking pressure $P_{WC}$ is equal to $\{P \cdot (A_{m3}/A_{m1})\}$, as also indicated in FIG. 22. Since the pressure-receiving surface area $A_{m1}$ of the small-diameter portion 403b of the pressurizing piston 402 partially defining the pressure chamber 410 is smaller than the pressure-receiving surface area $A_{m3}$ partially defining the rear pressure chamber 414, the braking pressure $P_{WC}$ can be made higher than the maximum delivery pressure $P_{max}$ of the pump device 12.

The first switching pressure in the present seventh embodiment may be set to be equal to the switching pressure $P_{1S}$ in the preceding embodiments. In this case, the second switching pressure is set to be higher than the switching pressure $P_{1S}$. However, the first and second switching pressures may be set to be lower and higher by suitable amounts than the switching pressure $P_{1S}$, respectively. The first and second switching pressures are desirably determined so that the hydraulic pressure control device 392 is switched to the second or third state when the brake pedal 24 is operated with an operating force or stroke larger than a value which is normally taken when the brake pedal 24 is operated in a normal manner.

When the brake pedal 24 is released, the shut-off valves 436, 438, 440, 342 are returned to their original positions of FIG. 20. The pressurized fluid is returned from the pressure control chamber 318 to the reservoir 80 through the check valve 348 and the linear valve 86. The pressurized fluid in the front wheel brake cylinders 44 is returned to the reservoir 80 through the assisting cylinder 294 and the master cylinder 392, while the pressurized fluid in the rear wheel brake cylinders 48 is returned to the reservoir 80 through the assisting cylinder 294. The fluid is supplied to the annular fluid chamber 416 through the check valve 460 as the pressurizing piston 402 is retracted.

Where the electric system is defective, the shut-off valves 436 438, 440, 342 are returned to their original positions, as in the preceding embodiments. In this condition, the fluid in the pressurizing chamber 410 is pressurized by an advancing movement of the pressurizing piston 403 as the brake pedal 24 is operated. The pressurized fluid is delivered from the pressurizing chamber 410 to the pressurizing chamber 314 of the assisting cylinder 294. As a result, the fluid pressures in the front and rear wheel brake cylinders 44, 48 are raised to the same level.

While the fluid pressure in the annular fluid chamber 416 is lower than the opening pressure of the pressure relief valve 454, the pressurized fluid is delivered from both of the annular fluid chamber 416 and the pressurizing chamber 410 to the pressurizing chamber 314. When the fluid pressure in the annular fluid chamber 416 exceeds the opening pressure of the pressure relief valve 454, the annular fluid chamber 416 is communicated with the reservoir 80 through the open pressure relief valve 454, so that the pressurized fluid is not delivered from the annular fluid chamber 416 to the wheel brake cylinders 44, 48, whereby the wheel brake cylinders are supplied with the pressurized fluid received from only the pressurizing chamber 410. While the pressure relief valve 454 is held in the closed state, the pressurized fluid supplied to the wheel brake cylinders 44, 46 at a higher rate than while the pressure relief valve 454 is in the closed state. Accordingly, the wheel brake cylinders 44, 48 can be filled with the pressurized fluid at a relatively high speed during an initial period of a braking operation. Namely, the fast filling of the wheel brake cylinders 44, 48 can be completed in a relatively short time. After the annular fluid chamber 416 is communicated with the reservoir 80, the fluid in the pressurizing chamber 410 is pressurized by the small-diameter portion 403b of the pressurizing piston 402, so that the fluid pressure in the pressurizing chamber 410, which corresponds to a given value of the operating force of the brake pedal 24, is made higher than when the fluid is pressurized by the large-diameter portion 403a. This phenomenon may be called "fill-up" function, which is achieved while the shut-off valve 440 is in the open state (in the third state of FIG. 22) and is not achieved while the shut-off valve 440 is in the closed state (in the first and second states of FIG. 22). By selectively opening and closing the shut-off valve 440, the flow restricting device 453 can be enabled or disabled to operate. In this sense, the shut-off valve 440 may be considered to serve as a device operable to inhibit the fill-up function. It will be understood that the shut-off valve 440 and the flow restricting device 453 may be considered to constitute a communicating valve device which is operable while the pressurized fluid is delivered from the pump device 12 to the rear pressure chamber 414 and which has a supplying state for permitting the supply flow of the pressurized fluid from the annular fluid chamber to the brake cylinders 44, 48, and a discharging state for permitting the discharge from of the pressurized fluid from the annular fluid chamber 414 to the reservoir 80. The communicating valve device is switched from the supplying state to the discharging state during an advancing movement of the pressurizing piston 402.

Figure 23:
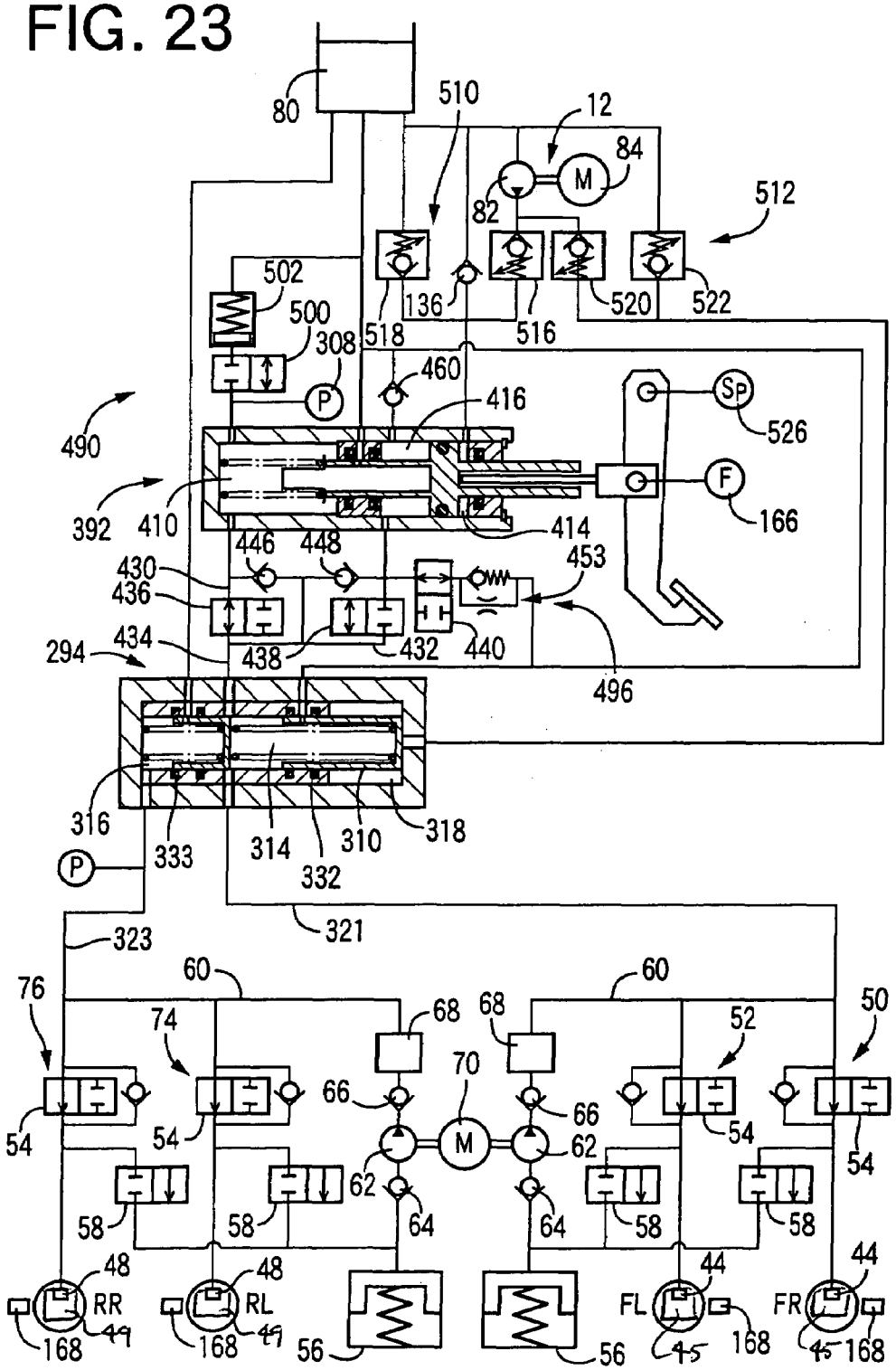
FIG. 23 is a hydraulic circuit diagram of a braking system according to a still further embodiment of this invention.

Referring next to FIG. 23, there will be described a braking system constructed according to an eighth embodiment of this invention, which includes a hydraulic pressure source device 490, which in turn includes the pump device 12, the master cylinder 392, the assisting cylinder 294, and a hydraulic pressure control device 496. The master cylinder 392 is identical with that in the seventh embodiment of FIG. 20, except that the pressurizing chamber 410 is connected through an electromagnetic shut-off valve 500 to a stroke simulator 502. The hydraulic pressure control device 496 includes two linear valve devices 510, 512 as well as the electromagnetic shut-off valves 436, 438, 440. The linear valve device 510 is provided to control the fluid pressure in the rear pressure chamber 414, and the linear valve device 512 is provided to control the fluid pressure of the pressure control chamber 318 of the assisting cylinder 294.

The linear valve device 510 includes two normally open linear valves 516, 518, while the linear valve device 512 includes a normally open linear valve 520 and a normally closed linear valve 522.

In the linear valve device 510, the linear valve 516 is disposed between the pump device 12 and the rear pressure chamber 414, and the linear valve 518 is disposed between the rear pressure chamber 414 and the reservoir 80. In the linear valve device 512, the linear valve 520 is disposed between the pump device 12 and the pressure control chamber 318, and the linear valve 522 is disposed between the pressure control chamber 318 and the reservoir 80.

The shut-off valves 436, 438, 440 are controlled in the same manner as in the braking system of FIG. 20. The shut-off valve 500 for the stroke simulator 502 is switched from the closed state to the open state when the shut-off valve 436 is switched from the open state to the closed state. According to this arrangement, the pressurized fluid is prevented from being fed from the pressurizing chamber 410 to the stroke stimulator 502 when the shut-off valve 436 is in the open state, and is permitted to be fed from the pressurizing chamber 510 to the stroke simulator 502 when the shut-off valve 336 is in the closed state, so that the operating stroke of the brake pedal 24 can be increased even when the shut-off valve 336 is in the closed state. In the present braking system of FIG. 23 wherein the shut-off valve 342 provided in the braking system of FIG. 20 is not provided, the function of the shut-off valve 342 is performed by the linear valve device 512. That is, the linear valve device 512 is capable of functioning as both the linear valve 86 and the shut-off valve 342.

In the present eighth embodiment wherein the linear valve devices 510, 512 are provided for the rear pressure chamber 414 and the pressure control chamber 316, respectively, the rear pressure chamber 414 and the pressure control chamber 316 can be selectively communicated with the pump device 12 and the reservoir 80, independently of each other, so that the fluid pressures in these chambers 414, 316 can be controlled independently of each other. In the present embodiment, it is possible to control not only the relationship between the operating force of the brake pedal 24 and the braking pressure $P_{WC}$, but also the relationship between the operating stroke of the brake pedal 24 and the braking pressure $P_{WC}$. The operating stroke is detected by a stroke sensor 526.

Since the linear valve 522 of the linear valve device 512 is a normally closed valve, the fluid pressure in the pressure control chamber 316 can be rapidly increased when the hydraulic pressure control device 496 is switched to the second state. When the brake pedal 24 is released, the solenoid coils of the linear valves 516, 518, 520, 522 are de-energized to place the linear valves 516, 518, 520 in the open state and to place the linear valve 522 in the closed state, so that the pressurized fluid in the rear pressure chamber 414 is returned to the reservoir 80 through the linear valve 518, and the pressurized fluid in the pressure control chamber 316 is returned to the reservoir 80 through the linear valves 520, 516, 518.

Figure 24:
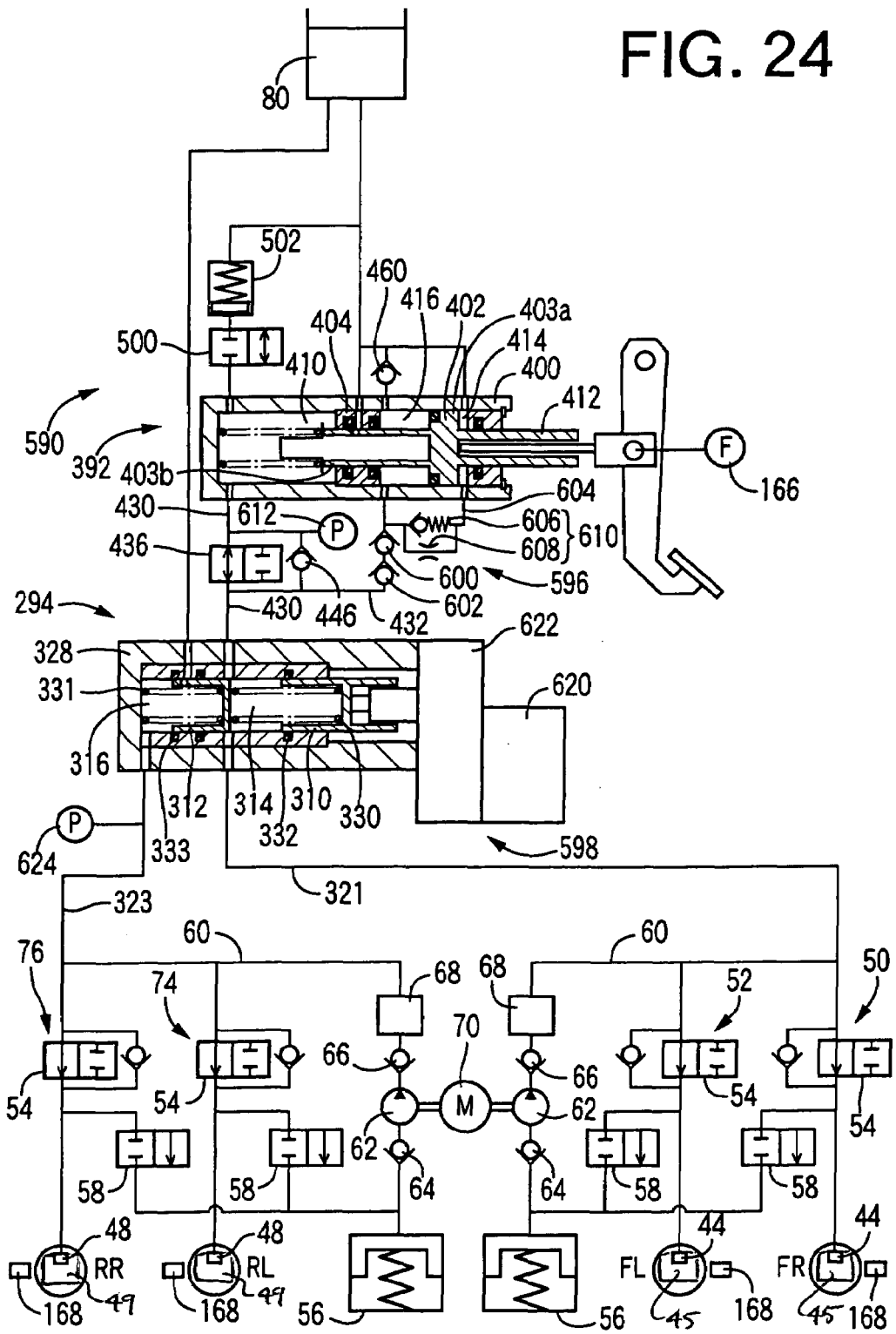
FIG. 24 is a hydraulic circuit diagram of a braking system according to a yet further embodiment of this invention.

Referring to FIG. 24, there will be described a braking system constructed according to a ninth embodiment of this invention, which includes a hydraulic pressure source device 590, which in turn includes the master cylinder 392 and assisting cylinder 294 (which have been described), a hydraulic pressure control device 596 and a power-operated hydraulic pressure source device 598.

The hydraulic pressure control device 596 includes the shut-off valve 436 and check valve 446 (which have been described), and check valves 600, 602. The present braking system does not include a pump device and a linear valve device, and is not adapted to control the fluid pressure in the rear pressure chamber 414, which is connected to the reservoir 80. The check valves 600, 602 are provided in the fluid passage 432 connected to the annular fluid chamber 416. The check valves 600, 602 permit a flow of the fluid in a direction from the annular fluid chamber 416 toward the master cylinder 294 and inhibits a flow of the fluid in the reverse direction. The annular fluid chamber 416 is connected to the reservoir 80 through a fluid passage 604, which is provided with a flow restricting device 610 including a pressure relief valve 606 and an orifice 608 which are disposed in parallel connection with each other. The fluid pressure in the pressurizing chamber 410 is detected by a pressure sensor 612. In the presence of this pressure sensor 612, the operating force sensor 166 is not essential, since the operating force of the brake pedal 24 can be obtained on the basis of the fluid pressure detected by the pressure sensor 612.

While the fluid pressure in the annular fluid chamber 416 is lower than the opening pressure of the pressure relief valve 606 during an advancing movement of the pressurizing piston 402, the fluid pressurized in the annular fluid chamber 416 is delivered to the assisting cylinder 294 through the check valves 600, 602. When the fluid pressure in the annular fluid chamber 416 has been increased to the opening pressure of the pressure relief valve 606, the pressurized fluid is returned from the annular fluid chamber 416 to the reservoir 80 through the opened pressure relief valve 606. While the pressurizing piston 402 is held at the same position, the annular fluid chamber 416 is substantially communicated with the reservoir 80 through the orifice 608, so that the fluid pressure in the annular fluid chamber 416 is held at the atmospheric level.

While the fluid pressure in the annular fluid chamber 416 is lower than the opening pressure of the pressure relief valve 454 during an advancing movement of the pressurizing piston 402 immediately after the initiation of a braking operation, the pressurized fluid is delivered from not only the pressurizing chamber 410 but also the annular fluid chamber 416 to the wheel brake cylinders 44, 48. Accordingly, the wheel brake cylinders 44, 48 are filled with the pressurized fluid at a relatively high speed. The opening pressure of the pressure relief valve 606 is determined so that the pressure relief valve 606 is opened when the fast-filling of the wheel brake cylinders 44, 48 is expected to be completed. Accordingly, the fast filling of the wheel brake cylinders 44, 48 can be completed in a relatively short time, and the delay in the activation of the wheel brake cylinders to provide a braking effect can be reduced. In this sense, the flow restricting device 610 may be considered to be a fill-up device for fast filling of the wheel brake cylinders 44, 48.

When the fluid pressure in the annular fluid chamber 416 is lowered down to the atmospheric level, the fluid in the pressurizing chamber 410 is pressurized by the small-diameter portion 403b of the pressurizing piston 402, so that the fluid pressure in the pressurizing chamber 410, which corresponds to a given amount of the brake operating force, can be made higher than when the fluid is pressurized by the large-diameter portion 403a, that is, than when the annular fluid chamber 416 is not communicated with the reservoir 80.

When the pressurizing piston 402 is retracted, the volume of the annular fluid chamber 416 is increased. The fluid is fed to the annular fluid chamber 416 through the check valve 460 as the volume of the annular fluid chamber 416 is increased, so that the fluid pressure in the annular fluid chamber 416 is prevented from being lowered below the atmospheric level.

The power-operated hydraulic pressure source device 598 includes a power-operated drive source 620, and a force transmitting device 622 operable to transmit a drive force of the power-operated drive source 620 to the pressurizing piston 310 of the assisting cylinder 294. The fluid pressure in the pressurizing piston 310 of the assisting cylinder 294 is controlled to control the braking pressure $P_{WC}$ in the wheel brake cylinders 44, 48, by controlling the power-operated hydraulic pressure source device 598.

Figure 25:
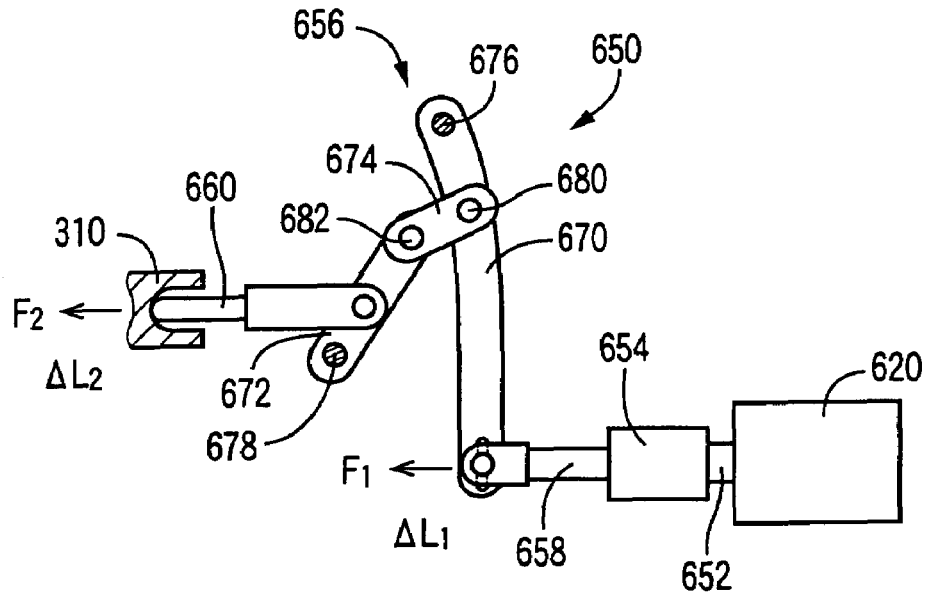
FIG. 25 is schematic view of a force transmitting device in the braking system of FIG. 24.

In the present braking system, a pressure sensor 624 is connected to the fluid passage 323, to detect the output pressure of the hydraulic pressure source device 590. The fluid pressure detected by the pressure sensor 624 also represents the braking pressure $P_{WC}$ in the rear wheel brake cylinders 48. When the fluid pressure detected by the pressure sensor 624 has increased to a value at which the fast filling of the wheel brake cylinders 44, 48 is expected to be completed, the electromagnetic shut-off valve 436 is switched to the closed state, so that the assisting cylinder 294 (wheel brake cylinders 44, 48) is substantially isolated from the master cylinder 392. In this state, the braking pressure $P_{WC}$ is controlled by the power-operated drive device 620 such that the speed of movement of the pressurizing piston 310 for a given operating amount of the power-operated drive source 620 can be changed by the force transmitting device 622. In this embodiment, the speed of movement of the pressurizing piston 310 is higher when the operating stroke of the pressurizing piston 310 is relatively small than when the operating stroke is relatively large. In the present embodiment, the power-operated drive source 620 is an electric motor 620 (FIG. 25). The fluid pressure in the pressurizing chambers 314, 316 is controlled by controlling the amount of electric current to be applied to the electric motor of the drive source 620.

The force transmitting 622 may be a lever ratio changing device 650 constructed as shown in FIG. 25.

The lever ratio changing device 650 includes a motion converting device 654 and a link mechanism 656. The motion converting device 654 is arranged to convert a rotary motion of an output shaft 652 of the electric motor 620 of the drive source 620 into a linear motion of the pressurizing piston 310 of the assisting cylinder 294. The motion transmitting device 654 includes an output shaft 658 which is operatively connected through the link mechanism 656 to an input shaft 660 of the pressurizing piston 310. The link mechanism 656 is arranged to change a ratio of an amount of movement ΔL1 of the output shaft 658 to an amount of movement ΔL2 of the input shaft 660. The link mechanism 656 includes a first lever 670 connected to the output shaft 658 of the motion converting device 654, a second lever 672 connected to the input shaft 660, and a third lever 674 connecting the first and second levers 670, 672. The first and second levers 670, 678 are supported by the frame of the lever ratio changing device 650 such that the levers 670, 672 are pivotable about respective pivot shafts 676, 678. The third lever 674 is connected at its opposite ends to the first and second levers 670, 672 through respective connecting pins 680, 682.

The motion converting device 654 includes a ballscrew mechanism.

Figure 26:
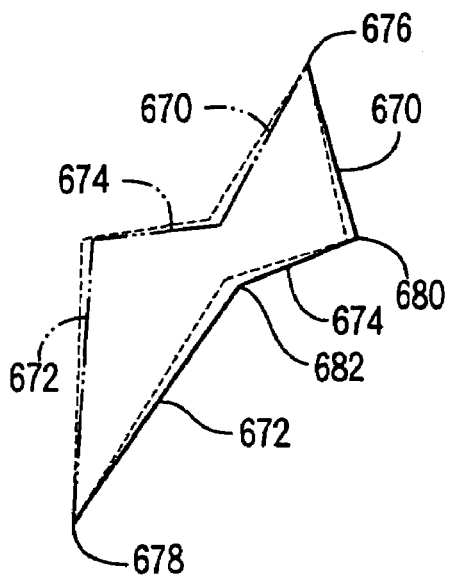
FIG. 26 is a view showing an operating state of a link mechanism in the force transmitting device of FIG. 25.

When the electric motor 620 is activated while the first lever 670 is located at a position indicated by solid line in FIG. 26, the output shaft 658 is moved by a distance corresponding to an amount of operation of the electric motor 620, so that the first lever 670 is pivoted to a position indicated by broke line, and the input shaft 660 is accordingly moved by the link mechanism 656. As is apparent from FIG. 26, the second lever 672 is pivoted by a larger angle when the electric motor 620 is activated with the first lever 670 located at the position indicated by the solid line, than at the position indicated by two-dot chain line. It will therefore be understood that the speed of movement of the input shaft 660 for a given angle of pivoting of the first lever 670 (for a given distance of movement of the output shaft 658 or a given number of revolutions of the electric motor 620) is made higher when the operating stroke of the input shaft 660 is relatively small than when the operating stroke is relatively large, as indicated by solid line in the graph of FIG. 27.

The above arrangement makes it possible to move the input shaft 660 at a relatively high speed immediately after the initiation of a braking operation, so that the pressurized fluid can be delivered from the pressurizing chambers 314, 316 to the wheel brake cylinders 44, 48 at a relatively high flow rate in a initial period of the braking operation. The present arrangement is effective to reduce a delay in the activation of the wheel brake cylinders 44, 48 to provide a braking effect.

Figure 27:
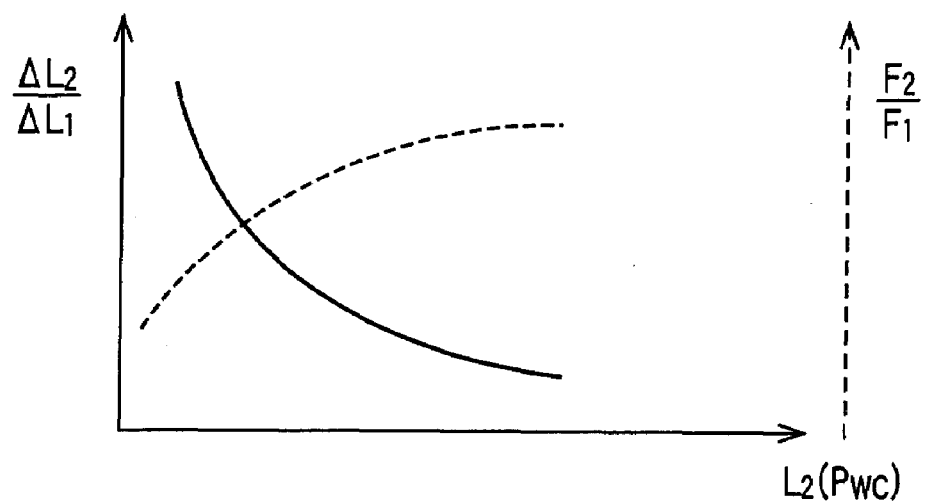
FIG. 27 is a view showing a movement speed ratio in the force transmitting device of FIG. 25.

It is also noted that the link mechanism 656 changes a ratio of an operating force F2 acting on the input shaft 660 to an operating force F1 acting on the output shaft 658, as indicated by broken line in FIG. 27. That is, the ratio F2/F1 increases with an increase in the operating stroke of the pressurizing piston 310 (with an increase in the braking pressure $P_{WC}$), so that the braking pressure $P_{WC}$ can be increased with an increase in the operating stroke of the pressurizing piston 310.

It will be understood that the force transmitting device 622 including the lever ratio changing device 650 serves as a pressure increase changing device operable to change an amount of increase of the braking pressure which corresponds to a given operating amount of the power-operated drive source 620.

Figure 28:
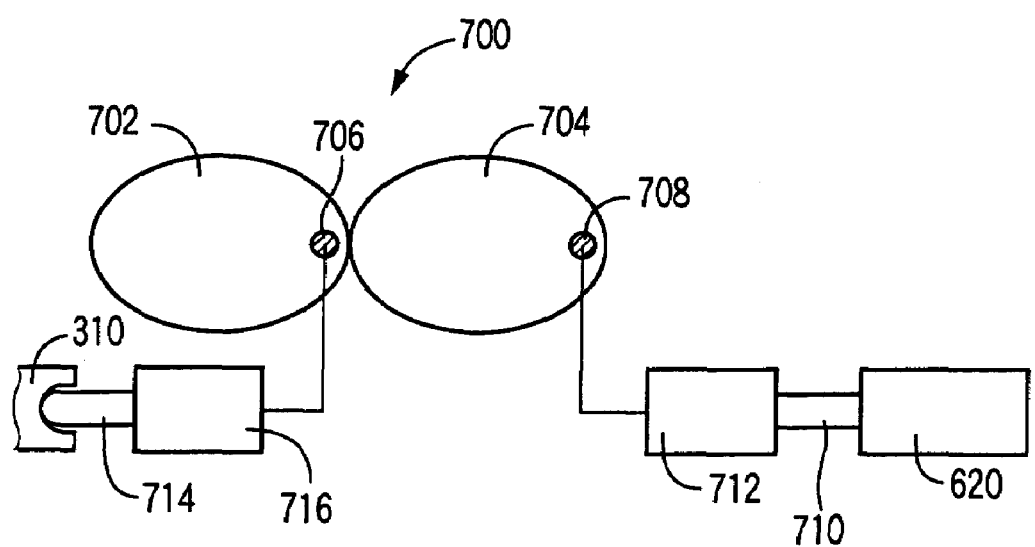
FIG. 28 is a schematic view of a force transmitting device used in the braking system of FIG. 24.

The force transmitting device 622 may be an elliptical gear mechanism 700 shown in FIG. 28, which serves in place of the lever ratio changing device 650 shown in FIG. 25. The elliptical gear mechanism 700 includes a pair of elliptical gears 702, 704 having respective rotary shafts 706, 708 fixed thereto. Each of these rotary shafts 706, 7-8 is located at one of the two foci of the ellipse of the corresponding elliptical gear 702, 704. The two elliptical gears 702, 704 engage each other such that the rotary shafts 706, 708 are spaced apart from each other by the length of the major axis of the ellipse in the direction of the major axis. In the present embodiment, the rotary shaft 708 is connected through a speed reducing device 712 to an output shaft 710 of the electric motor 620 of the drive source, while the rotary shaft 706 is connected through a motion converting device 716 to an input shaft 714 of the pressurizing piston 310 of the assisting cylinder 294.

Figure 29A:
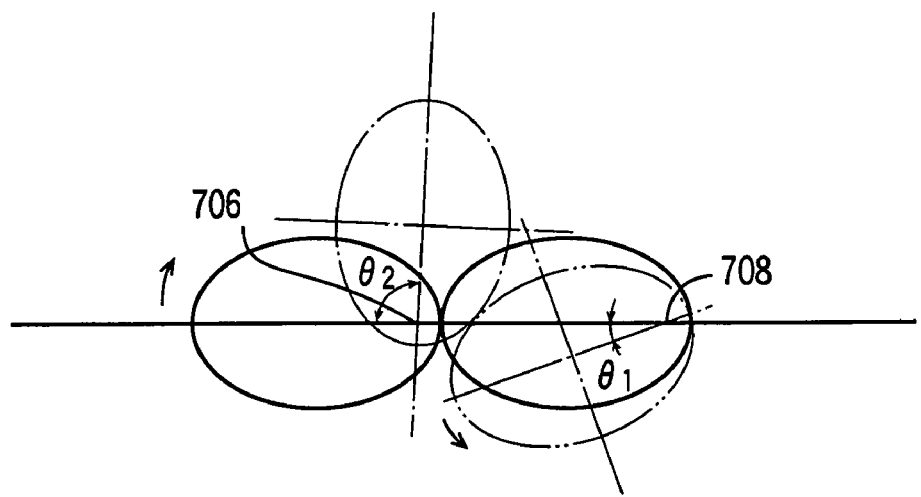
FIGS. 29A and 29B are views indicating an operating state of the force transmitting device of FIG. 28.
Figure 29B:
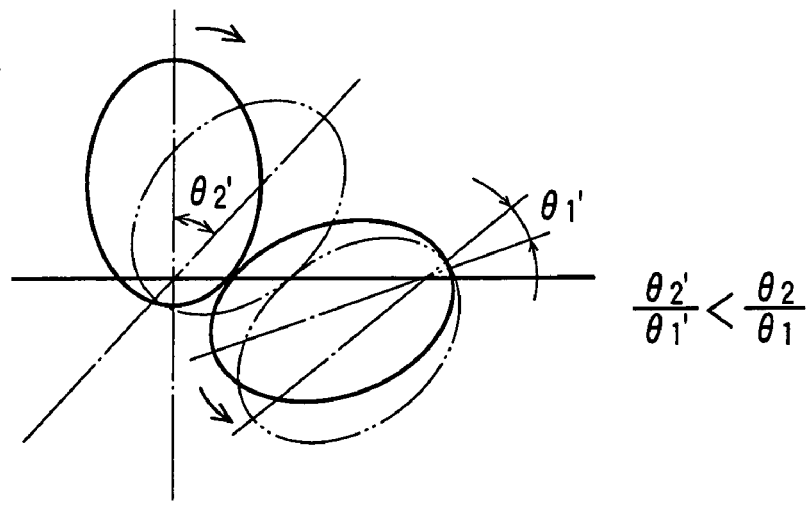

As indicated in FIGS. 29A and 29B, the rotating speed of the rotary shaft 706 for a given angle of rotation of the rotary shaft 708 is higher when the operating stroke of the pressurizing piston 310 is relatively small as in the case of FIG. 29A than when the operating stroke is relatively large as in the case of FIG. 29B. The pressurizing fluid is delivered from the pressurizing chambers 314, 316 to the wheel brake cylinders 44, 48 at a flow rate corresponding to the speed of movement of the pressurizing piston 310. In the present arrangement, the speed of movement of the pressurizing piston 310 is made higher when the operating stroke of the pressurizing piston 310 is relatively small, that is, during an initial period of a braking operation.

The force transmitting device 620 may be a speed-ratio changing device in the form of a continuously variable transmission (CVT), which includes a pair of pulleys and a Vee-belt connecting these pulleys. One of the pulleys is mounted on an output shaft of a drive source in the form of an electric motor such that the pulley in question is rotated with the output shaft. The other pulley is mounted on an output shaft of the CVT, which is connected to the input shaft of the pressurizing piston 310 through a motion converting mechanism. Effective diameters of the pulleys at which the pulleys engage the Vee-belt are variable by a suitable mechanism such as a hydraulic actuator, so that a ratio of the effective diameter R1 of one of the pulleys to the effective diameter R2 of the other pulley can be changed to change the speed ratio of the CVT, that is, to change the ratio of the rotating speed of the output shaft of the CVT to the rotating speed of the output shaft of the electric motor (input shaft of the CVT).

Figure 30:
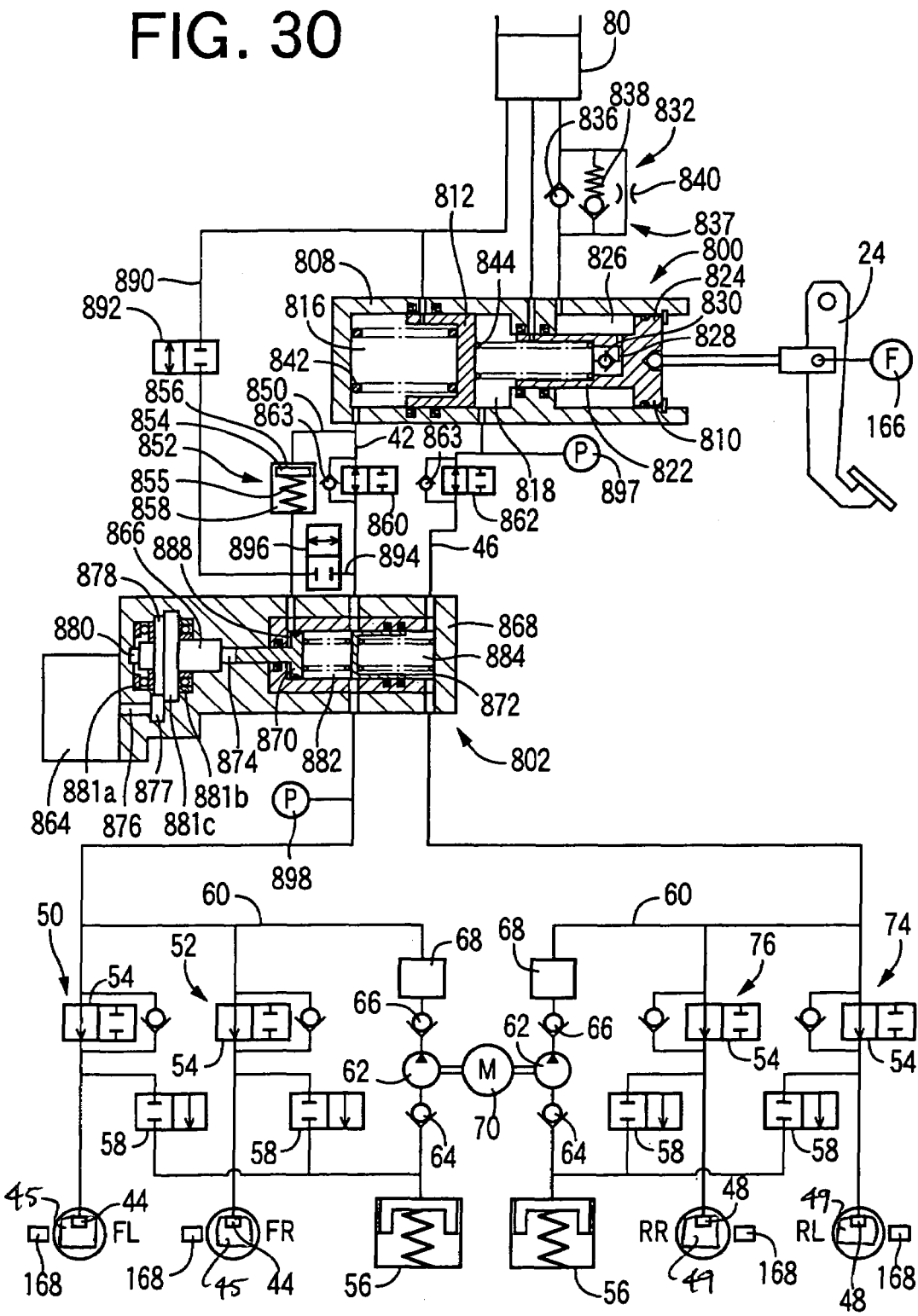
FIG. 30 is a hydraulic circuit diagram of a braking system according to another embodiment of this invention.

Referring to FIG. 30, there will be described a braking system according to a tenth embodiment of this invention, which includes a master cylinder 800, and an assisting cylinder 802. The master cylinder 800 includes a housing 808, and two pressurizing pistons 810, 812 fluid-tightly and sidably fitted in the housing 808. The pressurizing piston 810 is connected to the brake pedal 24. The pressurizing piston 812 partially defining a pressurizing chamber 816 on its front side, while the pressurizing piston 810 partially defines a pressurizing chamber 818 on its front side. The front wheel brake cylinders 44 are connected through the fluid passage 42 to the pressurizing chamber 816, while the rear wheel brake cylinders 48 are connected through the fluid passage 46 to the pressurizing chamber 818. The fluid masses in the two pressurizing chambers 816, 818 of the master cylinder 800 are pressurized to the same level, so that the braking pressures generated in the front and rear wheel brake cylinders 44, 48 are controlled to be equal to each other. The above-indicated assisting cylinder 802 serves as parts of the fluid passages 42, 46. That is, the wheel brake cylinders 44, 48 are connected to the master cylinder through the assisting cylinder 802.

The pressurizing piston 810 is a stepped piston having a small-diameter portion 822 and a large-diameter portion 824. The small-diameter portion 822 partially defines the pressurizing chamber 818. The small-diameter and large-diameter portions 822, 824 and the housing 808 cooperate to define an annular fluid chamber 826. The small-diameter portion 822 has a communication passage 828 for fluid communication between the annular fluid chamber 826 and the pressurizing chamber 818. The communication passage 828 is provided with a check valve 830 which permits a flow of the fluid in a direction from the annular fluid chamber 826 toward the pressurizing chamber 818 and inhibits a flow of the fluid in the reverse direction.

To the annular fluid chamber 826, there is connected the reservoir 80 through a valve device 832, which includes a check valve 836 and a flow restricting device 837. The check valve 836 permits a flow of the fluid in a direction from the reservoir 80 toward the annular fluid chamber 826 and inhibits a flow of the fluid in the reverse direction. The flow restricting device 837 includes a pressure relief valve 838 and an orifice 840, as in the preceding embodiments.

The fluid masses in the annular fluid chamber 826 and pressurizing chamber 818 are pressurized by an advancing movement (leftward movement as seen in FIG. 30) of the pressuring piston 810. The fluid pressure in the annular fluid chamber 826 is increased until it reaches a preset relief pressure of the pressure relief valve 838. While the fluid pressure in the annular fluid chamber 826 is higher than that in the pressurizing chamber, the pressurized fluid is delivered from the annular fluid chamber 826 to the pressurizing chamber 818 through the check valve 830, and is delivered to the wheel brake cylinders 44, 48.

When the fluid pressure in the annular fluid chamber 826 has been increased to the relief pressure of the pressure relief valve 838, the pressurized fluid is discharged from the annular fluid chamber 826 to the reservoir 80 through the pressure relief valve 838. In this state, the fluid pressure in the pressurizing chamber 818 is higher than that in the annular fluid chamber 826, but a flow of the pressurized fluid from the pressurizing chamber 818 to the annular fluid chamber 826 is prevented by the check valve 830. The pressurized fluid is delivered to the wheel brake cylinders 44, 48 from the pressurizing chambers 816, 818, but not from the annular fluid chamber 826.

Subsequently, the fluid pressure in the pressurizing chamber 818 is increased as the pressurizing piston 810 is further advanced. Since the fluid in the pressurizing chamber 818 is pressurized by the small-diameter portion 822, the fluid pressure in the pressurizing chamber 818 corresponding to a given operating force of the brake pedal 24 is higher than the pressure of the fluid which would be pressurized in the annular and pressurizing chambers 818, 826 by the large-diameter portion 824. Thus, the boosting ratio of the master cylinder 800 is increased when the fluid pressure in the annular fluid chamber 826 has been increased to the relief pressure of the pressure relief valve 838.

The housing 808 has two ports communicating with the respective two pressurizing chambers 816, 818 through respective cut seals. The pressurizing chambers 816, 818 are connected to the reservoir 80 through these ports and respective fluid passages. A return spring 842 is disposed between the front end wall of the housing 808 and the pressurizing piston 812, and a return spring 844 is disposed between the two pressurizing pistons 810, 812.

The pressurizing chamber 816 is connected through a fluid passage 850 to the assisting cylinder 802. The fluid passage 850 is provided with a stroke simulator 852, which includes a simulator piston 854 slidably received in a housing, and a spring 855. The simulator piston 854 divides the interior of the housing into two variable-volume chambers 856, 858, and the spring 855 biases the simulator piston 854 in a direction from the second variable-volume chamber 858 toward the first variable-volume chamber 856. The pressurizing chamber 816 is connected to the first variable-volume chamber 816, while the assisting cylinder 802 is connected to the second variable-volume chamber 858. The spring 855 indicated above is disposed in the second variable-volume chamber 858 to bias the simulator piston 854 so as to reduce the volume of the first variable-volume chamber 856. As the brake pedal 24 is operated, the volume of the first variable-volume chamber 856 is increased, so that a reaction force corresponding to the volume of the first variable-volume chamber 856 is applied to the brake pedal 24.

The fluid passages 42, 46 connecting the respective pressurizing chambers 816, 818 and the respective wheel brake cylinders 44, 48 are provided with respective master-cylinder cut-off valves 860, 862 in the form of electromagnetic shut-off valves. By selectively opening and closing the master-cylinder cut-off valves 860, 862, the wheel brake cylinders 44, 48 are selectively communicated with or isolated from the master cylinder 800. The master-cylinder cut-off valves 860, 862 are normally open valves which are placed in their open state when their solenoid coils are not energized.

When the fast-filling of the wheel brake cylinders 44, 48 is completed while the electric system is normal, the master-cylinder cut-off valves 860, 862 are switched from the open state to the closed state, so that the pressurized fluid is delivered from the master cylinder 800 to the wheel brake cylinders 44, 48 in an initial period of a braking operation, and is subsequently delivered from the assisting cylinder 802 to the wheel brake cylinder. If the electric system becomes defective, the master-cylinder cut-off valves 860, 862 are switched to the open state, so that the pressurized fluid is delivered from the master cylinder 800 to the wheel brake cylinders 44, 48. Two check valves 863 are provided in parallel connection with the respective master-cylinder cut-off valves 860, 862. The check valves 863 permit flows of the fluid in a direction from the master cylinder 800 toward the wheel brake cylinders 44, 48 and inhibits flows of the fluid in the reverse direction.

The assisting cylinder 802 is disposed in portions of the fluid passages 42, 46 downstream of the master-cylinder cut-off valves 860, 862.

The assisting cylinder 802 is operated by a power-operated drive source in the form of an electric motor 864 which is bidirectionally operable. A rotary motion of the electric motor 864 is converted by a motion converting device 866 into a linear motion of a drive shaft 874. Like the assisting cylinder 294 used in the sixth through ninth embodiments, the assisting cylinder 802 includes a housing 868, and a pressurizing piston 870 which is fluid-tightly and slidably received in the housing 868. The pressurizing piston 870 is advanced by an advancing movement of the drive shaft 874 of the motion converting device 866. Namely, the pressurizing piston 860 is advanced and retracted by bidirectional operations of the electric motor 864.

As shown in FIG. 30, a rotary motion of an output shaft 876 of the electric motor 864 is transmitted to a rotary shaft 880 through a pair of gears 877, 878, and a rotary motion of the rotary shaft 880 is converted by the motion converting device 866 into the linear motion of the drive shaft 874.

In FIG. 30, reference signs 881a, 881b denote a thrust bearing and a radial bearing, respectively, while reference sign 881c denotes a flange. The flange 881c receives an axial form the pressurizing piston 870.

The pressurizing pistons 870, 872 partially define respective pressurizing chambers 882, 884 on their front side (on their right side as seen in FIG. 30). These pressurizing chambers 882, 884 are connected to the respective wheel brake cylinders 44, 48. That is, the master cylinder 800 is connected to the wheel brake cylinders 44, 48 through the respective pressurizing chambers 882, 884.

The pressurizing piston 870 partially defines a rear pressure chamber 888 on its rear side (on its left side as seen in FIG. 30). The rear pressure chamber 888 is connected through the fluid passage 850 to the second variable-volume chamber 858 of the stroke simulator 852, and to the reservoir 80 through a reservoir passage 890. The reservoir passage 890 is provided with an electromagnetic shut-off valve 892, which is a normally closed valve which is placed in its closed state when its solenoid coil is not-energized. The rear pressure chamber 888 is further connected through a fluid passage 894 to the pressurizing chamber 882, which is provided with an electromagnetic shut-off valve 896. This shut-off valve 896 is also a normally closed valve. The fluid pressure in the master cylinder 800 is detected by a pressure sensor 897 which is connected to a portion of the -fluid passage 46 upstream of the master-cylinder cut-off valve 862. The fluid pressure in the wheel brake cylinders 44, 48 is detected by a pressure sensor 898 connected to a portion of the fluid passage 42 downstream of the assisting cylinder 802.

There will be described an operation of the present braking system. The various electromagnetic control valves are normally placed in the original positions of FIG. 30. When the brake pedal 24 is operated, the pressurized fluid is delivered from the master cylinder 800 to the wheel brake cylinders 44, 48. The fluid in the master cylinder 800 is pressurized by the large-diameter portion 824 of the pressurizing chamber 810, until the fast filling of the wheel brake cylinders 44, 48 is completed. Accordingly, the fast filling can be completed in a relatively short time with the pressurized fluid delivered to the wheel brake cylinders 44, 48 at a relatively high rate.

When the fast filling is terminated, the master-cylinder cut-off valves 860, 862 are closed, so that the braking pressure in the wheel brake cylinders 44, 48 is controlled by the assisting cylinder 294.

While the braking pressure is not higher than a predetermined value, a hydraulic pressure control device including the shut-off valves 892, 896 is placed in a first state in which the shut-off valve 892 is placed in the open state while the shut-off valve 896 is placed in the closed state, as indicated in the table of FIG. 31.

In the first state wherein the second variable-volume chamber 858 of the stroke simulator 852 is communicated with the reservoir 80 through the open shut-off valve 892, the volume of the second variable-volume chamber 858 can be reduced, and the fluid pressurized in the pressurizing chamber 816 is absorbed in the first variable-volume chamber 856, so that a reaction force corresponding to the operating force of the brake pedal 24 is applied to the brake pedal 24.

In the meantime, the pressurizing piston 870 of the assisting cylinder 802 is advanced by the electric motor 864, so that the volume of the rear pressure chamber 888 is increased. The rear pressure chamber 888 is supplied with the fluid from the reservoir 80 or stroke simulator 852, so that the fluid pressure in the rear pressure chamber 888 is prevented from being lowered below the atmospheric level. Namely, the rear pressure chamber 888 is held at a pressure substantially equal to the atmospheric level. The pressurizing piston 860 receives a drive force Fd corresponding to the drive torque of the electric motor 864. The fluid pressure in the pressurizing chamber 882 is increased as the pressurizing piston 870 is advanced, so that the pressurizing piston 872 is advanced to increase the fluid pressure in the pressurizing chamber 884. The fluid pressure P in the pressurizing chambers 882, 884 is represented by the following equation:

$P = Fd/A_1$, wherein "A1" represents a pressure-receiving surface area of the pressurizing piston 870 which partially defines the pressurizing chamber 882.

The drive force Fd, that is, the amount of electric current to be applied to the electric motor 864 is controlled such that the fluid pressure in the pressurizing chamber 882 detected by the pressure sensor 898 coincides with a desired value determined on the basis of the operating force of the brake pedal 24.

When the braking pressure in the wheel brake cylinders 44, 48 has been increased to the predetermined value, the hydraulic pressure control device is switched to a second state in which the shut-off valve 892 is closed to isolate the rear pressure chamber 888 from the reservoir 80 while the shut-off valve 896 is opened for fluid communication between the pressurizing chamber 882 and the rear pressure chamber 888, so that the fluid pressure in the rear pressure chamber 888 is made equal to that in the pressurizing chamber 882. The pressurizing piston 870 receives a sum of the force based on the fluid pressure in the rear pressure chamber 888 and the drive force Fd corresponding to the drive torque of the electric motor 864, so that the fluid in the pressurizing chamber 882 is pressurized to a value corresponding to this sum. The fluid pressure P in the pressurizing chamber 882 is represented by the following equation:

$P = P \cdot A1 \cdot Fd + P \cdot A3$, wherein "$A_3$" represents the pressure-receiving surface area of the pressurizing piston 870 which partially defines the rear pressurizing chamber 888.

In this second state, too, the amount of electric current to be applied to the electric motor 864 is controlled such that the fluid pressure in the pressurizing chamber 8822 coincides with a desired value determined by the operating force of the brake pedal 24.

As indicated in FIG. 31, the rate of increase of the fluid pressure in the pressurizing chambers 882, 884 is higher in the second state than in the first state, for a given rate of increase of the drive force Fd. It will also be understood that the pressurized fluid is delivered from the pressurizing chambers 882, 884 at a high flow rate in the first state than in the second state, for a given operating stroke of the pressurizing piston 870. In the present embodiment, the rate of increase of the fluid pressure in the wheel brake cylinders 44, 48 can be changed for a given rate of increase of the drive torque of the electric motor 864, and the rate of flow of the pressurized fluid from the pressurizing chambers 882, 884 can be changed, for a given operating stroke of the pressurizing piston 860.

It will be understood that the shut-off valves 892, 896 serve as the pressure-increase changing device operable to change the amount of increase of the braking pressure corresponding to a given operating amount of the electric motor 864.

When the brake pedal 24 is released, the solenoid coils of the master-cylinder cut-off valves 860, 862 are de-energized. At least one of the shut-off valves 982, 896 is desirably held in the open state for a time enough to return the entire volume of the fluid from the rear pressure chamber 888 to the reservoir 80 and/or the pressuring chamber 816. The fluid is returned from the rear pressure chamber 888 to the reservoir 80 through the reservoir passage 890 and the shut-off valve 892, and/or to the pressurizing chamber 816 through the fluid passages 894, 42 and the shut-off valve 896. Further, the fluid is returned from the rear pressure chamber 888 to the second variable-volume chamber 858 of the stroke simulator 852, so that the entire volume of the fluid is returned from the first variable-volume chamber 856 to the master cylinder.

Figure 32:
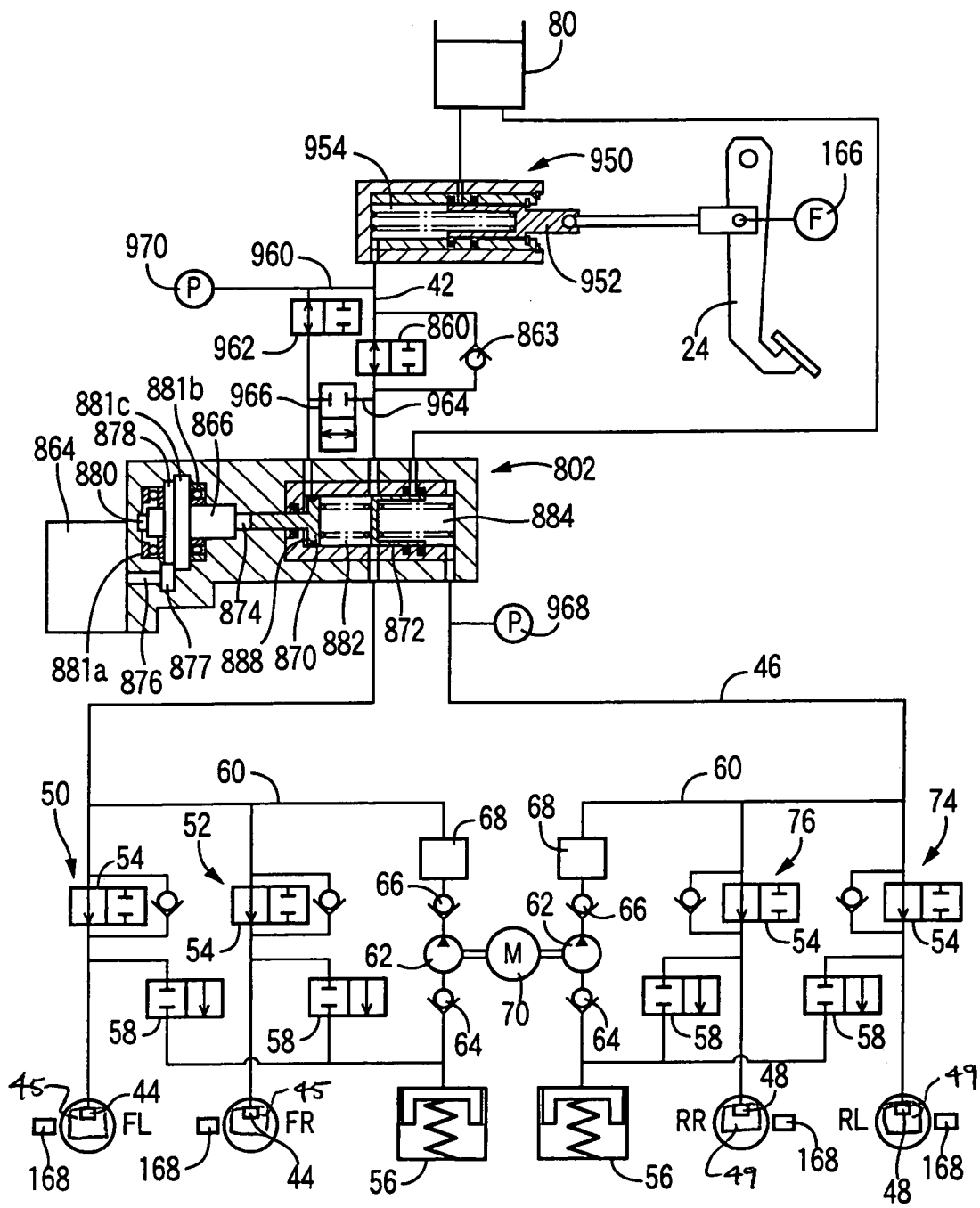
FIG. 32 is a hydraulic circuit diagram of a braking system according to a further embodiment of this invention.

Referring to FIG. 32, there will be described a braking system constructed according to an eleventh embodiment of this invention.

The braking system of FIG. 32 includes a master cylinder 950 which includes a single pressurizing piston 952. This pressurizing piston 95 does not define a rear pressure chamber on its rear side.

A pressurizing chamber 954 formed on the front side of the pressurizing piston 952 is connected to the front brake cylinders 44 through the fluid passage 42. The master-cylinder cut-off valve 860 and the assisting cylinder 802 are connected to the fluid passage 42, in series connection with each other, such that the assisting cylinder 802 is disposed downstream of the master-cylinder cut-off valve 860. To the pressurizing chamber 954 is also connected to the rear pressure chamber 888 through a fluid passage 960, which is provided with an electromagnetic shut-off valve 962. This shut-off valve 962 is a normally open valve. As in the tenth embodiment, the pressurizing chamber 882 and the rear pressure chamber 888 of the assisting cylinder 802 are connected to each other through a connecting passage 964, which is provided with an electromagnetic shut-off valve 966. This shut-off valve 966 is a normally closed valve.

In the present embodiment, the master-cylinder cut-off valve 860 is placed in the closed state during a normal braking operation. In this closed state of the cut-off valve 860, the fluid pressure in the wheel brake cylinders 44, 48 is controlled by the assisting cylinder 802. The amount of electric current to be applied to the electric motor 864 is controlled such that the fluid pressure in the pressurizing chambers 882, 884 coincides with a desired value determined by the brake operating force. The braking pressure is detected by a pressure sensor 968 connected to the fluid passage 46, and the fluid pressure in the master cylinder 950 is detected by a pressure sensor 970 connected to the fluid passage 960.

While the braking pressure is not higher than a predetermined value, a hydraulic pressure control device including the shut-off valves 962, 966 is placed in a first state in which the shut-off valve 962 is placed in the open state while the shut-off valve 966 is placed in the closed state, as indicated in the table of FIG. 33.

In the first state, the pressurizing piston 870 is moved by an operation of the electric motor 864, and the volume of the volume of the rear pressure chamber 888 is increased or reduced with the fluid flowing between the rear pressure chamber 888 and the pressurizing chamber 954, as the pressurizing piston 870 is moved. The pressurizing piston 870 receives the drive force Fd corresponding to the drive torque of the electric motor 864.

The relationship between the drive torque and operating speed of the electric motor 864 is determined by the operating characteristics of the electric motor 864, and the drive force acting on the pressurizing piston 870 and the speed of movement of the pressurizing piston 870 are determined by the amount of electric current applied to the electric motor 864 and the fluid pressure in the pressurizing chamber 882. In the present embodiment, the operating characteristics of the electric motor 864, the construction of the assisting cylinder 802, the specifications of the motion converting mechanism 866, and the control gain are determined such that by controlling the amount of electric current to be applied to the electric motor 864, on the basis of the operating force of the brake pedal 24, the volume of the rear pressure chamber 888 changes with a change in the operating state of the brake pedal 24, that is, with a change in the volume of the pressurizing chamber 954, while the fluid pressure in the rear pressure chamber 888 is controlled to a value corresponding to the operating force of the brake pedal 24. According to this arrangement, the reaction force corresponding to the operating force of the brake pedal 24 is applied to the brake pedal 24, in the first state. That is, the present arrangement prevents an excessively large reaction force acting on the brake pedal 24 in the first state.

The pressurizing piston 870, receives a sum of the force based on the fluid pressure in the rear pressure chamber 888 and the drive force Fd corresponding to the drive torque of the electric motor 864. Since the fluid pressure in the rear pressure chamber 888 is equal to a fluid pressure PM in the pressurizing chamber 954, the fluid pressure P in the pressurizing chamber 816 is represented by the following equation:

$$P=(P \cdot MA_3+Fd)/A1$$

In the present embodiment, the fluid pressure P is controlled to a value of γ·PM, which is a product of the master cylinder pressure PM (corresponding to the brake operating force) and a boosting ratio γ. Accordingly, the above equation may be converted into the following equation:

$$P=(\gamma \cdot Fd)/(\gamma \cdot A1 \cdot A3)$$

When the braking pressure has been increased to the predetermined value, the hydraulic pressure control device is switched to a second state in which the shut0off valve 966 is placed in the open state while the shut-off valve 62 is placed in the closed state, as indicated in FIG. 33. In this second state, the fluid pressure P in the pressurizing chamber 882 is represented by the following equation:

$$P=Fd/(A1 \cdot A_3)$$

Thus, the present embodiment is also arranged such that the fluid pressure in the pressurizing chambers 882, 884 is increased at different rates in the first and second states, for a given amount of change ΔFd of the drive force Fd generated by the electric motor 864, and such that the pressurizing fluid is delivered from the pressurizing chambers 882, 884 to the wheel brake cylinders 44, 48 in the first and second states, for a given operating stroke of the pressurizing piston 870.

It will be understood that the shut-off valves 962, 966 serve as the pressure-increase changing device operable to change the amount of increase of the braking pressure corresponding to a given operating amount of the electric motor 864.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system comprising:
a power-operated hydraulic pressure source operable to deliver a pressurized working fluid:
a brake including a hydraulically operated brake cylinder;
a manually operable brake operating member;
a master cylinder disposed between said power-operated hydraulic pressure source and said brake cylinder and operable to deliver the pressurized working fluid into said brake cylinder in response to an operation of said manually operable brake operating member; and
a flow-rate changing device disposed between said power-operated hydraulic pressure source and said brake cylinder and including said master cylinder, said flow-rate changing device being operable to change a rate of flow of the pressurized working fluid from said master cylinder into said brake cylinder, which rate corresponds to a given rate at which the pressurized working fluid is delivered into said master cylinder as a result of an operation of said power-operated hydraulic pressure source, said flow-rate changing device being operable to change the rate of flow of the pressurized working fluid from said master cylinder into said brake cylinder during an operation in which a pressure of the working fluid in said brake cylinder is controlled such that the pressure of the working fluid in said brake cylinder changes with a change of an operating amount of said manually operable brake operating member;
wherein said master cylinder includes (a) a housing, and (b) a pressurizing piston fluid-tightly and slidably fitted in said housing, said pressurizing piston having two pressure-receiving surface areas which are different from each other and which respectively partially define a front pressurizing chamber and a rear pressure chamber on front and rear sides of said pressurizing piston, said master cylinder being operable to supply said brake cylinder with the pressurized working fluid delivered from said front pressurizing chamber as said pressurizing piston is advanced,
and wherein said flow-rate changing device includes a switching device having a first state in which the pressurized working fluid is delivered from said power-operated hydraulic pressure source to one of said front pressurizing chamber and said rear pressure chamber which has a smaller one of said two pressure-receiving surface areas, and a second state in which the pressurized working fluid is delivered from said power-operated hydraulic pressure source to the other of said front pressurizing chamber and said rear pressure chamber.

2. A braking system according to claim 1, wherein said rear pressure chamber has the smaller pressure-receiving surface area, and said flow-rate changing device further includes a discharge-flow inhibiting device operable to inhibit a discharge flow of the pressurized working fluid from said rear pressure chamber while the pressurized working fluid is delivered from said power-operated hydraulic pressure source to said front pressurizing chamber under the control of said switching device.

3. A braking system according to claim 1, wherein said switching device includes a communication control valve device operable for selective fluid communication of said power-operated hydraulic pressure source with one of at least two fluid chambers of said master cylinder, said at least two fluid chambers including said front pressurizing chamber and said rear pressure chamber.

4. A braking system according to claim 1, further comprising a pressure control device operable to control a pressure of the pressurized fluid in at least one of at least two fluid chambers of said master cylinder, on the basis of an operation-related amount representative of an operating state of said manually operable brake operating member, said at least two fluid chambers including said front pressurizing chamber and said rear pressure chamber.

5. A braking system according to claim 1, wherein said flow-rate changing device is operable to change said rate of flow of the pressurized working fluid into said brake cylinder on the basis of a pressure of the pressurized working fluid in said front pressurizing chamber of said master cylinder.

6. A braking system comprising:
a power-operated hydraulic pressure source operable to deliver a pressurized working fluid;
a brake including a hydraulically operated brake cylinder;
a hydraulic cylinder disposed between said power-operated hydraulic pressure source and said brake cylinder, said hydraulic cylinder including (a) a housing, and (b) a pressurizing piston fluid-tightly and slidably fitted in said housing, said pressurizing piston having two pressure-receiving surface areas which are different from each other and which respectively partially define a front pressurizing chamber and a rear pressure chamber on front and rear sides of said pressurizing piston, said hydraulic cylinder being operable to supply said brake cylinder with the pressurized working fluid from said front pressurizing chamber as said pressurizing piston is advanced;

a flow-rate changing device disposed between said power-operated hydraulic pressure source and said brake cylinder and operable to change a rate of flow of the pressurized working fluid into said brake cylinder, which rate corresponds to a given rate at which the pressurized working fluid is delivered from said power-operated hydraulic pressure source, said flow-rate changing device being operable to change the rate of flow of the pressurized working fluid into said brake cylinder during an operation in which a pressure of the working fluid in said brake cylinder is controlled such that the pressure of the working fluid in said brake cylinder changes with a change of an operating amount of said manually operable brake operating member;

said flow-rate changing device including a switching device having a first state in which the pressurized working fluid is delivered from said power-operated hydraulic pressure source to one of said front pressurizing chamber and said rear pressure chamber which has a smaller one of said two pressure-receiving surface areas, and a second state in which the pressurized working fluid is delivered from said power-operated hydraulic pressure source to the other of said front pressurizing chamber and said rear pressure chamber, said flow-rate changing device further including a discharge-flow inhibiting device operable to inhibit a discharge flow of the pressurized working fluid from said rear pressure chamber while the pressurized working fluid is delivered from said power-operated hydraulic pressure source to said front pressurizing chamber under the control of said switching device; and a check valve disposed in parallel connection with said discharge-flow inhibiting device, said check valve permitting a flow of the pressurized working fluid in a first direction from said power-operated hydraulic pressure source toward said rear pressure chamber, and inhibiting a flow of the pressurized working fluid in a second direction opposite to said first direction.

* * * * *